US00RE37856E

(19) United States
(12) Reissued Patent
Browne

(10) Patent Number: US RE37,856 E
(45) Date of Reissued Patent: Sep. 24, 2002

(54) DATA CORRECTION SYSTEM FOR COMMUNICATIONS NETWORK

(75) Inventor: John Martin Browne, Surrey (GB)

(73) Assignee: British Telecommunications public limited company, London (GB)

( * ) Notice: This patent is subject to a terminal disclaimer.

(21) Appl. No.: 09/797,772

(22) PCT Filed: Mar. 31, 1994

(86) PCT No.: PCT/GB94/00705

§ 371 (c)(1),
(2), (4) Date: Mar. 6, 1995

(87) PCT Pub. No.: WO94/23529

PCT Pub. Date: Oct. 13, 1994

Related U.S. Patent Documents

Reissue of:
(64) Patent No.: 5,802,142
Issued: Sep. 1, 1998
Appl. No.: 08/392,975
Filed: Mar. 6, 1995

(30) Foreign Application Priority Data

Mar. 31, 1993 (GB) ..... 9306724
Mar. 31, 1993 (GB) ..... 9306725
Aug. 24, 1993 (GB) ..... 9317619

(51) Int. Cl.[7] ..... H04M 3/22; H04M 3/08; H04M 15/00

(52) U.S. Cl. ..... 379/28; 379/114.1; 379/13; 379/111

(58) Field of Search ..... 379/103, 13, 28, 379/29.01, 111, 112.05, 113, 114.03, 115.01, 207.02, 219, 220.01, 221.02; 371/2.1, 3, 3.5, 4.2

(56) References Cited

U.S. PATENT DOCUMENTS 3,813,495 A 5/1974 Conerly
4,727,577 A 2/1988 Frey et al.

(List continued on next page.)

FOREIGN PATENT DOCUMENTS

CA 2101305 1/1997
EP 477628 4/1991

(List continued on next page.)

OTHER PUBLICATIONS

L. Swann, "Universal Operations Systems–Integrated Building Blocks", AT&T Technology, vol. 1, No. 1, 1986, pp. 66–71.

(List continued on next page.)

*Primary Examiner*—Vijay Shankar
(74) *Attorney, Agent, or Firm*—Nixon & Vanderhye, P.C.

(57) ABSTRACT

An inter-network call accounting system for use in a communication network such as the public switched telephone network in Britain allows call records to be sorted according to the network operator to be charged in respect of the calls, prior to being priced and charged. A data analyzer incorporating an expert system is provided for call records which cannot be validated. The data analyzer can apply default or amended data, or can output invalid data to a suspended process awaiting updated reference information. Unfixable data is output to a sump for management purposes. A pricing and charging engine processes data already sorted according to billable entity and incorporates further data analysis for dealing with data invalid by reason of pricing and charging related information.

32 Claims, 35 Drawing Sheets

U.S. PATENT DOCUMENTS

| | | | | |
|---|---|---|---|---|
| 4,813,065 | A | 3/1989 | Segala | |
| 4,839,916 | A | 6/1989 | Fields | |
| 4,979,207 | A | 12/1990 | Baum et al. | 379/112 |
| 5,003,584 | A | 3/1991 | Benyacar et al. | |
| 5,008,929 | A | 4/1991 | Olsen | |
| 5,042,027 | A | 8/1991 | Takase et al. | |
| 5,063,591 | A | 11/1991 | Jodoin | |
| 5,103,475 | A | 4/1992 | Shuen | |
| 5,185,785 | A | 2/1993 | Funk et al. | |
| 5,218,632 | A | 6/1993 | Cool | 379/126 |
| 5,265,155 | A | 11/1993 | Castro | |
| 5,274,695 | A | 12/1993 | Green | |
| 5,333,183 | A | 7/1994 | Herbert | |
| 5,335,268 | A | 8/1994 | Kelly | |
| 5,355,403 | A | 10/1994 | Richardson et al. | |
| 5,369,680 | A | 11/1994 | Borbas | |
| 5,488,648 | A | 1/1996 | Womble | |
| 5,517,560 | A | 5/1996 | Greenspan | |

FOREIGN PATENT DOCUMENTS

| | | |
|---|---|---|
| EP | 452 591 | 10/1991 |
| EP | 311 607 | 12/1991 |
| EP | 462 726 | 12/1991 |
| EP | 483 091 | 4/1992 |
| EP | 483 857 | 5/1992 |
| EP | 491 497 | 6/1992 |
| EP | 569 175 | 11/1993 |
| GB | 2 246 051 | 1/1992 |
| GB | 2254224 | 9/1992 |
| GB | 2 255 690 | 11/1992 |
| WO | 93/08661 | 4/1993 |

OTHER PUBLICATIONS

A.C. Stark, Jr. et al., "Harnessing Intelligent Networks", AT&T Technology, vol. 2, No. 3, 1987, pp. 14–21.

L.E. Murphy et al., "Managing Corporate Data Networks", AT&T Technology, vol. 2, No. 3, 1987, pp. 40–47.

J.G. Brinsfield et al., "Unified Network Management Architecture–Putting It All Together", AT&T Technology, vol. 3, No. 2, 1988, pp. 6–17.

D.J. Desmond, "Centralized Management of VCS Networks", AT&T Technology, vol 3, No. 2, 1988, pp. 34–41.

A.L. Barrese, "Open Systems and AT&T's Application Operating Environment", AT&T Technology, vol. 3, No. 3, 1988, pp. 6–15.

R.H. Goldberg et al., "FTS2000–Blueprint For A State–Of–The–Art Digital Network", AT&T Technology, vol. 4, No. 4, 1989, pp. 6–11.

L.M. Falletta et al., "Using The Network For ISDN Support", AT&T Technology, vol. 5, No. 1, 1990, pp. 45–47.

W.F. Daniel et al., "Quality of Maintenance Advanced by PBXpert", AT&T Technology, vol. 5, No. 3, 1990, pp. 16–21.

J.K. Doyle et al., "The StarServer FT Computer Satisfies Customer Fault Tolerant Computer Needs", AT&T Technology, vol. 5, No. 4, 1990, pp. 30–35.

M. Hoover, "Managing Complex Data Networks: Start Smart", AT&T Technology, vol. 6, No. 2, 1991, pp. 38–45.

M.H. Mortensen, "Special Services Automation", AT&T Technology, vol. 4, No. 1, 1989, pp. 44–49.

S.L. Kay et al., "Data Networking With The DATAKIT II Virtual Circuit Switch", AT&T Technology, vol. 4, No. 3, 1989, pp. 20–27.

M.J. Brown, "PRX/A–A Living System", Trends in Telecommunications, vol. 3, No. 1, 1987, pp. 25–32, 34.

"PRX/A, A Living System", Trends in Telecommunications, vol. 3, No. 2, 1987, p. 78.

"MFOS: An Open Architecture for Operations Systems", Trends in Telecommunications, vol 3. No. 2, 1987, pp. 88–89.

H. Bean et al., "5ESS–PRX as a Gateway Switch", Trends in Telecommunications, vol. 4, No. 2, 1988, pp. 53–58.

P.M. Holland et al., "From Concept to Realisation", Trends in Telecommunications, vol. 5, No. 1, 1989, pp. 15–22.

M.G. Andrews et al., "Network Traffic Management and its Application for Intelligent Networks", Trends in Telecommunications, Jun. 1990, vol. 6, No. 1, pp. 13–22.

H.A. Bauer et al., "Evolution of Intelligence in Switched Networks", Trends in Telecommunications, vol. 6, No. 1, 1990, pp. 23–31.

R.C. Ward et al., "The DDSN: On Line in the United Kingdom", Trends in Telecommunications, vol. 6, No. 1, 1990, pp. 33–44.

A.P.M. Koenraadt, "EMS–2000 Element Management System", Trends in Telecommunications, vol. 7, No. 2, 1991, pp. 68–71.

S. Abujawdeh et al., "Operations Systems—The Heart of Providing Quality Services", Trends in Telecommunications, vol. 7, No 3, 1991, pp. 44–51.

Wes Czajkowski et al., "5ESS Switch Bringing ETSI–ISDN to the Market", Trends in Telecommunications, vol. 8, No. 2, 1992, pp. 23–38.

T. Adelman et al., "Flexcab Release 2.0 System Blueprint Final Version 1.0", Dec. 1992, pp. I.1–VII.1, 1–18.

"BOC Notes on the LEC Networks—1990", Issue 1, Mar. 1991.

"Framework Generic Requirements for the Second Generation of Automatic Message Accounting Data Networking System", Issue 1, Sep. 1992.

"Generic Requirements for the Second Generation of Automatic Message Accounting Teleprocessing Systems", Issue 1, Apr. 1991.

"Automatic Message Accounting Teleprocessing System (AMATPS) Collector Interface Requirements", Issue 1, Nov. 1984.

J. McDermott, "Telephone Traffic Management in OTC(A)", Network Management And Teletraffic Engineering Seminar, Sydney Australia, Feb. 26–Mar. 7, 1985.

J. McDermott, "Service Performance Analysis of the OTC(A) Telex Network", Network Management And Teletraffic Engineering Seminar, Sydney, Australia, Mar. 1985.

R.O.G. Jacobs, "The Centoc Daily Traffic Recording System", Telecom Journal of Australia, vol. 33, No. 3, 1983, pp. 235–242.

J. Berrier et al., "International Cooperation results in Successful Installation", Telephony, vol. 208, No. 25, 1985, pp. 32–40.

"BT's Cellnet Retailers Get Advanced Billing System", DEC User, Oct. 1985, p. 25.

R. Ahmari et al., "Helping Switches to Account for Themselves", Record, AT&T Bell Labs, vol. 63, No. 2, 1985, pp. 16–22.

J. Robinson, Jr., "Versatile System Takes the Terror out of Billing", Telephone Engineer & Management, vol. 87, No. 7, 1983, pp. 63–65.

"Request for Information (RFI) on Automatic Message Account (AMA) Data Networking System", Bellcore, Issue 1, Apr. 1991.

M. Bhattacharya "Computerised Telephone Revenue Billing, Accounting and Control System", Telecommunications, Dec. 1989, pp. 45–50.

P. Webster, "Practical Data Applications of Cellular Networks", Second National Conference on Cellular Communications, Conference Papers, Feb. 1986, pp. 193–224.

Shimizu et al., "New Automatic Message Accounting System", Japan Telecommunications Review, vol. 28, 1986, pp. 163–172.

FLEXCAB Flexible Charging and Billing System, pp. 1–182 (Undated).

"AOTC Functional Design", 027.001–RDCSAUSDS–P1.0, pp. 1–13–6, A–1–A–6 (Undated).

E.J. Obuchowski, "Access Charge and Revenue Architecture", AT&T Technical Journal, vol. 66, No. 3, May 1987, pp. 73–81.

Savoy et al., "The Rata System", Mar. 1979, pp. 78–79 (Translation Also Enclosed).

B. Grynko, "Mise en place d'un réseau'd exploitation pour la communitation électronique", Jun. 1987, vol. 26, No. 2, pp. 18–23 (Translation Also Enclosed).

Fig.8
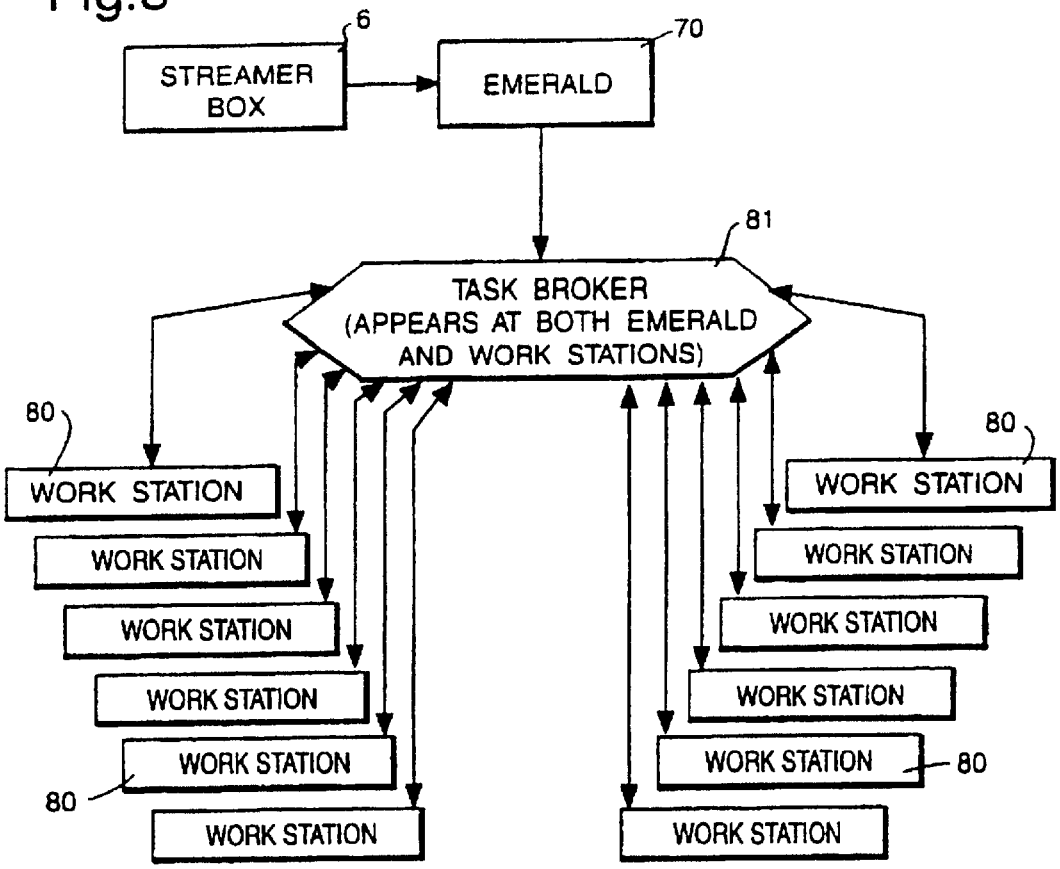
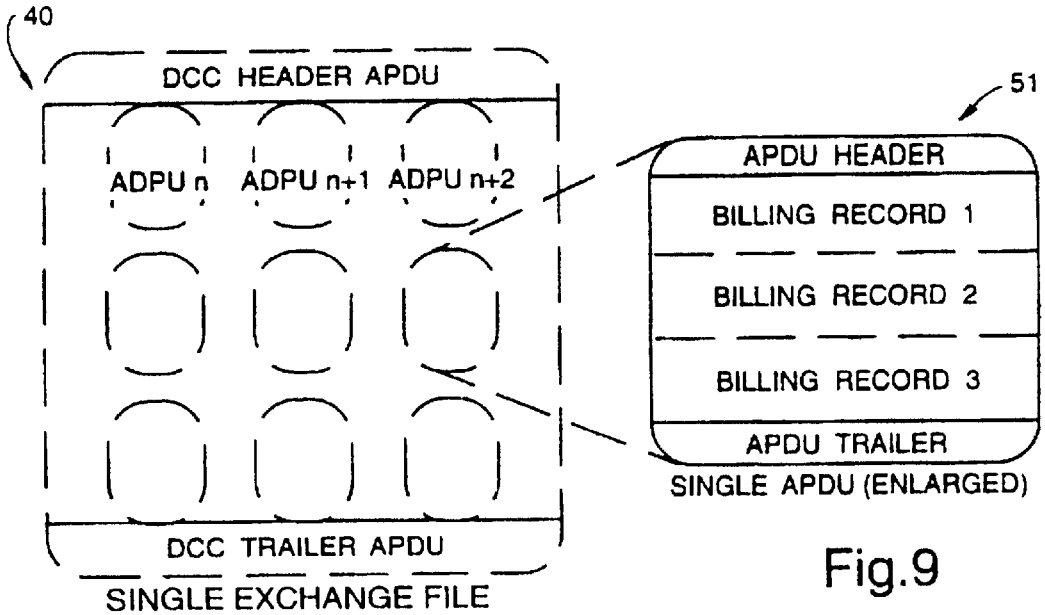
Fig.9

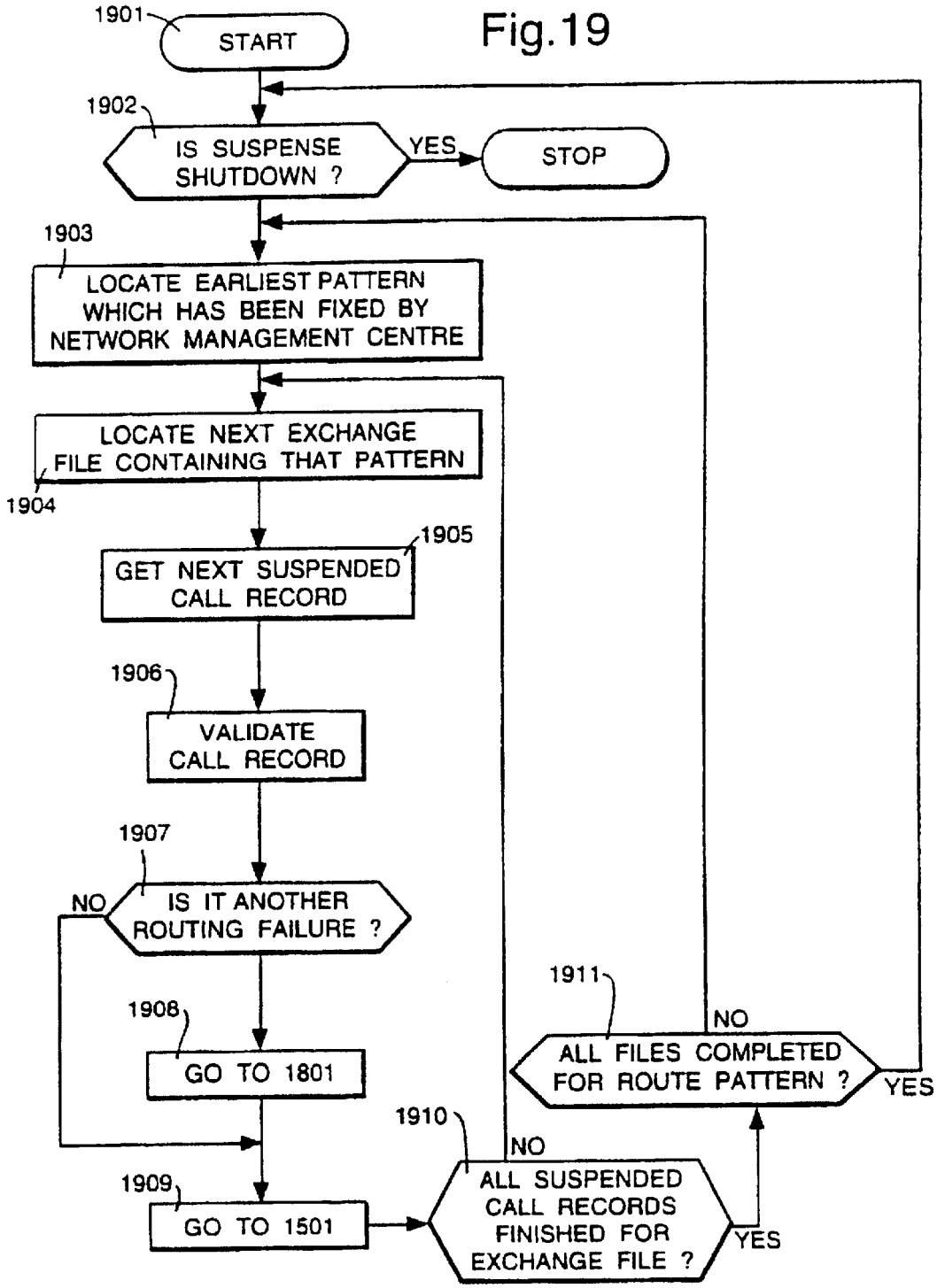
Fig.19
1901
START
1902
IS SUSPENSE SHUTDOWN ?
YES
STOP
1903
LOCATE EARLIEST PATTERN WHICH HAS BEEN FIXED BY NETWORK MANAGEMENT CENTRE
LOCATE NEXT EXCHANGE FILE CONTAINING THAT PATTERN
1904
1905
GET NEXT SUSPENDED CALL RECORD
1906
VALIDATE CALL RECORD
1907
NO
IS IT ANOTHER ROUTING FAILURE ?
1908
GO TO 1801
1911
NO
ALL FILES COMPLETED FOR ROUTE PATTERN ?
YES
1910
NO
1909
GO TO 1501
ALL SUSPENDED CALL RECORDS FINISHED FOR EXCHANGE FILE ?
YES 2000
SEND CALL RECORDS TO ART
2005
WHILE NOT LAST APDU AND APDU No. NOT = TO REQUIRED No.
2010
READ NEXT APDU
2015
WHILE NOT LAST CALL RECORD (CR) No. AND CR No. NOT = REQUIRED CR No.
2020
READ NEXT CR
2025
IF CALL RECORD TYPE NOT = SYSTEM X ITEMISED
YES
NO
2035
UPDATE CR ERROR LOG
2030
SET IEF STATUS = SUMP
EXIT FAILURE
2040
MAP CR INTO ART
2045
RUN ART
2050
MAP CR OUT OF ART
SET IEF STATUS TO DATA SCHEMA STATUS
RETURN Fig.22 (1/2)
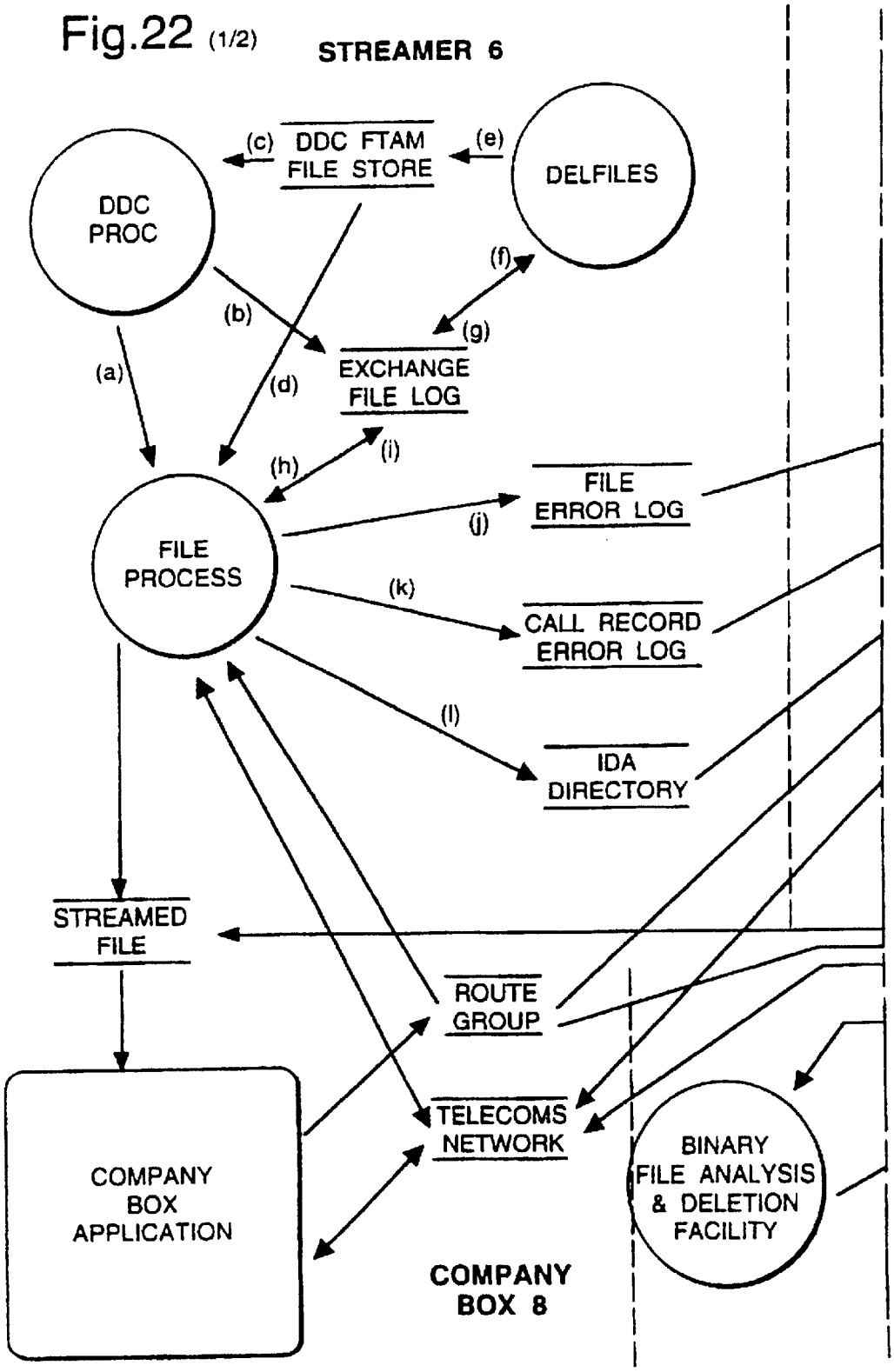

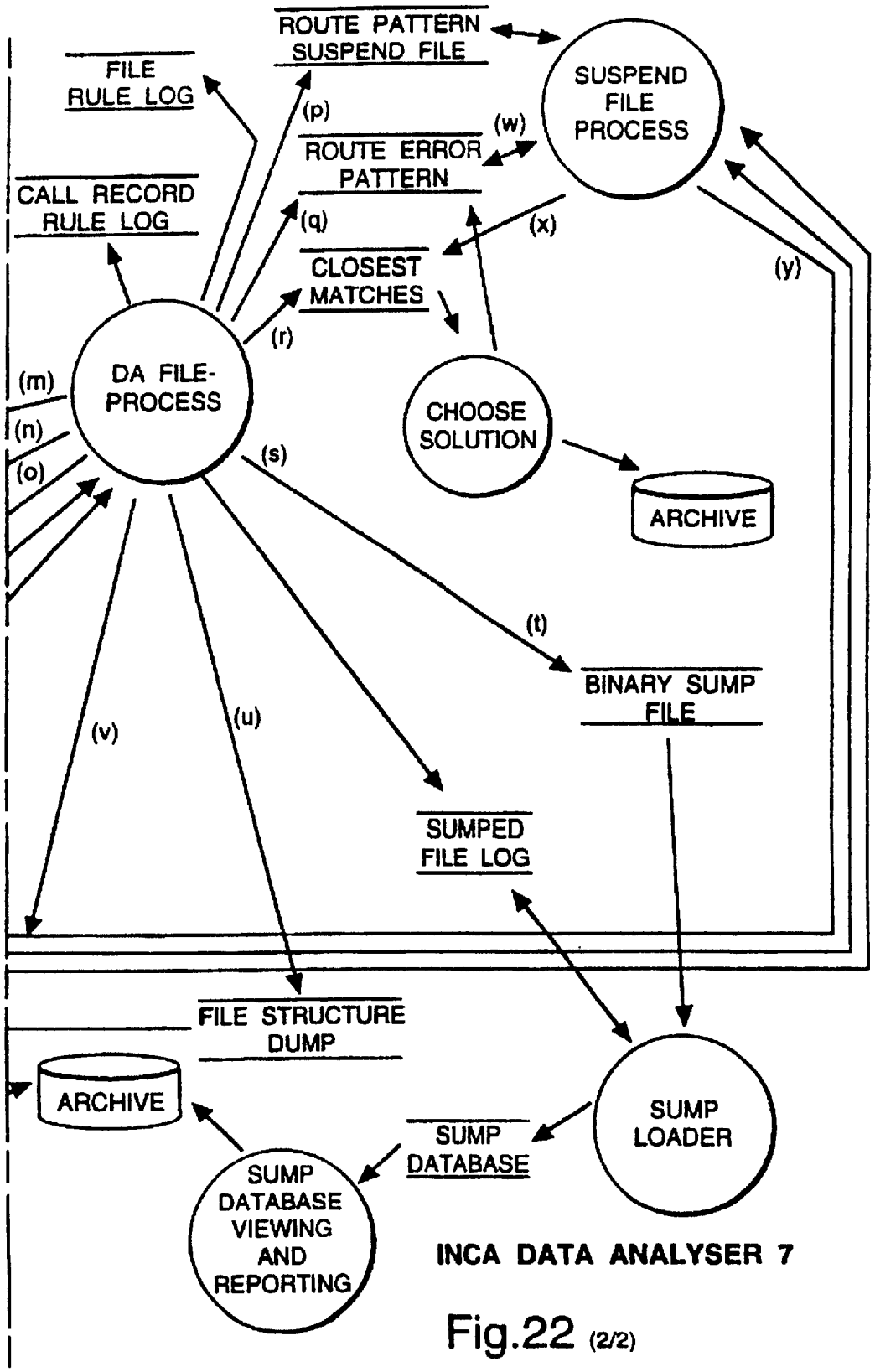
Fig.22 (2/2)

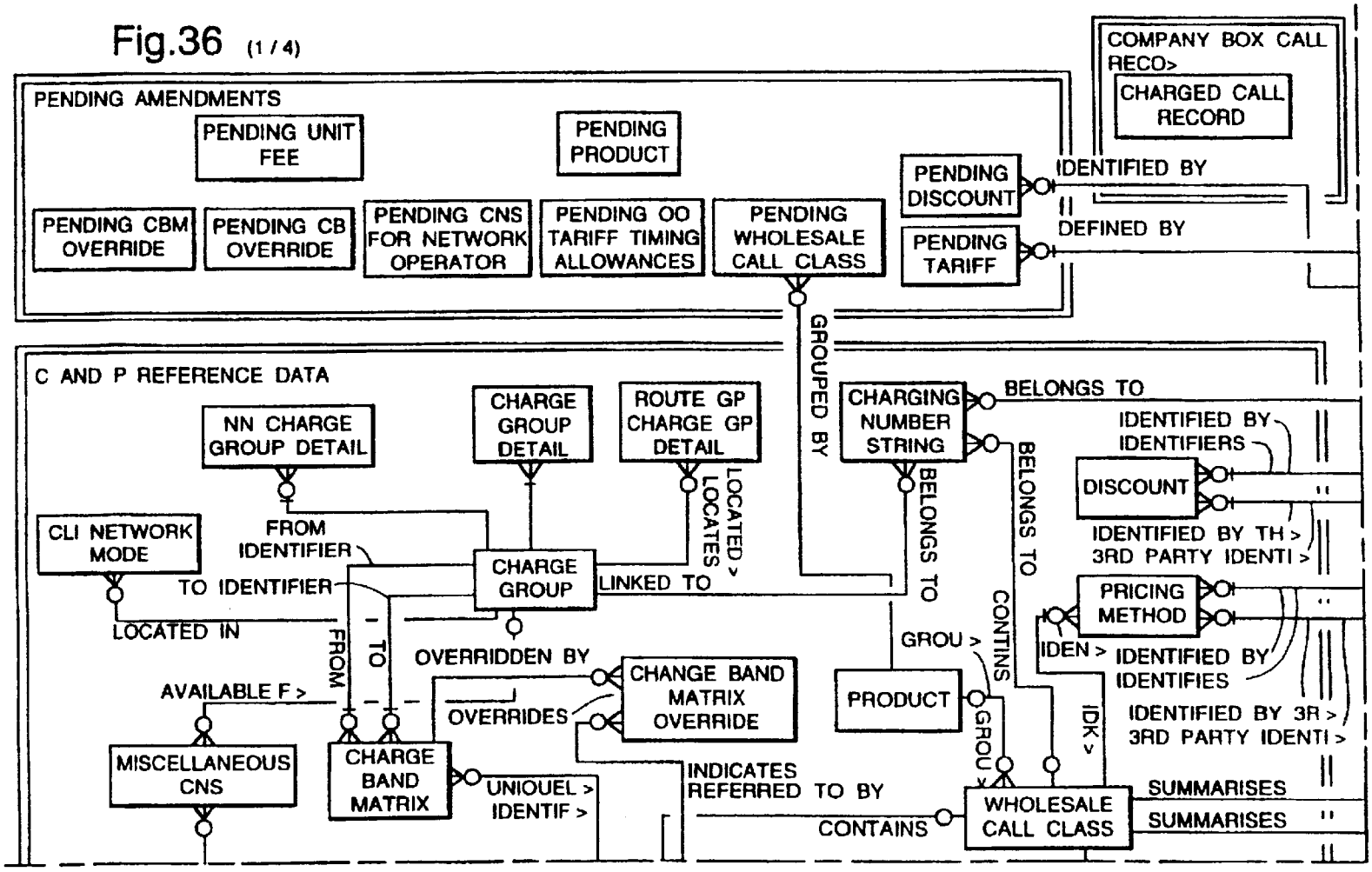
Fig.36 (1/4)

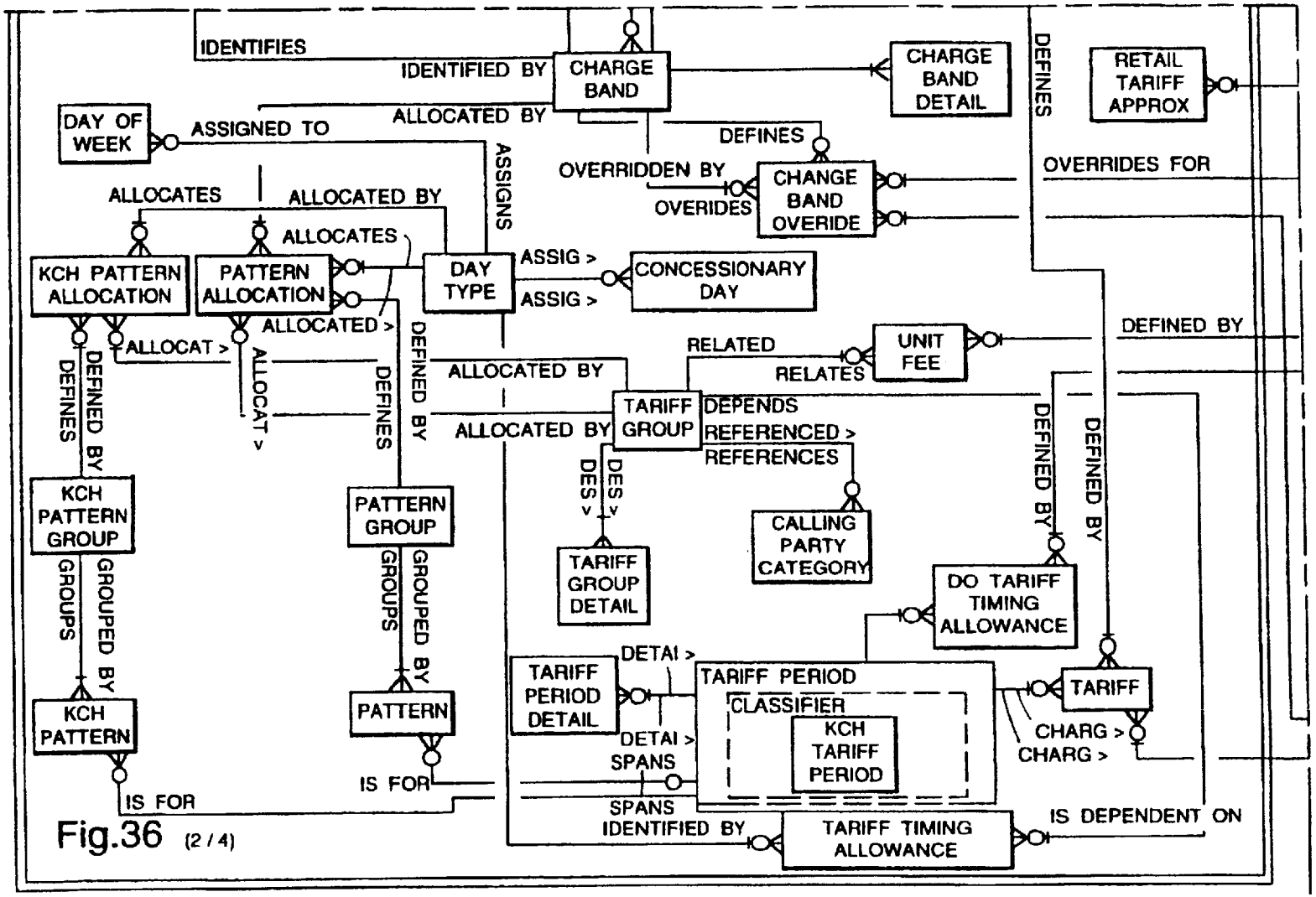
Fig.36 (2/4)

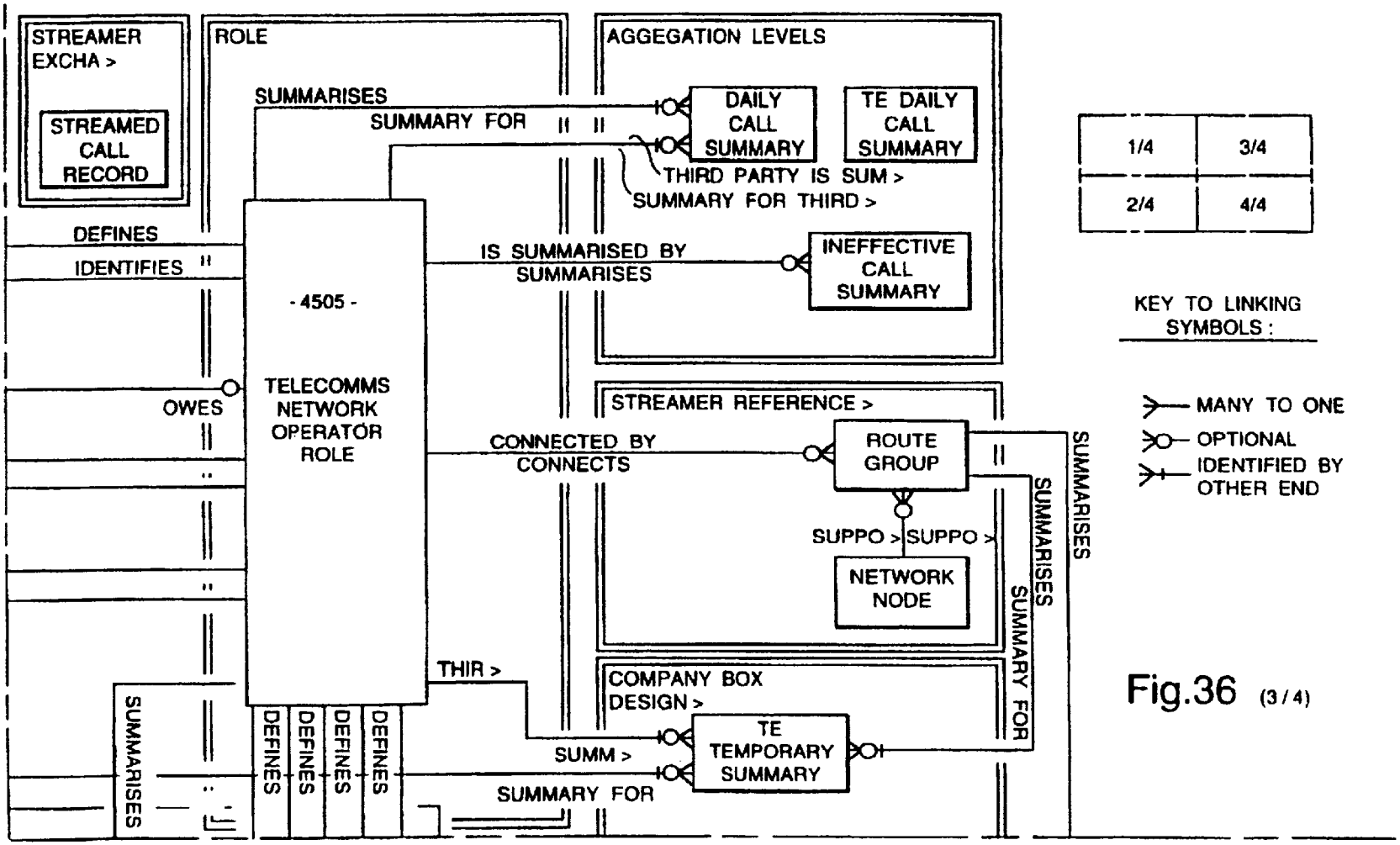
Fig.36 (3/4)

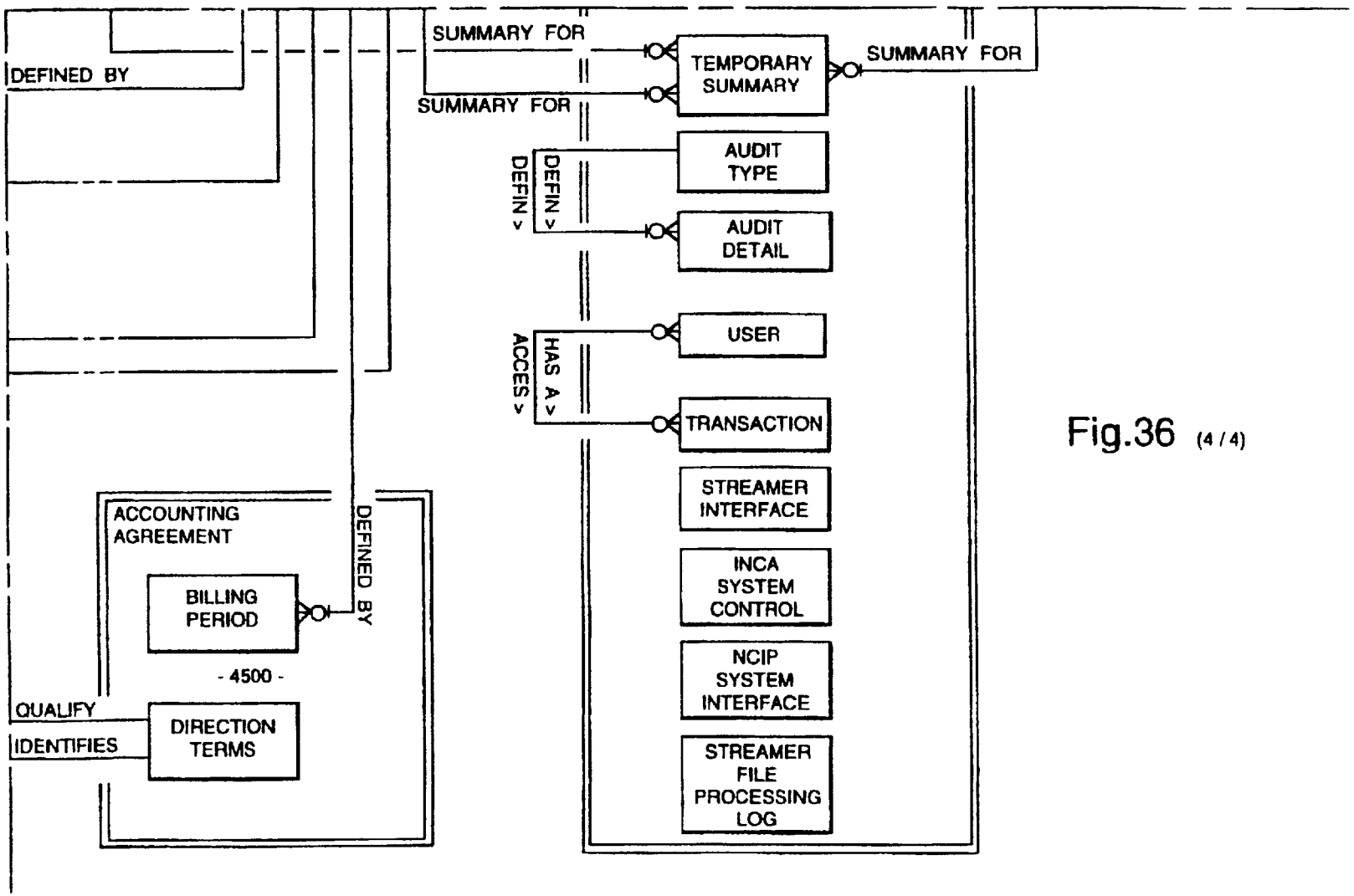
Fig.36 (4/4)

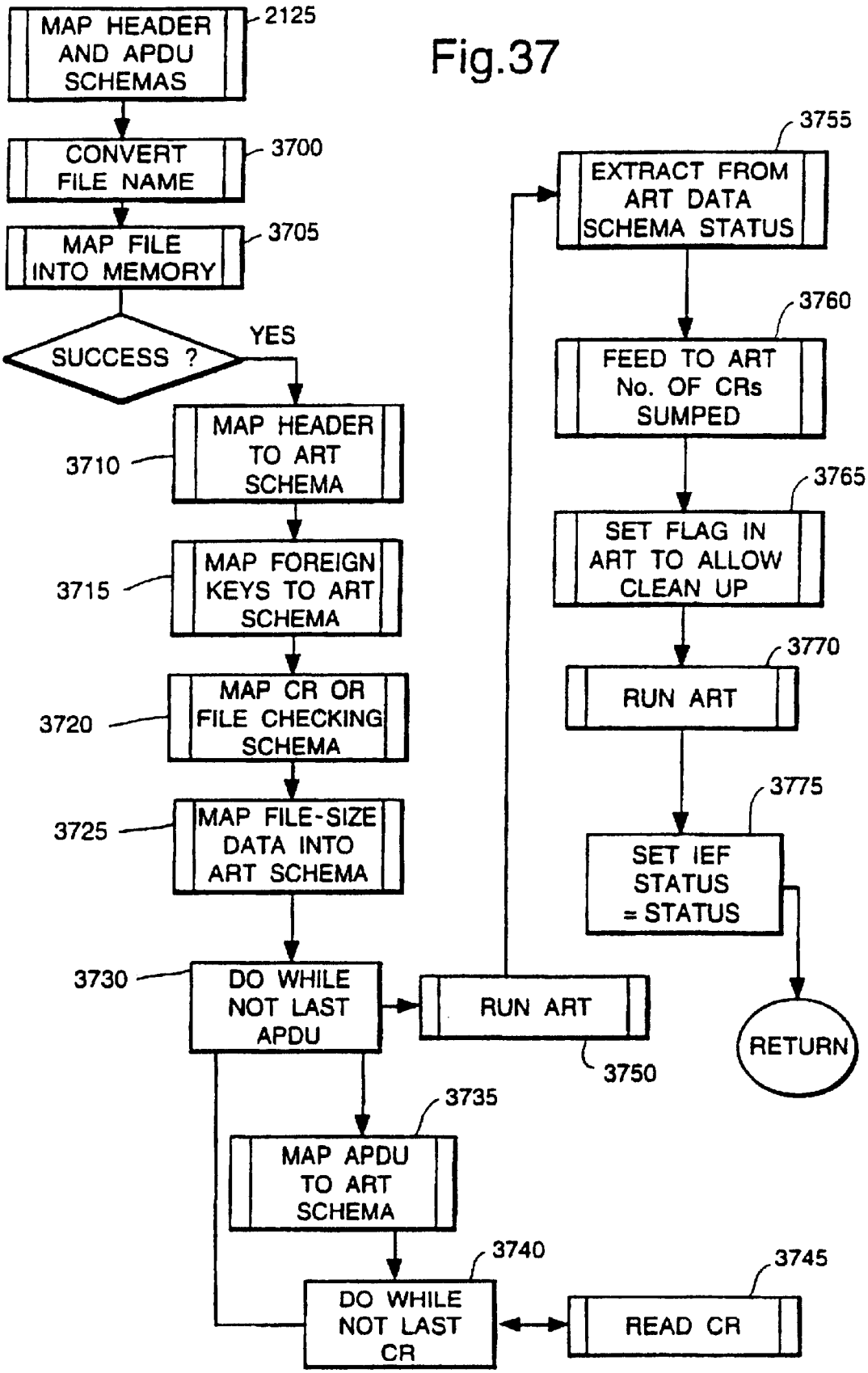
Fig.37
MAP HEADER AND APDU SCHEMAS
2125
CONVERT FILE NAME
3700
MAP FILE INTO MEMORY
3705
SUCCESS ?
YES
MAP HEADER TO ART SCHEMA
3710
MAP FOREIGN KEYS TO ART SCHEMA
3715
MAP CR OR FILE CHECKING SCHEMA
3720
MAP FILE-SIZE DATA INTO ART SCHEMA
3725
DO WHILE NOT LAST APDU
3730
RUN ART
3750
MAP APDU TO ART SCHEMA
3735
DO WHILE NOT LAST CR
3740
READ CR
3745
EXTRACT FROM ART DATA SCHEMA STATUS
3755
FEED TO ART No. OF CRs SUMPED
3760
SET FLAG IN ART TO ALLOW CLEAN UP
3765
RUN ART
3770
SET IEF STATUS = STATUS
3775
RETURN

DATA CORRECTION SYSTEM FOR COMMUNICATIONS NETWORK

Matter enclosed in heavy brackets [ ] appears in the original patent but forms no part of this reissue specification; matter printed in italics indicates the additions made by reissue.

RELATED APPLICATION

This application is related to my copending commonly assigned application Ser. No. 08/392,976 filed 6 Mar. 1995.

BACKGROUND OF THE INVENTION

1. Field of the Invention

The present invention relates to a data correction system for use in data collection and processing in multi network communications.

2. Related Art

Where communication instances, for instance telephone calls or data transfers, occur within a single network, it is known to log and process data related to those communication instances. Commonly, in a public switched telephone network (PSTN), data will be collected concerning call duration, and processed with respect to at least time of day and call type, so that the network operator can generate an item on a bill destined for the subscriber who initiated a call.

Over recent years, the data systems for PSTNs have necessarily become increasingly complex as the choice of service and call type available to subscribers has greatly increased. For instance, with the introduction of 0800 numbers, it is no longer the initiating subscriber who will be billed. Many more complicated services are already being trialled, or available, on PSTNs, such as call forwarding where a call initiated by a first subscriber to a selected number is forwarded automatically by the network to a different number, the difference in cost being borne by the receiving subscriber.

Another aspect of communication networks which is in the course of considerable change is the multiplicity of network operators in existence. In the past, PSTNs have been run primarily by government organizations as part of the national infra structure. Nowadays and increasingly, privatization of the PSTNs and the relaxation of regulatory monopolies means that there are many more network operators available to the subscriber and these network operators must, for practical reasons, provide inter network connection. This means that a network operator must take into account not only communication instances arising in their own network or in a limited number of inter-connected networks of independent but similar administrations, but also communication instances arising in a theoretically very large number of competing networks of different types and providing a wide variety of services to subscribers.

It is, therefore, of increasing importance that data be collected and processed in connection with communication instances arising outside an operator's network but terminating in or simply crossing the operator's network.

When calls pass through the network of more than one operator, price and charging agreements between operators for the carriage of each other's calls come into play. Such arrangements can vary from the simple Sender Keeps All (SKA) arrangement to complex pricing formulae.

It has been an established practice between separate network operators or administrations, in telecommunications, that call data would be collected by the administration responsible for the network in which a call arises. If that call then terminates in a second network, the administration concerned with the second network relies on the data collected by the administration responsible for the first network, for instance for accounting purposes. However, the telecommunications environment is changing quickly, politically as well as technically. With the advent of greater competition, it is increasingly attractive to network administrations to monitor not only traffic arising in their own network but also traffic arising elsewhere but crossing or terminating in their own network. If the network in which traffic arises belongs to a competing operator or administration, it is desirable that it is at least possible to cross check the competing operator's accounts.

In known arrangements, data collection points concerning calls in a PSTN have been at local exchanges of a network since the local exchange picks up traffic as it arises. This arrangement, however, does not provide for data collection with respect to inter-network traffic. Even were there to be data collection points to collect data on calls incoming to a network, the logistics involved in processing such data to any level of detail are daunting. For instance, it has been estimated that calls Incoming to the PSTN operated in Britain by British Telecommunications plc (BT) from other network administrations including the Isle of Man and the Cellnet cellular network totalled 15.4 million calls per day in the twelve months prior to March 1992. This figure is expected to increase to the order of 27 million calls a day in the year prior to March 1995. Taking all call instances into account, including those arising within the BT PSTN, 60 million call instances per day have been predicted for 1995.

SUMMARY OF THE INVENTION

In spite of the very large quantity of data involved, it has been found possible in making the present invention to design a process for collecting and processing data relating to calls incoming to a major telecommunications network, the British PSTN, which can produce an output in sufficient detail to allow the associated network administration to generate account information which not only can be allocated to outside network administrations appropriately, but also supports itemized billing. That is, the account information can be broken down in sufficient detail even to identify individual calls, so far as they fulfil preselected criteria, in the manner of itemized billing currently available in the national billing system for the British PSTN from British Telecommunications plc.

According to a first aspect of the present invention, there is provided a process for collecting and processing data concerning communication instances in a first communications network, wherein the network includes at least one point of connection, either directly or indirectly, to a second communications network, by means of which point of connection a communication instance arising in said second network can be transmitted into, and either cross or terminate in, said first network, the process comprising the steps of:

i) collecting data at a data access point at said point of connection, said data concerning a communication instance arising in said second network and comprising route information and at least one parameter measurement, for example duration, with respect to said communication instance;

ii) transmitting said data into a data processing system; and iii) processing said data.

By collecting the data at a point of connection between the first network and another network, it becomes available to the administration associated with the first network to obtain first hand information about communication instances incoming to the first network, and thus potentially to cross check data provided by other network operators or administrators.

According to a second aspect of the present invention, there is provided a data processing arrangement, for processing data collected in a PSTN at a point of connection with another network, the arrangement comprising:

i) a data input for inputting data concerning communication instances from a communications network, said data comprising at least one of a plurality of sort characteristics;

ii) verifying means for checking the integrity and sufficiency of data received at the data input;

iii) a data analyzer for analyzing data rejected by the verifying means, and for submitting amended or default data to the verifying means;

iv) pricing means for pricing verified data which has been output by the verifying means, in accordance with updatable reference information; and v) output means for outputting priced, verified data from the pricing means into memory locations, each memory location being dedicated to data relevant to one or more of said sort characteristics.

Preferably, the pricing means can also validate data, and output errored data to a data analyzer, which may be the above data analyser or a different one, so that data which has been corrupted can potentially be reformatted, or otherwise corrected, and, therefore, re-entered to the system as a valid record of a communication instance.

It may also (or alternatively) be that this further data analysis step is used to analyse the data with respect to a different type of fault. For instance, data analysis carried out on errored data which has been located by the verifying means might be errored principally in respect of format and routing information while the errored data from the pricing means might be errored principally in respect of pricing information.

An important part of processes and data processing arrangements, such as those described above as the first and second aspects of the present invention, is the data analyzer used therein.

According to a third aspect of the present invention, there is provided a data analyzer, for use in a communications network, which network is connected to one or more other networks, the data analyser comprising an input for data collected with respect to said network, said data having been rejected by validating means associated with said network means for assessing the type of invalidity arising in the data, and means for dealing with the data accordingly, the said means for dealing with the data comprising means for applying default values, means for applying amended values, and means for appending data to files in a temporary data store, each file having data appended thereto which shows a characteristic error pattern, the arrangement being such that all the data appended to one file in the temporary data store can be corrected in a similar manner for instance, by means of updating reference information in relation to said error pattern.

The sort characteristics will typically be such that the memory locations each hold data relevant to communication instances which will be billable to a common accounting entity, for instance, arising in a common respective communications network.

The sort characteristics might be applied at any one of several stages of the data processing arrangement described above. However, in a PSTN for example, the nature of errored data usually arising makes it preferable to provide sorting means between (iii), the data analyzer associated with the verifying means, and (iv), the pricing means. The pricing means therefore acts on data already sorted. If the sort characteristics relate to the different entities who will be billed in respect of the communication instances represented by the data, then this arrangement can also have the advantage that the pricing means can potentially be simplified in applying constraints relevant to individual entities.

It might be noted that a network such as the BT PSTN comprises both local and trunk exchanges and provides not only inter-exchange call transmission but also local call delivery to the end user. This means that the data collection and processing necessary to support billing or bill verification has to be sufficiently complex to deal with an extremely wide range of variables. This is in contrast to the situation where a network provides only inter-trunk exchange transmission, or only the local call delivery.

BRIEF DESCRIPTION OF THE INVENTION

A system according to an embodiment of the present invention is now described, by way of example only, with reference to the accompanying drawings, in which:

FIG. 8 shows a schematic diagram of batch array processing architecture for use in the company system of FIG. 7;

FIGS. 9 and 10 show an exchange file and Advanced Protocol Data Unit (APDU) format, in connection with polling of data from exchanges for use in the system of FIG. 1;

FIGS. 11 to 21 show flow diagrams for use in a streamer and data analyser of a system according to FIG. 1;

FIG. 22 represents process interactions between elements of the system in FIG. 1;

Figure 1:
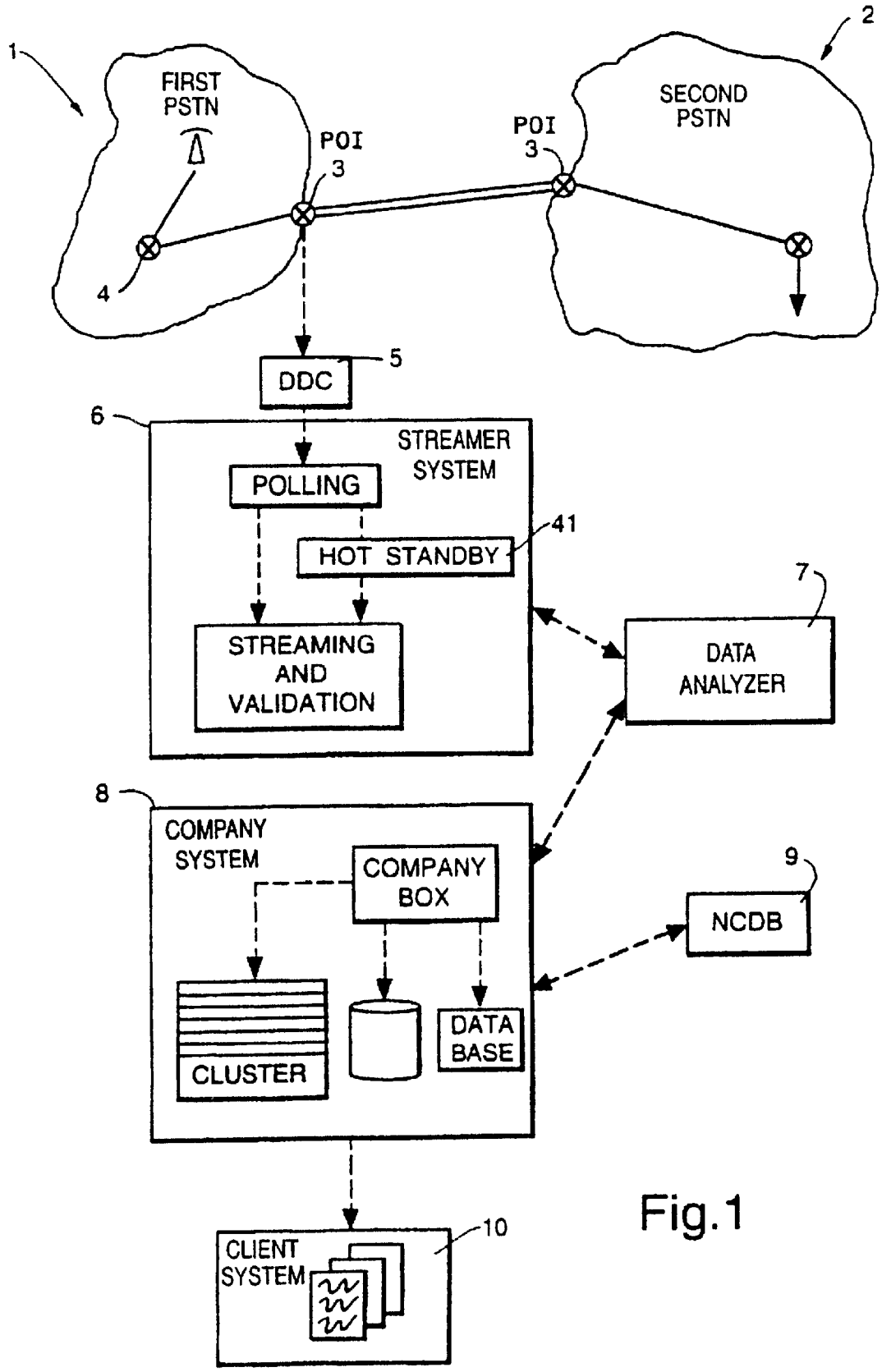
FIG. 1 shows diagrammatically the architecture of a system for collecting and processing data comprising call information so as to support an accounts system for call instances incoming to a telecommunications network.
Figure 31:
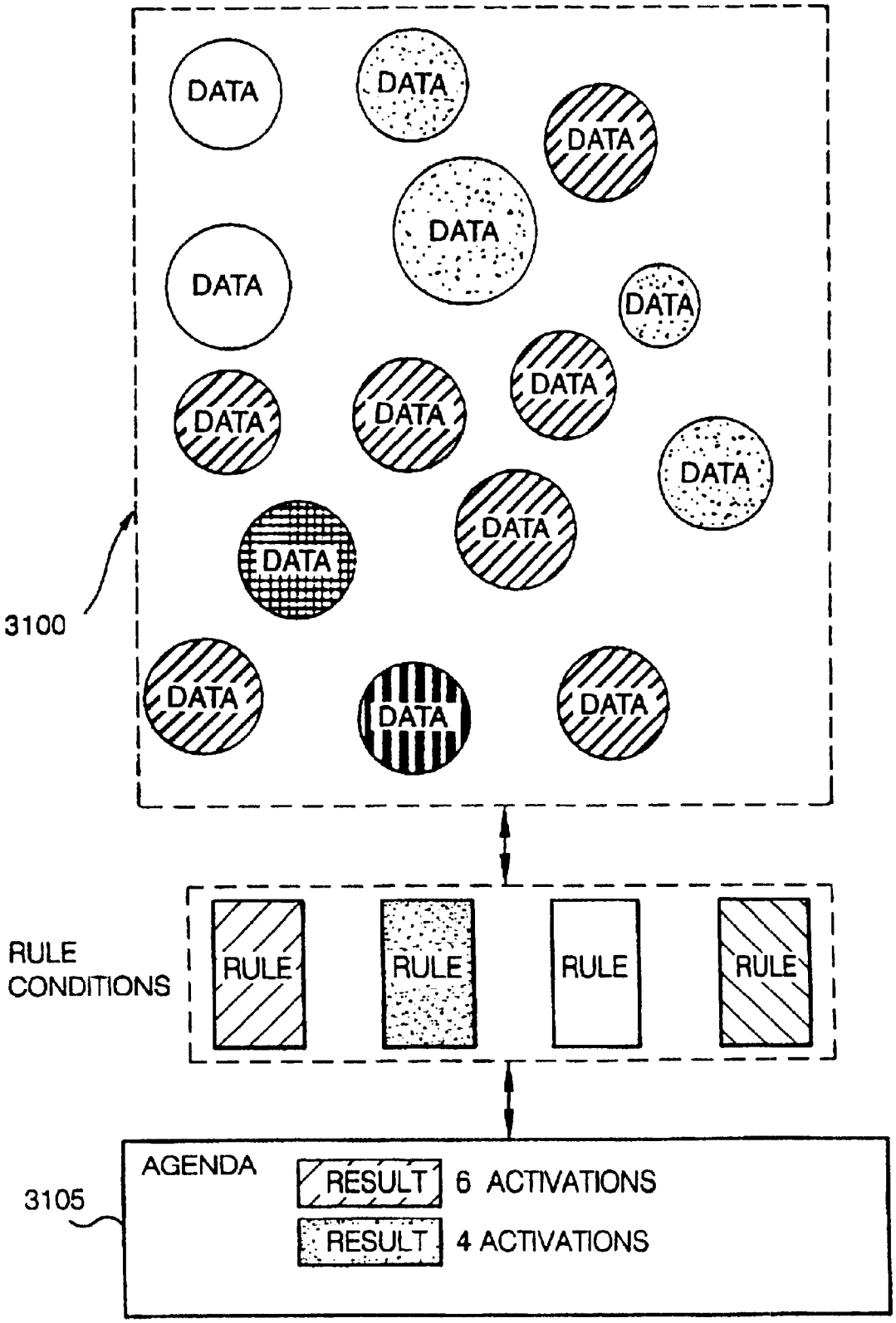
Figure 32:
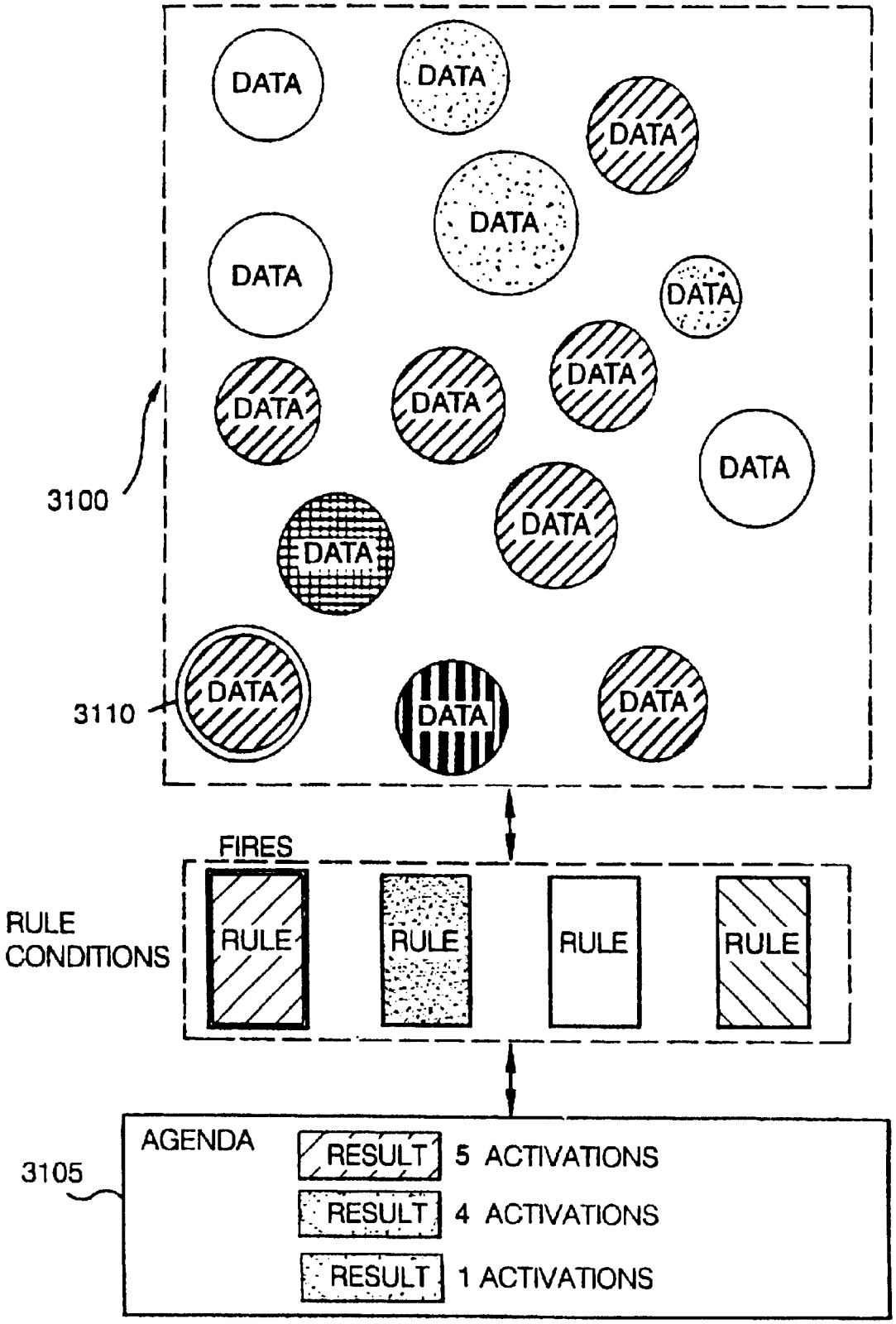
Figure 33:
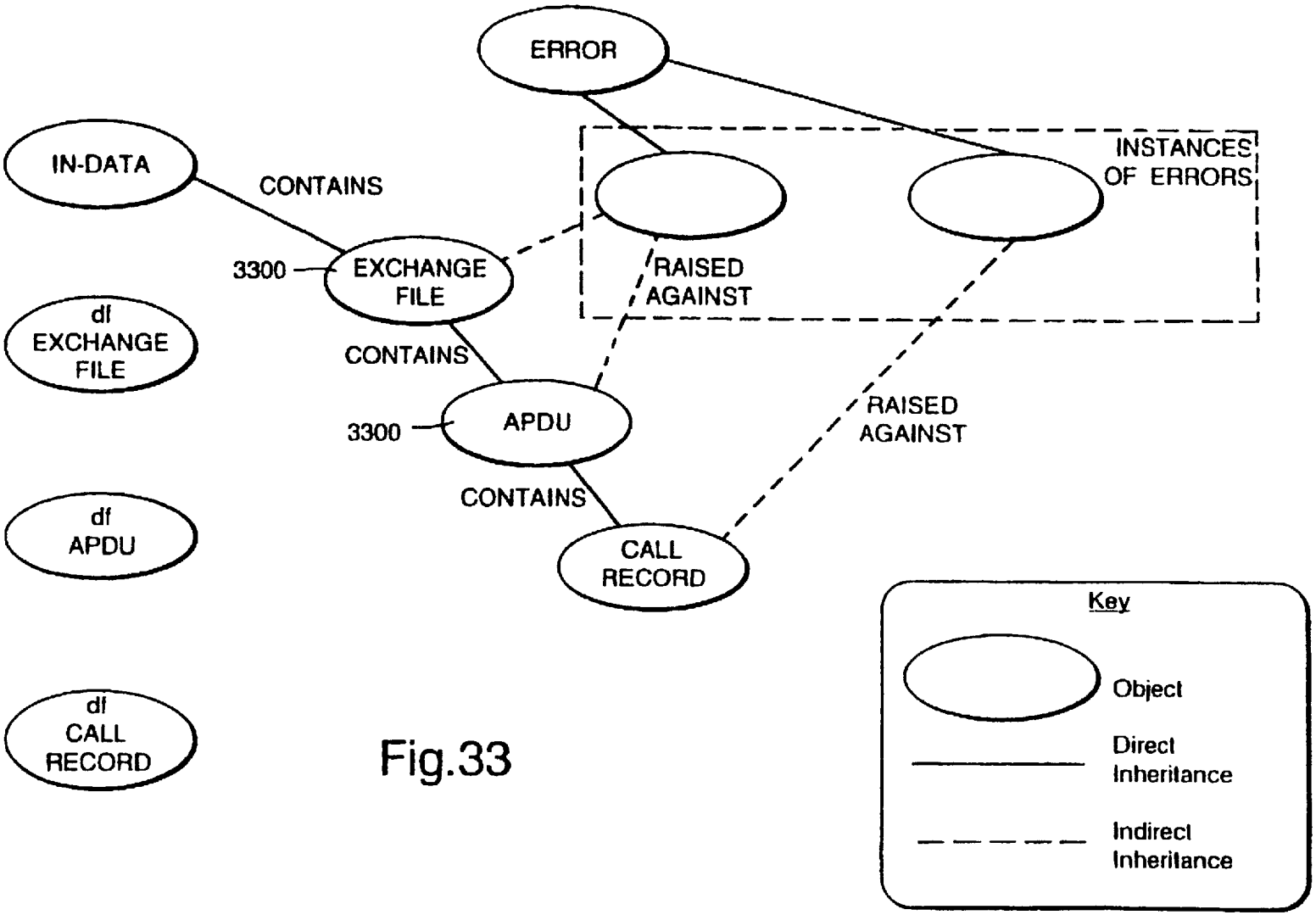
Figure 34:
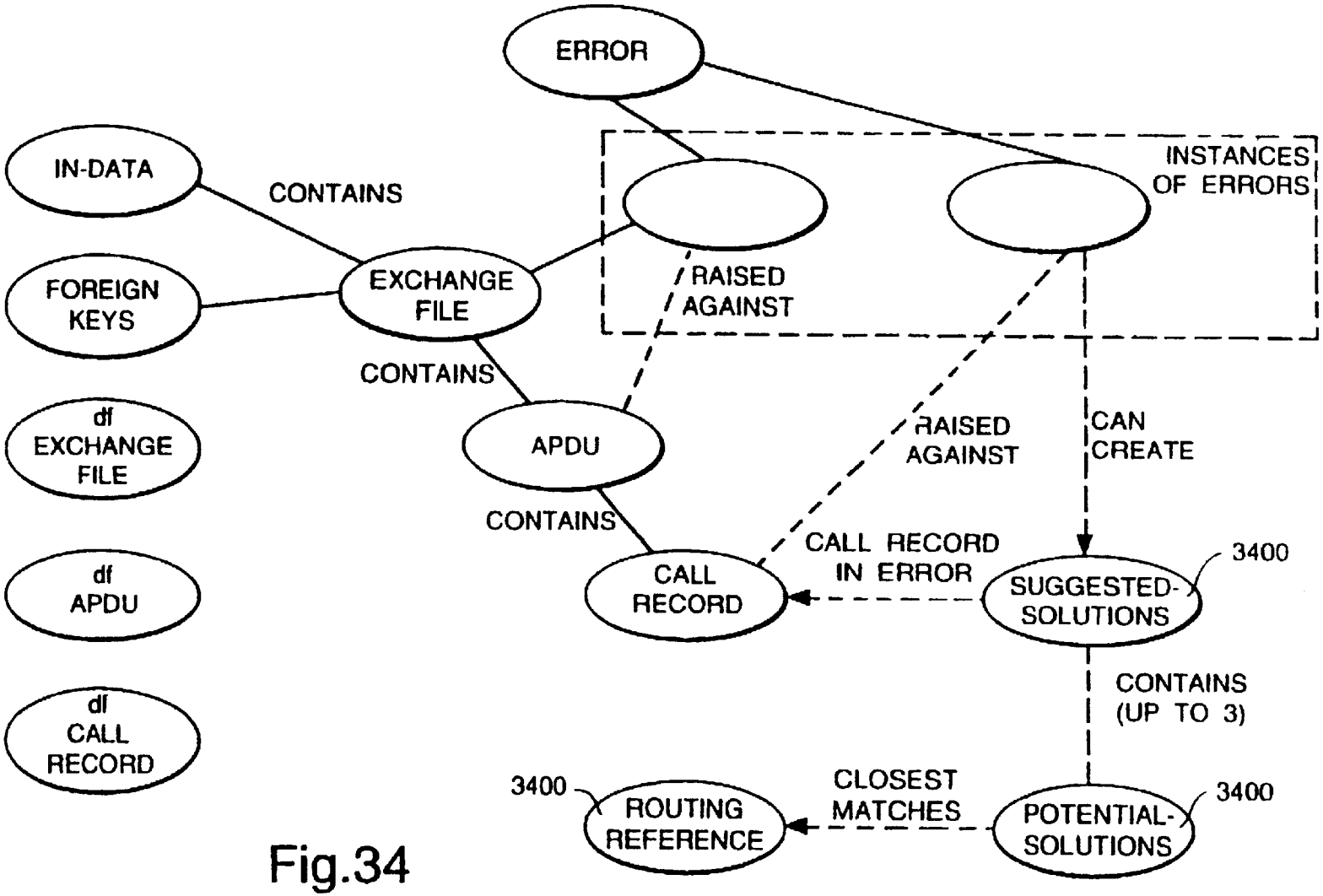
Figure 35:
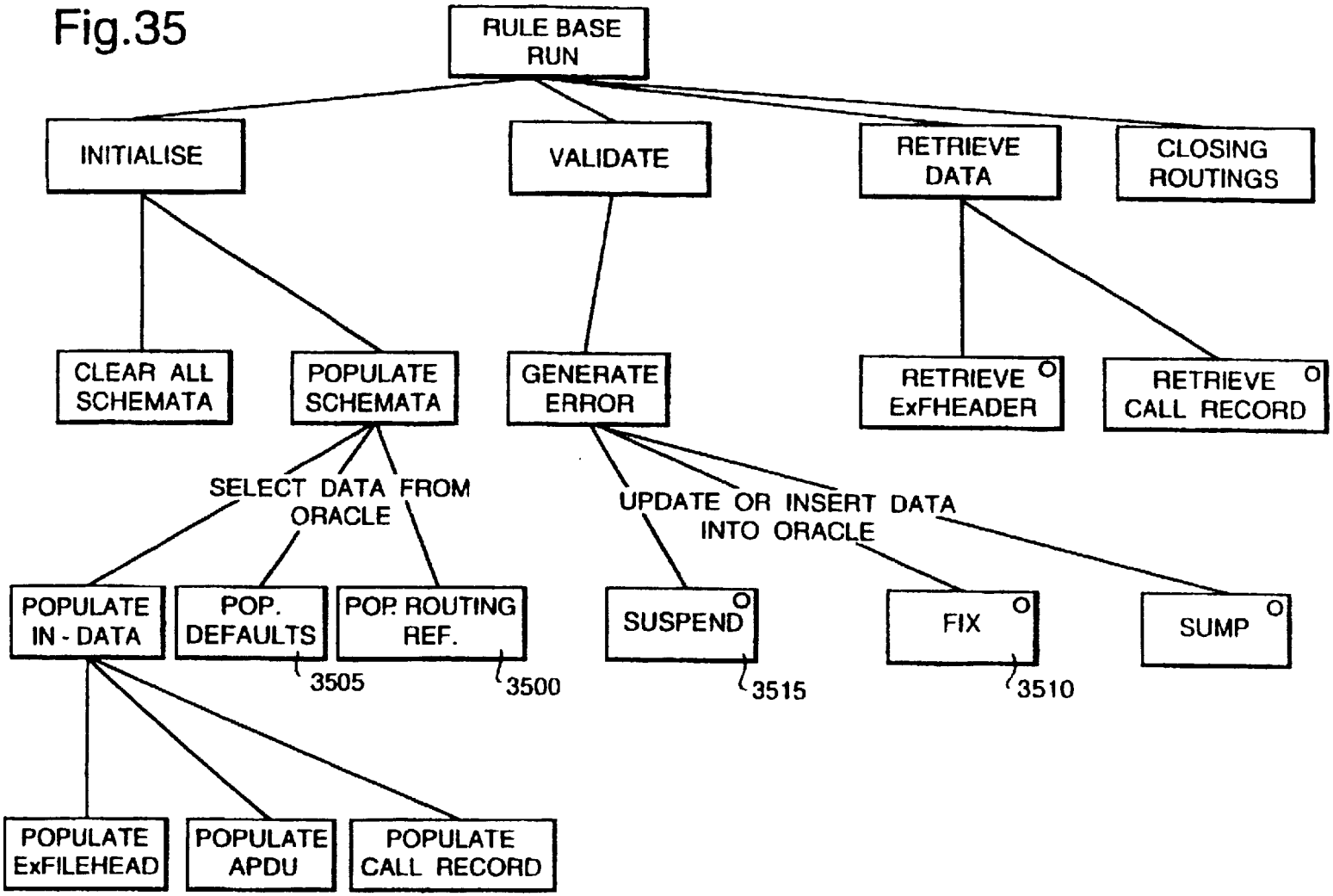
Figure 44:
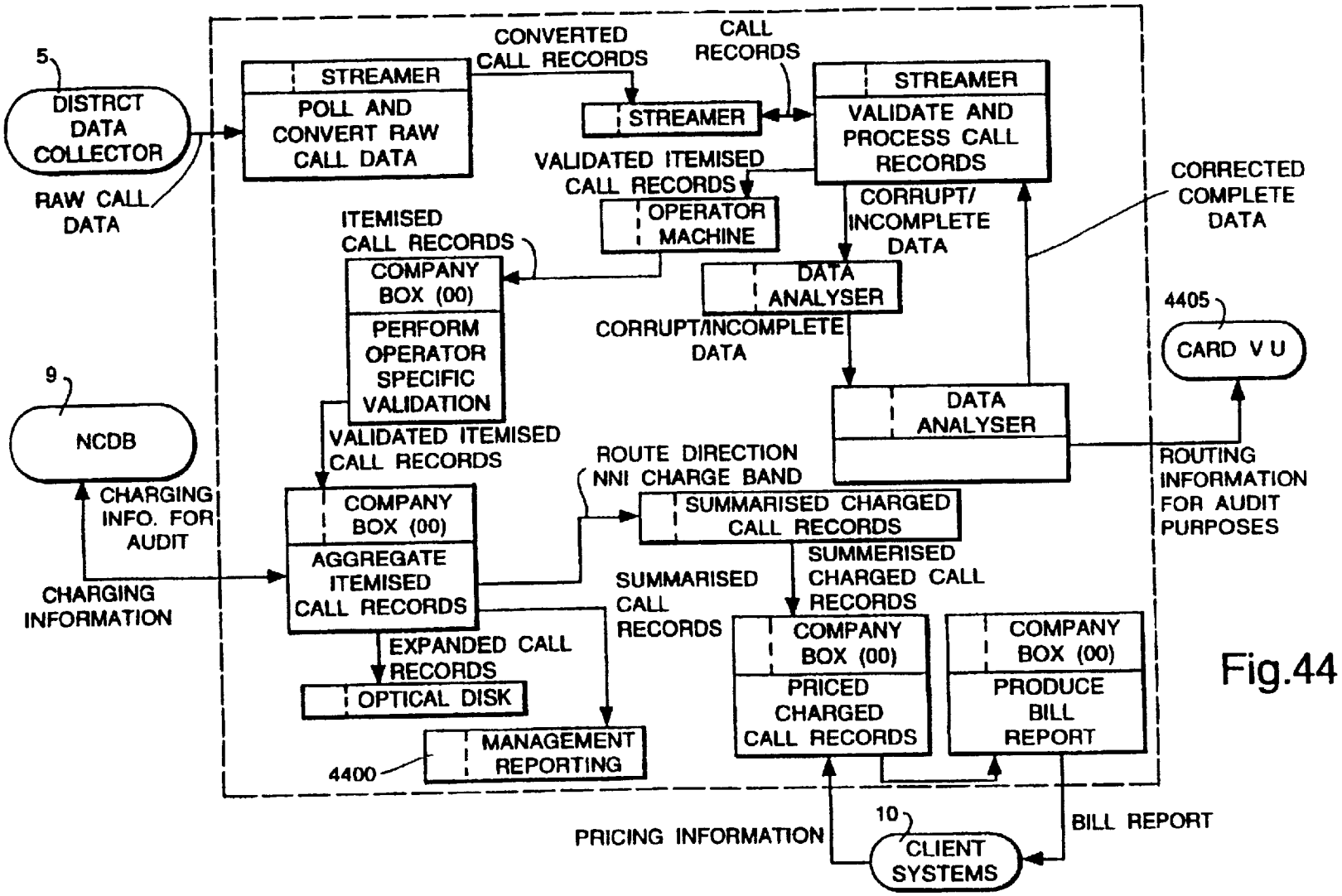

FIGS. 23 to 30 provide entity life history diagrams, showing the status that a record within each entity might be in, and from that status which other statuses can be reached by which actions;

FIGS. 31 and 32 represent the state of an agenda, and a pattern net, following data population and firing of a rule, in an expert system for use in the system of FIG. 1;

FIGS. 33 and 34 show object hierarchies, for a rule base system and case base system respectively, for use in a data analyser of a system according to FIG. 1;

FIG. 35 shows design principles involved in building an expert system/ORACLE interface for a data analyser in a system according to FIG. 1;

FIG. 36 shows a data model for a company system for use in a system according to FIG. 1;

FIGS. 37 to 43 show flow diagrams relevant to operation of a data analyser for use in the system of FIG. 1; and FIG. 44 shows data flow, with emphasis on data relevant to a company system for use in a system according to FIG. 1.

DETAILED DESCRIPTION OF EXEMPLARY EMBODIMENTS

In some parts of the following description and Figures, the terms "INCA" and "DA" may have been occasionally used. These stand for Inter-Network Call Accounting, a description of the whole system, and for INCA Data Analyzer. The latter is a reference to the data analyser 7 comprising an expert system and interfacing with the Streamer 6.

Figure 2:
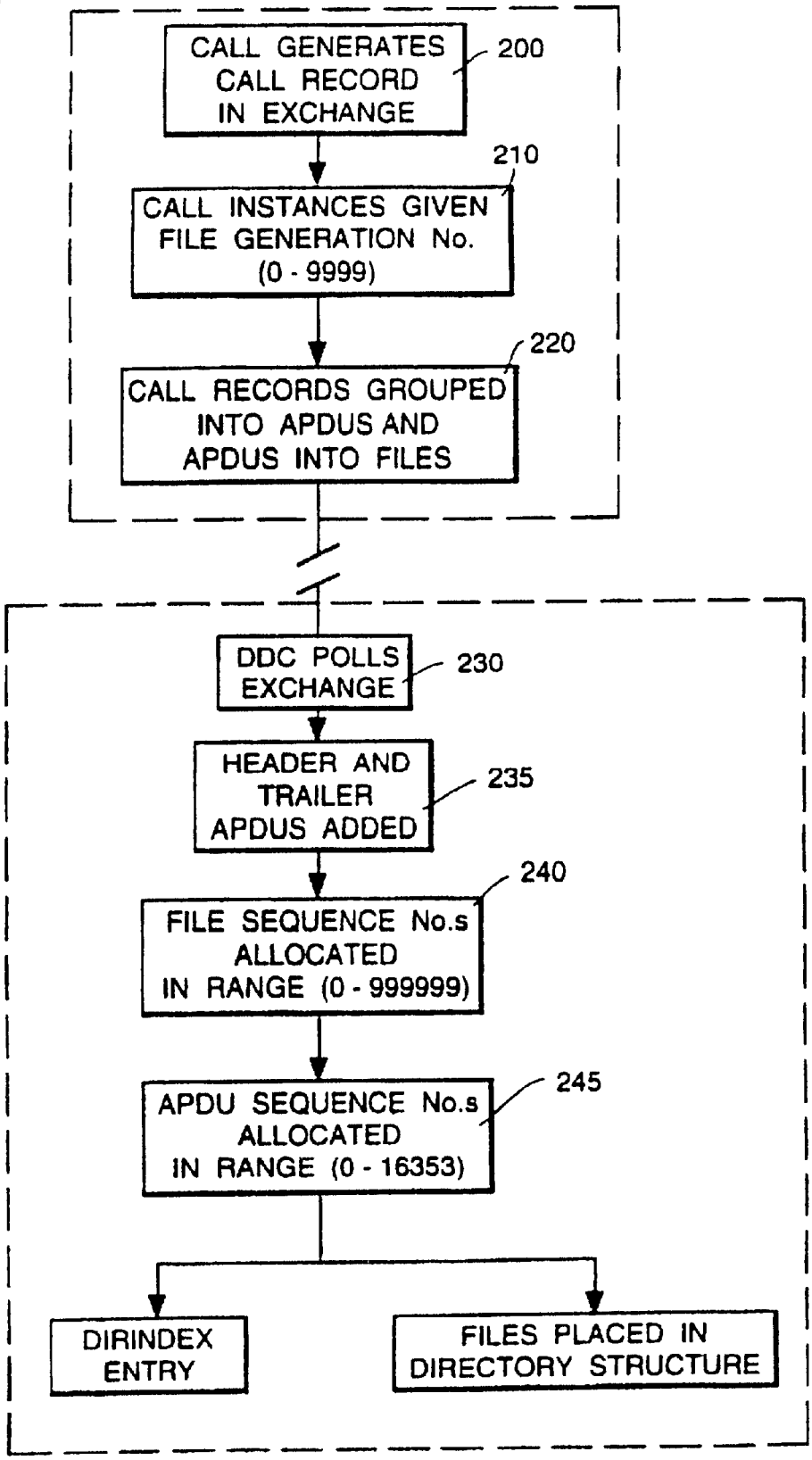
FIGS. 2, 3 and 4 show overview flow diagrams for a system as shown in FIG. 1.
Figure 3:
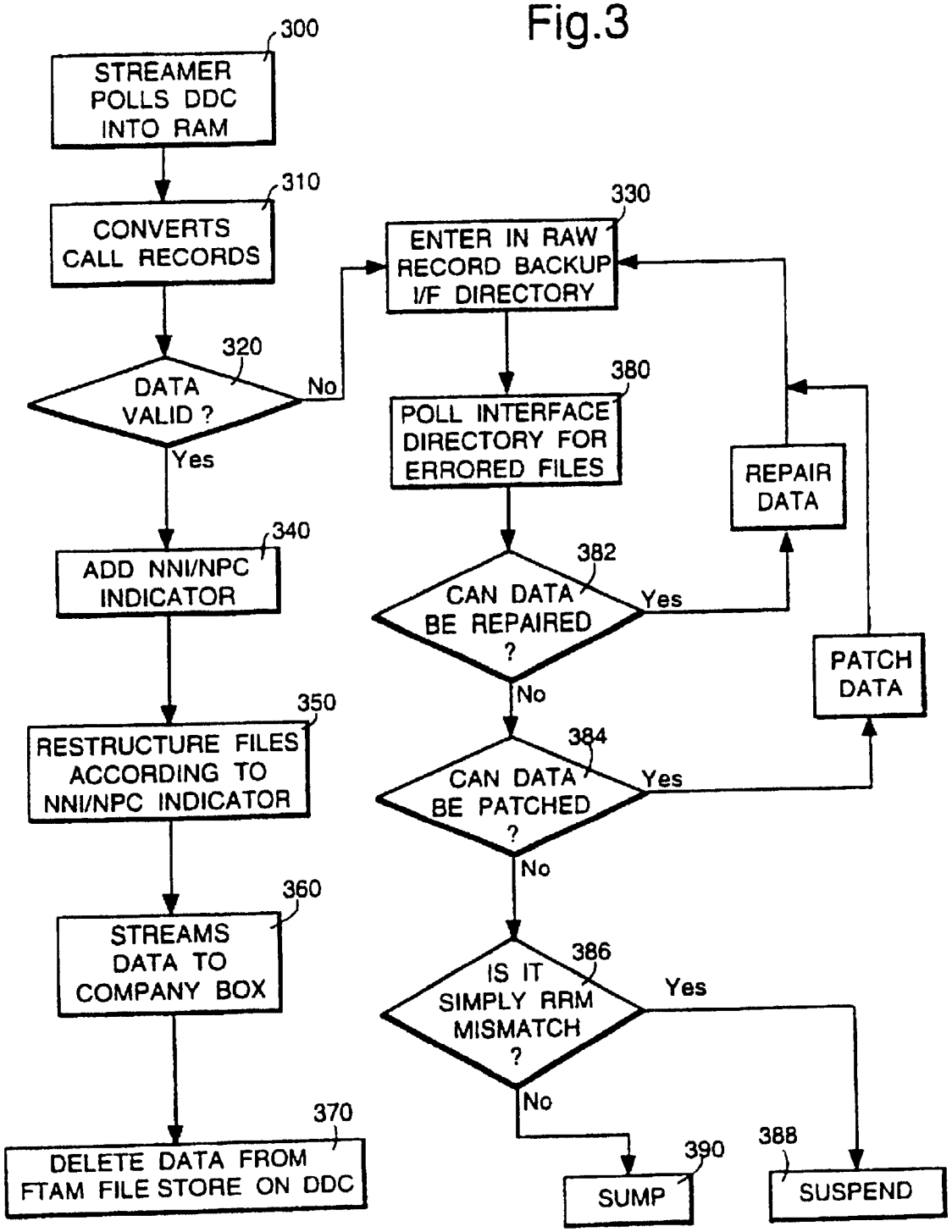
Figure 4:
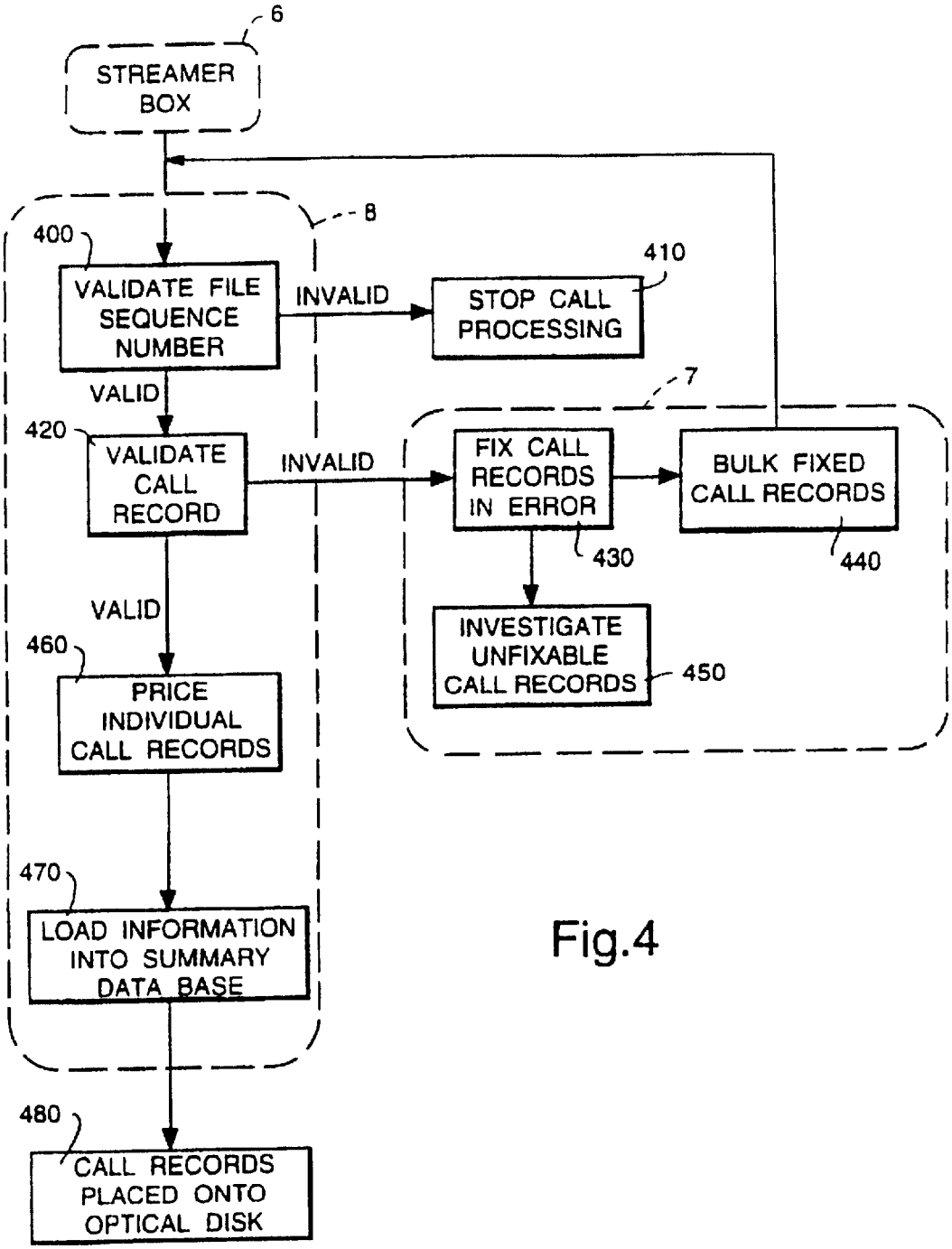
Figure 10:
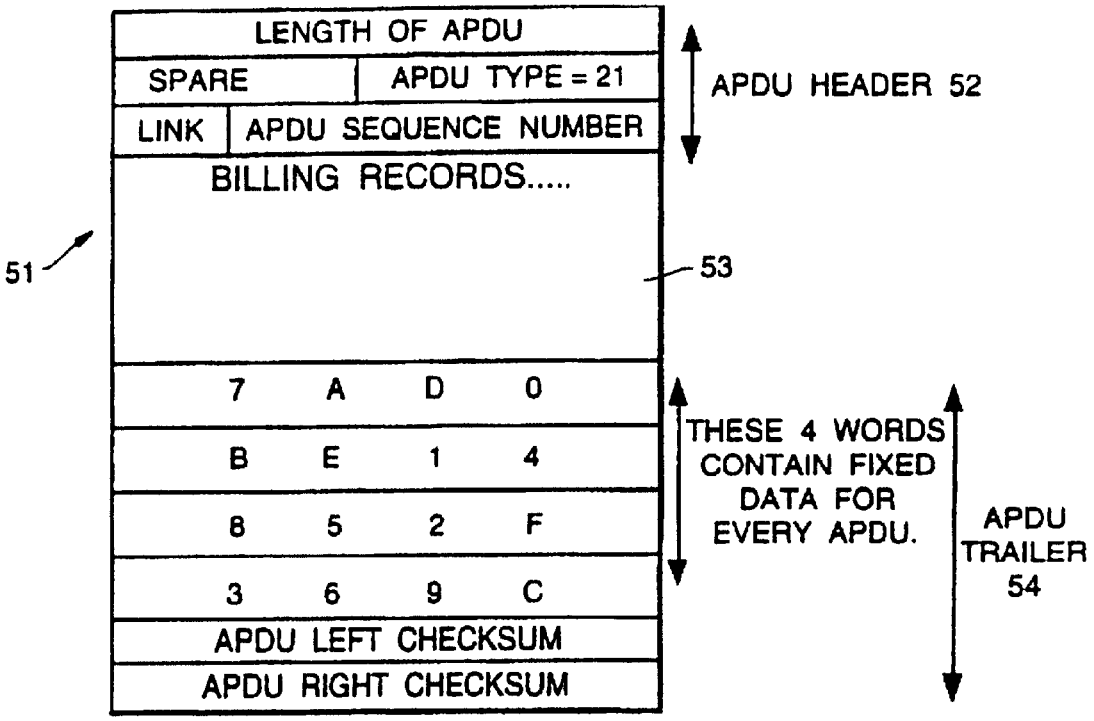

The description below is set out in the following manner:

1. FIG. 1: BLOCK VIEW OF ARCHITECTURE
2. FIGS. 2, 3, AND 4: FLOW DIAGRAMS FOR PROCESS OVERVIEW
   - i) Point of Interconnect and DDC
   - ii) Streamer
   - iii) Company System (or Box)
3. FIGS. 1 AND 5 TO 8: HARDWARE, COMMUNICATIONS AND SOFTWARE ARCHITECTURES
   - i) POI and DDC
   - ii) Streamer and Data Analyser
   - iii) Company System
   - iv) Client Boxes
4. FIGS. 9 AND 10: CALL RECORDS AND DATA FORMATS
   - i) Call Records
   - ii) Mapping Data Structures onto Exchange Data
5. FIGS. 11 TO 19, AND 22 TO 30: MORE DETAILED FLOW DIAGRAMS FOR STREAMER AND DATA ANALYSER PROCESSES
   - i) Streamer: DDC Polling
   - ii) Streamer: FILE PROCESS
   - iii) Streamer: DDC Deletion
   - iv) Data Analyser: Process
   - v) Entity Life Histories
6. FIGS. 31 TO 35: EXPERT SYSTEM
   - i) Overview
   - ii) Rule Base Generic Rules
   - iii) Case Base
   - iv) Oracle Interface
7. FIGS. 20, 21 AND 37 TO 43: USE OF EXPERT SYSTEM BY DATA ANALYSER
8. FIGS. 36 and 44: COMPANY SYSTEM, DATA ANALYSIS AND PRICING AND CHARGING
9. AUDIT TRAIL

1. FIG. 1: BLOCK VIEW OF ARCHITECTURE

Referring to FIG. 1, the system is provided so as to collect data in a first network 1, for example the BT PSTN, relating to call instances arising in, or incoming from, a second network 2. The data is collected, at a Point of Interconnect (POI) 3 provided by an exchange of said first network 1, and brought to one of about ten district data collectors (DDCs) 5 in the PSTN. These hold data which comprises route information for each incoming call, thus allowing identification of for instance the intended destination of the call, the carrier from which the call is incoming, itemization data so that each call is treated as an event, and (preferably) calling line identity so that calls which were simply transit calls in the second network 2 can also be accounted accurately with respect to the network in which they arose.

Each district data collector (DDC) 5 is polled by a streamer system 6 which expands and validates the call data at both file and call record level, primarily against the Routing Reference Model. (Although the district data collectors 5 of the BT PSTN pick up the relevant data, their role may equally be provided by other component systems of an accounting arrangement, such as that known as a network mediation processor.) Data which is found invalid by the Streamer 6 is diverted to a data analyzer 7 where a knowledge-based system is used to assess the invalidity and, where possible, reform the data in an attempt to solve the problem. This is an important component of the system since invalid data will generally be lost as an accountable input. Validated data is meanwhile streamed, according to the operator associated with the second network 2 from which the associated call was received, and passed on to the company system 8.

The streamer 6 provides the following functions:

Poll each DDC 5 for files awaiting processing by the data system of the present invention.

Validate the File and its call records against the Routing Reference Model.

Expand the call records and Allocate to the correct Telecom Network Operator.

Reject the invalid data to the IDA 7.

Copy the raw file received from the IDA 7 to the Raw Record Backup interface directory.

Delete the file from the DDC 5 once the data has been secured on the interface directory.

Provide the user with a user interface to enter the Routing Reference Model data Provide a complete audit trail through the streamer.

Provide the user with the ability to monitor the operation and data integrity of the streaming operation.

The data analyzer 7 provides the following functions:

Poll an interface directory for files containing one or more errors.

Hold the incorrect call records in a suspense area if they are valid call records but do not match the Routing Reference Model.

Provide a user interface so that users can re stream the data after the Routing Reference Model has been updated.

Apply default call record values to fields that are incorrect in accordance with the rules specification.

Stream any correct data that has not been streamed already, due to the error thresholds being exceeded.

Stream any corrected data.

Provide a complete audit trail through the IDA 7 at a call record level.

The company system 8 also nowadays has an important role to play because it is the company system which imports factors derived not only from call parameters but also from the relationship between the operators of the two interconnected networks 1, 2. The impact a call will have in an accounting procedure will be partly determined by such factors as the "service level agreement" between the relevant operators. It is at the company system 8 that these factors are brought into play, by reference to various information sources which may include look-up tables and/or the National Charging Database (NCDB)9. With particular regard to the latter, account is also taken here of for instance time-varying charge rates.

The output from the company system 8 is thus finally information for use in an accounting system, representing the raw call data collected from the point of connection 3, and processed with reference to the relevant parameters, such as operator-specific and time-varying parameters, which should apply. This output is provided to a client system 10 which gives user access by means of a personal computer.

2. FIG. 2, 3 AND 4 : PROCESS OVERVIEW

Referring to FIGS. 2, 3 and 4, flow diagrams can be used to give a process overview of the above, in operation in response to a call instance.

2 (i) POINT OF INTERCONNECT AND DDC

FIG. 2 shows process steps carried out by the POI exchange 3 and by the DDC 5 in response to an incoming call. All these steps are known, the exchange 3 and DDC 5 being unmodified for the purposes of the present invention.

Referring to FIG. 2, a call incoming to or outgoing from the relevant network 1, at step 200 generates a call record in the POI exchange 3. At step 210, the exchange 3 gives every call instance a "File Generation Number" in the series 0–9999. At step 220, the exchange 3 groups the call records into Advanced Protocol Data Units (APDUs), and groups the APDUs into files.

At step 230, the DDC 5 polls the exchange 3 for all call record data in APDU format. At step 235, the DDC 5 adds control data in the form of a header APDU and a trailer APDU. The DDC 5 also, at step 240, gives each file a file sequence number in the range from 0–999999, and at step 245 gives each APDU an APDU sequence number in the range 0–16353, APDUs being in binary format. At step 250, the DDC 5 places the files in a directory structure, from which the Streamer 6 is able to pick them up by polling. At the same time, at step 260, an entry is made for the file, in a catalogue file which is called DIRINDEX. This catalogue file contains a list of all files available to be polled by the Streamer 6.

2 (ii) STREAMER

Referring to FIG. 3, at step 300, the Streamer 6 polls the DDC directory structure periodically, entering the call records into a random access memory (RAM), each file being loaded into 1 Mbyte. This polling process includes the step of copying the latest DIRINDEX file. At step 310, which can be in practice part of the DDC polling process at step 300, the data is converted from binary to ASCII (American Standard Code for Information interchange) format.

At step 320, the Streamer 6 carries out validation of the call records. If a call record is incomplete or incorrect so that it cannot be verified, instead of proceeding to subsequent processing steps in the Streamer 6 and ultimately to a billing process, it is diverted to an interface directory (step 330) for further analysis in the incorrect data analyser 7.

Valid data however progresses, at step 340, to an identification process in which data in the call record is used to establish what other network the call originated in, or entered the BT PSTN from, or in some circumstances was destined to terminate in. A code representing the relevant network operator for billing is added to the call record and the files are then broken down and restructured, at step 350, according to that code. Hence the call records at this point can be sorted according to the network operator, or other relevant entity, who is liable at least at first instance for the cost of those calls.

At steps 360 and 370, the Streamer 6 then outputs the newly structured files to the Company System 8 and deletes file data from the FTAM filestore on the DDC 5.

Looking at the data analyser 7, this has an important role to play since data which cannot be validated cannot be billed. The data analyser 7, at step 380, polls the interface directory for errored files entered by the Streamer 6 at step 330. The data analyser 7 then has three different chances to put errored data back into the system.

At step 382, it looks to repair the data. If it can, the repaired data is returned to the interface directory, from which the Streamer 6 can pick it up. At step 384, the data analyser 7 looks to apply default values to unrepairable data. Some data elements cannot be "patched" in this manner, for instance because it would affect an audit trail. Lastly, at step 386, the data analyser 7 checks whether there is simply a mismatch between the data and the Routing Reference Model (RRM). The latter is a database giving routing information and is used at the DOC 5 to identify for instance the destination of a call. Copies of the RRM are held at different places in a communications network and, if one copy is updated out of time or incorrectly, can give rise to a mismatch in data. If this appears to be the case, the data analyser 7 enters those call records into a suspend file (step 388) which allows them to be put back into the Streamer 6 process after the RRM has been checked.

If the data analyser 7 cannot deal with the data in any of the above ways, it outputs it, at step 390, to a "sump". This means the data is effectively lost and will never be billed. It might however be useful in analysis so that changes and corrections can be made to the system in the long term.

2 (iii) COMPANY SYSTEM

Referring to FIG. 4, data, at the file level, which has been validated and processed by the Streamer 6 is input to the Company System 8 where the first step, step 400, is validation of the file sequence number. The Company System 8 processes files in file sequence number order, but the Streamer 6 has processed data in parallel from different exchanges 3. If the file sequence number is wrong, the Company System invalidates the file and stops processing it (step 410).

If the file sequence number is acceptable, the Company System 8 moves on at step 420 to validate the call record, this time not primarily in terms of the RRM, as at the Streamer 6, but with more emphasis on data relevant to the billable entity and the relationship between the billable entity and the operator of the first network 1, for instance BT. The billable entity and BT will have entered into a service level agreement (SLA) and the call record might indicate a call type not available to that billable entity under the current SLA. The Company System 8 will pick that up as an invalidity and, at step 430, attempt to fix the call record in error. If the call record can be fixed, it is sent to be bulked, at step 440, and re-entered to the Company System 8. If it cannot be fixed, it is stored, in step 450, for analysis.

Valid call records meanwhile are forwarded to the Company System pricing engine, step 460, at which individual call records are priced in accordance with the NCDB 9, the SLA between the relevant billable entity and BT, and any other relevant information. The priced call records can then be loaded into a summary database, step 470, for charging to the relevant billable entity, and the call records are output to optical disk (step 480) for storage.

Client Boxes 10 receive downloaded information from the summary database on a weekly basis. Each Client Box 10 is dedicated to a single billable entity and can also be used to access the optical disk storage, to obtain its "own" call records only.

3. FIGS. 1, 5, 6, 7 AND 8: HARDWARE, COMMUNICATION AND SOFTWARE ARCHITECTURES 3 (i) POINT OF INTERCONNECT 3 AND DDC 5

The exchanges 3 and DDCs 5 are of known type and are not described in detail herein. They operate, briefly, as follows.

Referring to FIG. 1 and 2, any call coming into or leaving the British PSTN operated by British Telecommunications plc (BT) will nowadays pass through a digital telephone exchange as the Point of Interconnect (POI)3. All such exchanges relevant to the data system of the present invention are currently System X telephone exchanges of types Digital Junction Switching Unit (DJSU), Digital Local Exchange (DLE) or Digital Main Switching Unit (DMSU).

Every telephone call going into or leaving the BT network 1, as shown at step 200 of FIG. 2, generates a call record within the POI exchange 3 in the format known as British Telecom Call Record Type 6. The System X POI exchanges 3 are polled daily by the DDCs 5, at step 230, for all call record data in APDU format. Polling takes place using the File Transfer Access and Management (FTAM) protocol across high-speed BT data links. DDCs 5 act purely as collectors of call record files from POIs: no processing of call records takes place within a DDC. DDCs are not dedicated to call record polling, but perform a variety of other data collection, processing and forwarding tasks.

In order for the streamer system 6 to gain access to the FTAM filestore on the DDC 5, it is necessary to provide identification. This is done by allocating a Network Nodal Identity (NNI) to the streamer 6 as a relevant end system. The NNI is then used as a username for gaining access to the FTAM filestore, along with a password.

3 (ii) STREAMER 6 AND DATA ANALYZER 7

Figure 5:
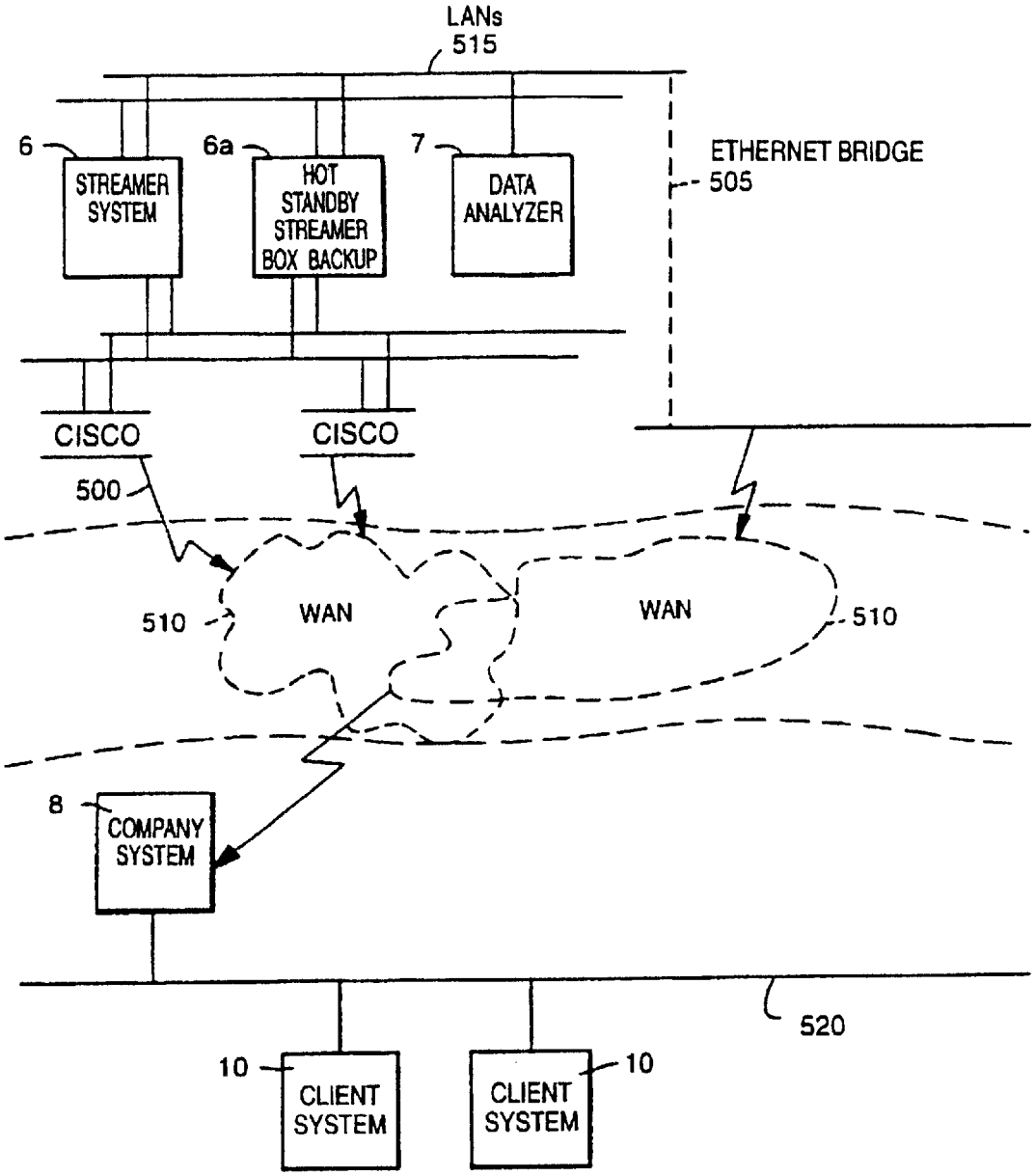
FIG. 5 shows a hardware and communications diagram for the system of FIG. 1.

Referring to FIG. 5, the hardware and communications diagram for the streamer 6 and the data analyzer 7 may be as follows. (It should be understood that the communications architecture of FIG. 5 represents only one of any number of communications architectures that might be suitable in different environments.) The streamer 6 has a "hot-standby" Streamer Box Backup (SBB) 6a which cuts in as soon as a fault on the main streamer system 6 occurs, and both can be provided on Hewlett-Packard HP857S minicomputers running the UNIX operating system. The streamer 6 and SBB 6a might be connected to local area networks (LANs) 515.

Raw data polled by the streamer 6 (or hot-standby 6a) from the DDCs 5 (not shown in FIG. 5) is backed up using an optical disc storage system (not shown). The data is polled using FTAM (File transfer, Access and Management) over BT Megastream high-speed data links and a Multi-Protocol Routing Network (MPRN) 500. The MPRN 500 is OSI (Open Systems Interconnection) compliant. There are direct communication links 515 between the streamer 6 and the data analyzer 7 and an "Ethernet" bridge 505 gives the streamer 6 and the data analyzer 7 access to at least one wide area network (WAN) 510, for instance that used by BT for the PSTN. The WAN 510 in turn gives access to a company system 8 and client boxes 10 situated at the primary BT PSTN network management and data center. This means that the network management and data center can input and output data, for instance for analysis and to input initial and updated routing reference data.

Figure 6:
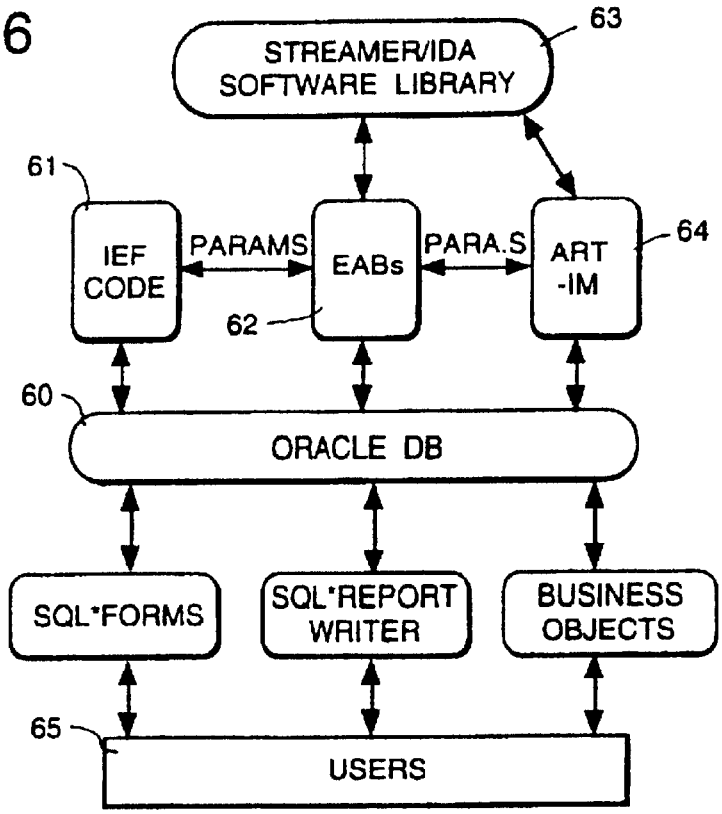
FIG. 6 shows a software architecture for use between a streamer and a data analyser in a system according to FIG. 1.

Referring to FIG. 6, the Data Analyzer 7 might be provided on a Hewlett-Packard HP9000. Software for the Streamer 6 and the Data Analyzer 7 utilizes the following technologies:

IEF for Batch Processes

ART/IM for Expert System Capabilities

HP/UX Version 9.0

Business Objects as a PC Client for reports

Oracle Version 6

SQLFORMS 3

SQL*Report Writer 1.1

PL/SQL Version 1.0

PRO*C

SQL*NET TCP/IP Version 1.2

All these are known and publicly available. For instance "IEF" is the "Information Engineering Facility" Computer Aided Software Engineering (CASE) software from James Martin Associates, a software engineering tool which generates executable code. The data analyzer processes run physically on the data analyzer 7 platform and use SQL*NET to connect to an Oracle database 60 on the Streamer 6 platform.

SQL*NET TCP/IP (Transport Control Protocol/Internet Protocol) can also be used by Streamer/Data Analyzer Business Objects Oracle users 65 in order to access the Oracle database 60 located on the Streamer 6 over the MPRN 510, or a suitable TCP/IP bearer network.

The Streamer 6 and the data analyzer 7 share database facilities 60 and the users may require access for instance to check or update reference data used in validation by the Streamer 6. The database facilities 60, inter alia, maintain control over which files from the DDCs 5 have been processed and contain a version of the Routing Reference Model.

PRO*C code is generated by the IEF into the IEF code 61 and External Action Blocks (EABs) 62 as shown in FIG. 6. The Streamer/Data Analyzer software library 63 is a set of "C" and PRO*C modules, callable from within EABs 62 or from the ART-IM (Automated Reasoning Tool for Information Management) 64. The ART-IM is proprietary, expert system, application development software. The ART-IM development is conducted within "studio", a Motif interface to the expert system. Once the expert system has been unit tested within the "studio", it is deployed by generating "C" modules from within the "studio". Hence, for instance, processes can be created by generating the IEF Code 61 on an OS/2 workstation, and linking the code with EABs 62, the Streamer/Data Analyzer software library 63 and the ART-IM code library 64 on the deployment platform.

3 (iii) COMPANY SYSTEM 8

Figure 7:
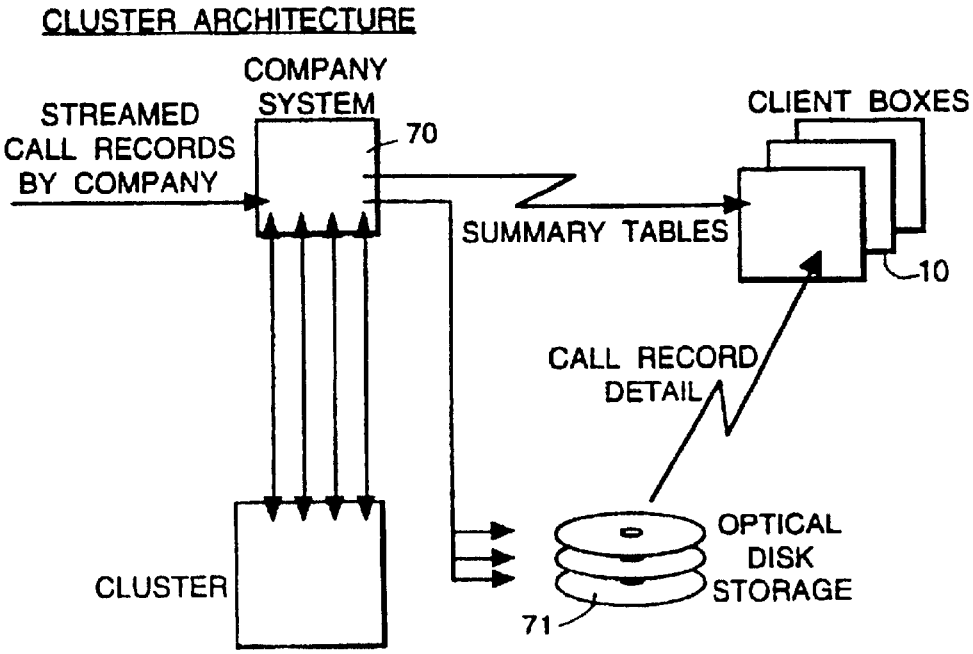
FIG. 7 shows an architecture for hardware providing a company system for use in the system of FIG. 1.

Referring to FIGS. 7 and 8, the Company Box (or System) 8 comprises a Hewlett-Packard minicomputer 70, "Emerald 890/400", running the UNIX operating system, the ORACLE relational database management system (RDMS) and a custom application written using the IEF CASE software from James Martin Associates.

Within the Company Box 8, all call records are priced according to complex pricing and charging reference tables, and ORACLE summary tables are incremented. Reference tables provide exchange set-up data, routing reference data, accounting agreements, pricing and charging data and various classes of exception. Pricing and charging reference tables are derived from BT's National Charging Data Base (NCDB) and inter-operator wholesale pricing agreements.

To help the minicomputer with the very high volume of processing tasks involved, Hewlett-Packard UNIX workstations 80, for example "735s", are attached as co-processors which bid for processing tasks. A virtually unlimited number of such workstations may be connected to the minicomputer 70 to increase the number of call records that the Company Box can process but a reasonable minimum for the BT PSTN might currently be for instance twelve. As stated earlier, it may be that the data system of the present invention will be required to process 60 million call records per day by 1995. The arrangement relies on the Hewlett Packard product known as "Task Broker" 81, the data system of the present invention being set up to run on a batch array. In order to do so, custom parameters need to be fed into Task Broker and an appropriate set of these parameters are listed below:

i) Global Parameter Settings (which are optional)

which clients may access server which machines may remotely administer Task Broker which network mask to be used smallest and largest UID (user identity) allowed logging verbosity maximum number of task submittals to be processed concurrently.

list machines that client should contact for services.

ii) Client Parameter Settings (which are optional)

list for each service, the servers the client should contact for service.

iii) Class Parameter Settings every service must be in a class; set up a class for each type of service each machine will provide.

iv) Service Definitions (for every service, the following must be specified)

class affinity arguments

Note, affinity is a number between 0–1,000 which indicates how well a node is able to provide a service.

Task Broker is a queuing system which controls which work stations bid for and process files. In order to use Task Broker with the company system 8, there are three programs and a configuration file. The configuration file sets up the parameters Task Broker needs to operate in the company system environment including which work stations it can communicate with, what programs to call to process a 30 file, and how to prioritize. It is the configuration file parameters which are set out above.

The three control programs operate (in summary) as follows. When a file comes to the Emerald minicomputer of the company system 8, a master program "run_cp.sh" sends it to be processed via Task Broker and kicks off a monitoring program "cleanup_cp.sh" in the minicomputer. Task Broker allocates the file to a work station, which processes the file according to a third program "cp.sh". If things go smoothly, the file returns to the minicomputer where "cleanup cp. sh" allocates it to the correct directories of a client system 10. "Cleanup_cp.sh" also monitors the work stations. If there is an overlong delay in processing by a work station, it will shut down Task Broker on that work station since there is clearly then a problem. Lastly, "cleanup cp.sh" also controls recording and event logging.

Finally, as well as an output to the client system 10, priced call records from the Company Box 8 are saved to an array of Optical Disc Drives 71, so that individual priced call records may be retrieved and analyzed in future.

3 (iv) CLIENT SYSTEM (OR BOXES) 10

Summary ORACLE database tables of interconnect calls are downloaded weekly from the Company Box 8 to Client Boxes 10. Each Client Box (CLB) 10 is a Hewlett-Packard UNIX workstation, and deals only with summary database tables and call records generated under a single interconnection agreement between BT and another operator, for example Manx Telecom. A Client Box 10 runs an ORACLE RDMS, and Business Objects software. Information from each Client Box 10 allows BT not only to bill another network operator in respect of their use of BT's network, but also to verify incoming bills from another network operator to BT. Each Client Box 10 can also interrogate the Optical discs 41, but only for call records under the interconnection agreement associated with that Client Box 10. It is not possible for a Client Box to interrogate the Company Box 8 directly for its own call records, let alone those relating to other agreements between BT and other operators. Personal Computers are connected to a Client Box 10 to allow analysis of the Summary Tables.

4. FIGS. 9 AND 10: CALL RECORDS AND DATA FORMATS 4 (i) CALL RECORDS

British Telecom Type 6 call records are generated for the primary purpose of billing customers. Call records should contain sufficient information to price a call accurately, based on date, time, duration, distance to be travelled and other factors. Each Type 6 call record can include the following:

length of billing record;

record use;

record type;

call type & call effectiveness;

clearing cause;

time discontinuity flag (change to/from GMT from/to BST during call);

calling line identity (CLI);

route group type;

sampling category;

route group;

nodal point code (NPC): unique identifier for POI exchange producing record;

linking field (used when call straddles more than one time-charge band);

calling party category (business, residential, payphone);

charge band;

date and time of address complete;

date and time of answer;

date and time of calling party clear;

date and time of called party clear;

called number field.

Call records are captured by the Call Accounting Subsystem (CAS) Revenue Apportionment and Accounting (RAA) facility on all System X exchanges. As mentioned above, at step 220 call records are grouped together into APDUs, and APDUs are further grouped into a file, with each file being up to 1 Mbyte in size. Nothing in this grouping process within a System X POI exchange destroys any parts of individual call records. All call records are in simple binary format.

Referring to FIG. 9, each exchange file 40 contains a number of APDUs 51, which are of variable length. Each APDU 51 contains a number of billing records which are also of a variable length. The following are, however, fixed Exchange File Maximum Size 1 Megabyte APDU Maximum Size 512 Bytes Billing Record Maximum Size 70 Bytes The DDC Header and Trailer APDUs are identical apart from the APDU type which is 241 for header APDU, and 245 for trailer APDU.

The following information is available in the header and trailer APDU:

| | |
|---|---|
| APDU Length | Length of header/trailer APDU |
| APDU type | 241 for header, 245 for trailer |
| Unique File Identifier | See below concerning DIRINDEX |
| Destination NNI | NNI of INCA Streamer |
| Application Group | Application Group of INCA data = 14 |
| Input tape/cartridge Seq. No. | Sequence Number of tape/cartridge |
| Output File Seq. No | DDC Sequence Number |
| Timestamp DDC received data | Date and Time data received by DDC |
| Partfile Indicator | Indicates whether file is a part-file |
| Exception Indicators | Indicates what may be wrong with file |
| Read Count | No. of times this file has been read |
| Filesize | Size in bytes of this file |
| Count of unselected APDUs | No. of APDUs of wrong APDU type |
| Selected APDU type | APDU type of INCA data type |
| APDU Count | Number of APDUs in this file |
| First Seq. NO | Starting APDU Sequence Number |
| Last Seq. No | Ending APDU Sequence Number |

The read count represents the number of times this file has been polled from the DDC by the Streamer 6. The partfile indicator indicates whether the whole file was received by the DDC 5 successfully or whether parts of the file were missing.

The exception indicators are two 1 byte bitmask fields which indicate any errors that were detected by the DDC 5 relating to this transfer.

The valid values for all of the fields above will be validated within the computer aided software engineering (CASE) application software described below with reference to the "COMPANY SYSTEM (OR BOX)" 8.

Referring to FIG. 10, a brief description of the APDU structure 51 would include the APDU header 52, the actual billing records 53 concerned, and the APDU trailer 54.

The format for the billing records 53 is of standard type and a "C" structure can be designed to map exactly onto that format.

When data has been polled from the exchanges 3 to the DDC 5, some of the data which is at the head of each data APDU is stripped out by the DDC 5. This data is representative of the DDC 5 and of the exchange 3 and is not relevant as a data feed for an end-processing system.

When the file is copied into an appropriate directory by a DDC 5, such that it is made available for the streamer 6 to copy using FTAM, an entry is made for it in a catalogue file, called DIRINDEX. The DIRINDEX file entry carries the following data:

i) activity marker (1 byte) which may show
  a) inactive entry
  b) file available for transfer
  c) file currently being used (eg in FTAM transfer)
  d) file successfully transferred (not yet deleted)

ii) INCA filename format iii) output routing, which may show
  a) file available for FTAM
  b) magnetic tape only iv) unique file identifier, including details such as the creation time and the relevant exchange NNI.

v) file size in bytes vi) number of APDUs in file.

Looking at ii), the INCA filename format, that includes:

vii) the streamer NNI viii) NNI and cluster number of exchange ix) application group of INCA data x) DDC file sequence number of exchange file.

4 (ii) MAPPING DATA STRUCTURES ONTO EXCHANGE DATA

The streamer 6 maps the data into data structures for use in the model for the Company Box 8, using the following principles:

It is assumed that the APDU length fields and the billing record length fields will be correct. If they are not then the validation will fail at either the APDU level or the Billing Record level, and the file will be streamed to the Data Analyser 7.

The input data will initially be scanned to find the Header APDU 52. This will be identified by an APDU type of 241 (Hex F1). The selected APDU type field will then be checked along with the Unique File Identifier to establish that this is indeed the header APDU 52.

After the header APDU 52 has been found and the header APDU data structure has been mapped, it is assumed that all of t he APDUs in the file will follow the data standard of a one word record length followed by an APDU. eg.

/HEADER_APDU/RL/APDU/RL/APDU . . . /RL/APDU/RL/ TRAILER_APDU where RL is the Record Length.

If the structure of the file deviates from this standard then the file will be streamed to the Data Analyser 7 for further analysis. This error condition will be detected within the validation of the APDU immediately following the deviation.

Within each APDU it is assumed that the structure follows that of FIG. 6. Again any deviation from this structure will cause the whole data structure mapping to become misaligned, and will lead to the file being rejected and streamed to the Data Analyser 7.

It is assumed that there will be no data after the trailer APDU 54. Any data that does appear after the trailer APDU 54 will be lost.

5. FIGS. 11 TO 19 AND 22 TO 30: STREAMER AND DATA ANALYSER PROCESSES 5 (i) STREAMER: DDC POLLING PROCESS

When files are received by the DDCs 5 they are validated (using checksumming) and some extra information is added to the beginning and end of the file, in the APDU Header and Trailer 52, 54, as mentioned above with reference to FIG. 2. These files are then made available for polling by the Streamer 6 by placing them in the directory structure to be used by the streamer 6, and updating the DIRINDEX file. This DIRINDEX file contains a list of all files available to be polled by the Streamer 6, and the Streamer 6 uses that list to ensure it has polled all new files.

Figure 11:
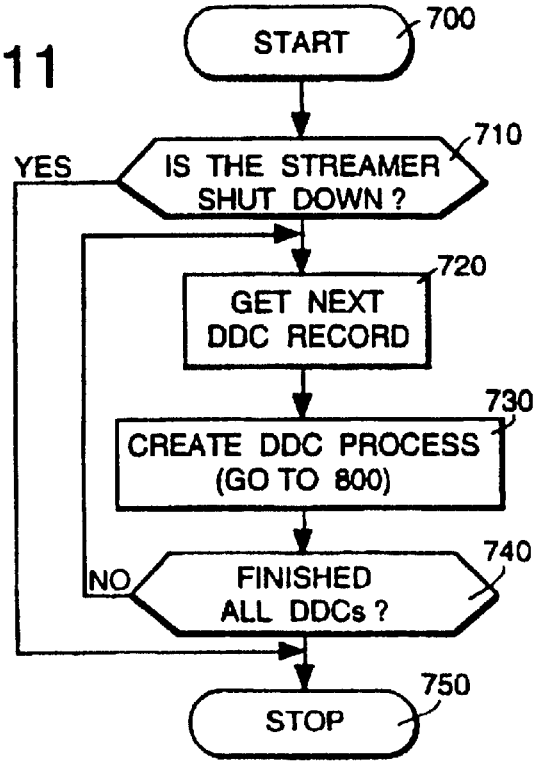

Referring to FIG. 11, the Streamer 6 will prepare to poll multiple DDCs 5 by going into a "Stream all DDCs" process. At step 700, the streamer 6 "stream all DDCs" process is triggered, for instance at a specified time. At step 710, it runs a check that the Streamer 6 is available to receive files from the DDCs 5. If the Streamer 6 is available, it goes into a cycle, steps 720, 730 and 740, in which it runs through a list of the DDCs 5 and creates a "DDC Process" for each DDC 5 to be polled. At the end of the list, this process finishes (step 750).

Figure 12:
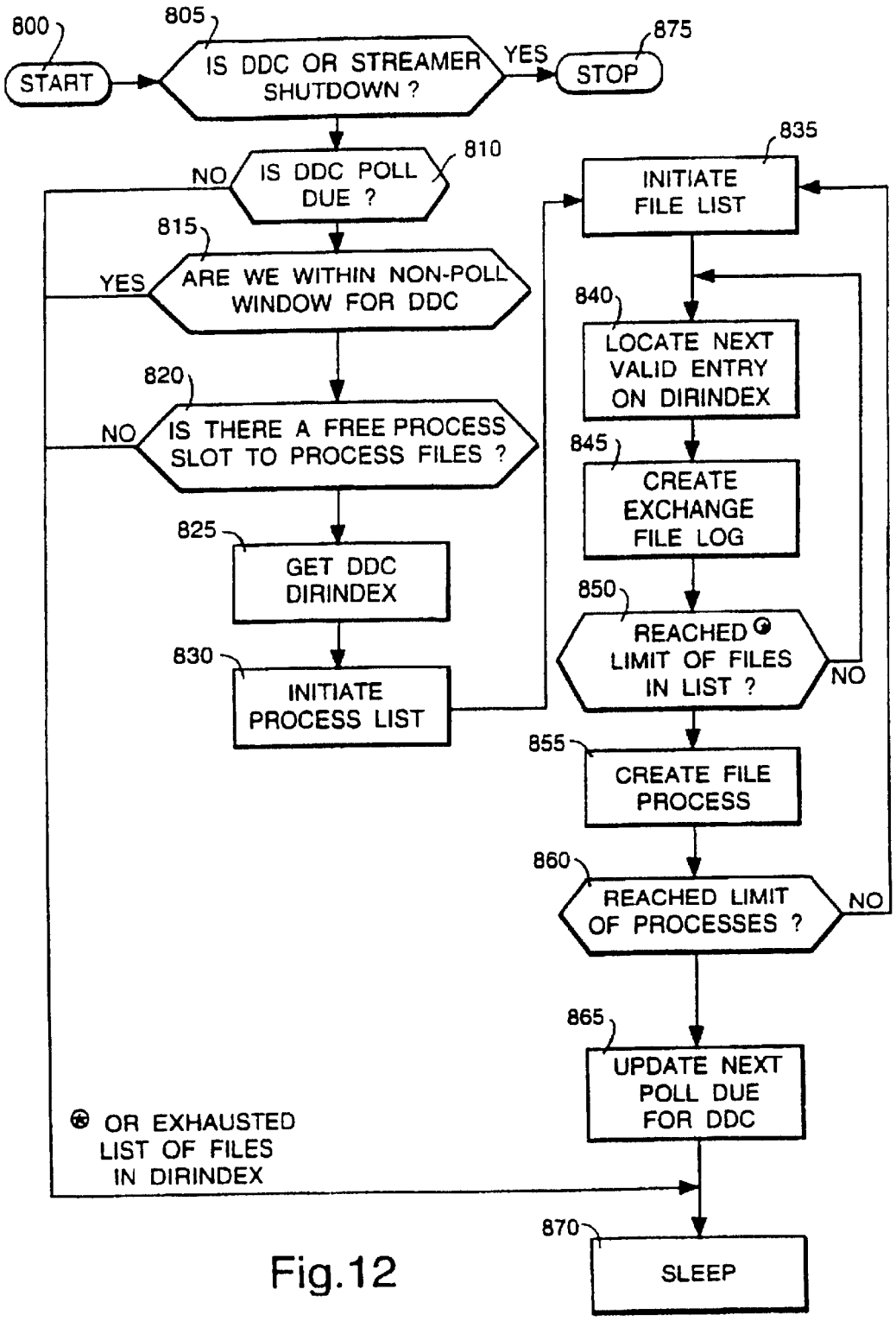

For each DDC 5, the Streamer 6 will now run the "DDC process". Referring to FIG. 12, at steps 800, 805, the DDC process starts with a check as to whether either the DDC 5 concerned for that process, or the Streamer 6, is shut down, and a check at step 810 as to whether DDC polling is due. There are certain times at which the DDCs 5 cannot be polled and step 815 runs a check as to whether a non-poll window applies. If not, step 820 looks for a free process slot to process files. If all these checks are clear, the streamer 6 accesses the DDC DIRINDEX, step 825, and initiates the process list, step 830, and file list, step 835, which will ensure the streamer 6 applies all relevant processes to each of the exchange files received from the DDC 5. In step 840, 845 and 850, the streamer 6 runs through the files from the DDC DIRINDEX, creating its own log of the exchange files to be processed, and provides a file processing capacity, steps 855 and 860, to process the files in the file list. Once all the exchange files from the DDC DIRINDEX list have had processing capacity allocated, the "DDC process" updates its record of when the next poll is due, step 865, and goes back to sleep, step 870.

The DDC process will be stopped of course, step 875, if either the DDC 5 or the streamer 6 has shut down, and will remain in sleep mode, step 870, whenever a poll is not due, the DDC is in a non-poll window, or there is no available processing capacity.

typical event cycle within ddc polling architecture Assume the following

| | |
|---|---|
| DDC_POLLING_MPH = 17 | This is the minutes past the hour to Poll |
| DDC_POLLING_INT_HRS = 1 | This is how long to wait for next Poll in hours |
| DDC_DELAY_IN_DELETE = 12 | How long to wait after the file has been marked for deletion before actual deletion request occurs. |

The System has been booted at 23: 30 on the previous day. Time Schedule

00:17 DDC Process wakes up, copies over DIRINDEX file, and creates processes to stream data to the Streamer 6.

00:30 DDC Process finishes creating processes to stream files because either the Maximum number of processes have been created OR all of the files available have been given to file processes to download.

The wakeuptime is calculated as 00:30+DDC_POLLING_INT_HRS and set minutes to DDC_POLLING_MPH.

=>Next Polling Time=00:30+1:00=1:30 (SET MPH) =01:17

Calculate the number of seconds to sleep=TO_SECONDS (01:17—CURRENT_TIME)

Sleep (seconds_to_sleep) . . . File Processes complete streaming of data

01:17 DDC Process Wakes up . . .

5 (ii) STREAMER: FILE PROCESS

Figure 13:
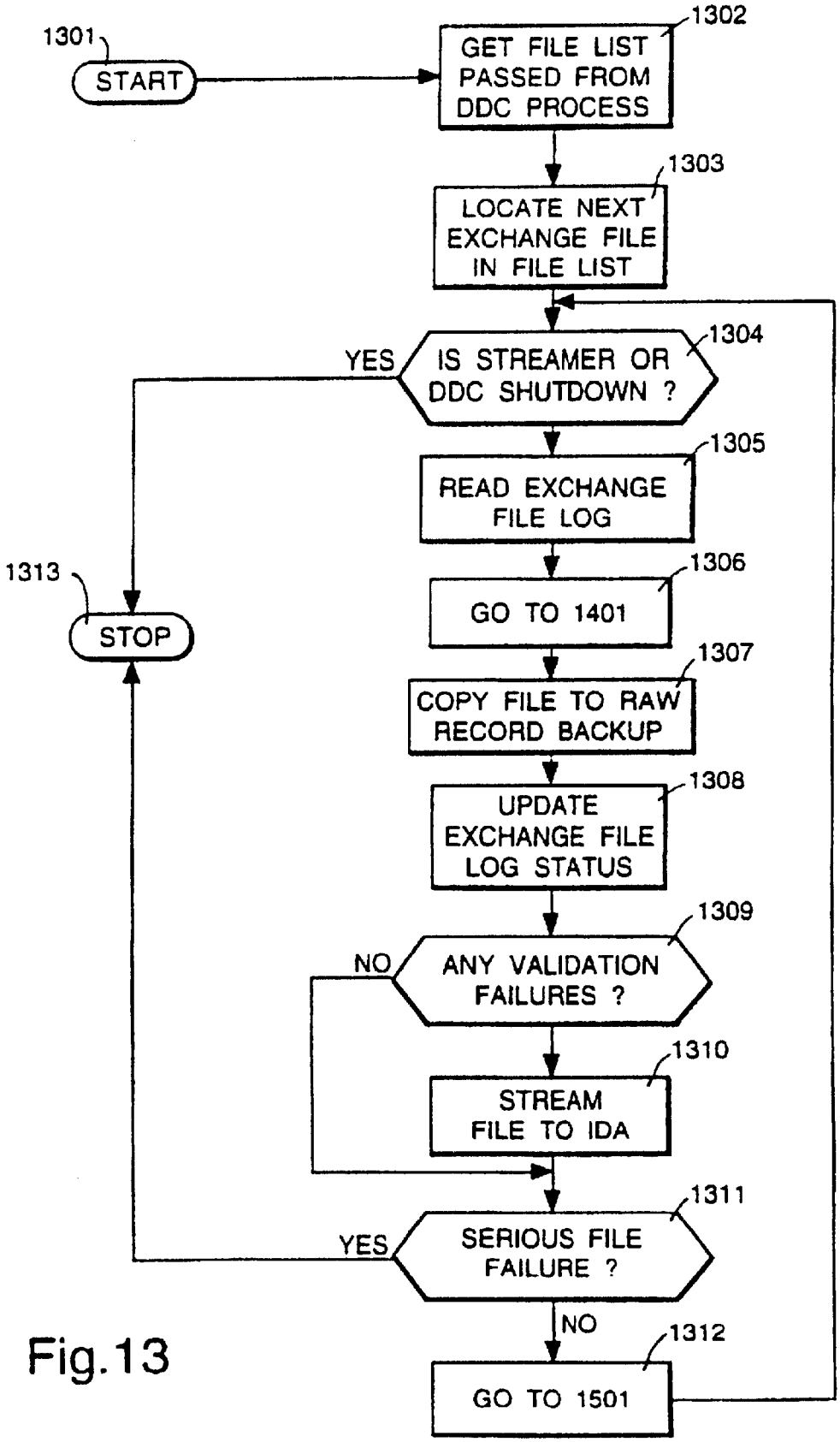

Referring to FIG. 13, the operation of the File Process, created at step 855 during the DDC Process, is as follows. The File Process works from a file list received from the DDC Process, step 1302. Running through the file list, step 1303, for each exchange file listed, File Process reads the exchange file log, step 1305, validates the call records, step 1306, copies the file to a raw record backup, step 1307, for use if for instance the streamer 6 goes down subsequently, diverts the file to the data analyser 7 if there was a validation failure, step 1310, or streams the file to the Company Box 8, step 1312.

File Process stops, step 1313, if the DDC 5 or the Streamer 6 is shut down, step 1304 or if the files are seriously corrupted, step 1311, for instance because communications with the DDC 5 have failed. The exchange file log monitors what stage an exchange file has reached in relation to the Streamer 6 and will carry a status selected from active, processed and deleted for each file, where "active" indicates it is being processed by the Streamer 6, "processed" indicates it has been processed by the Streamer 6, and "deleted" means it has been deleted from the DDC 5 by the Streamer 6.

Figure 14:
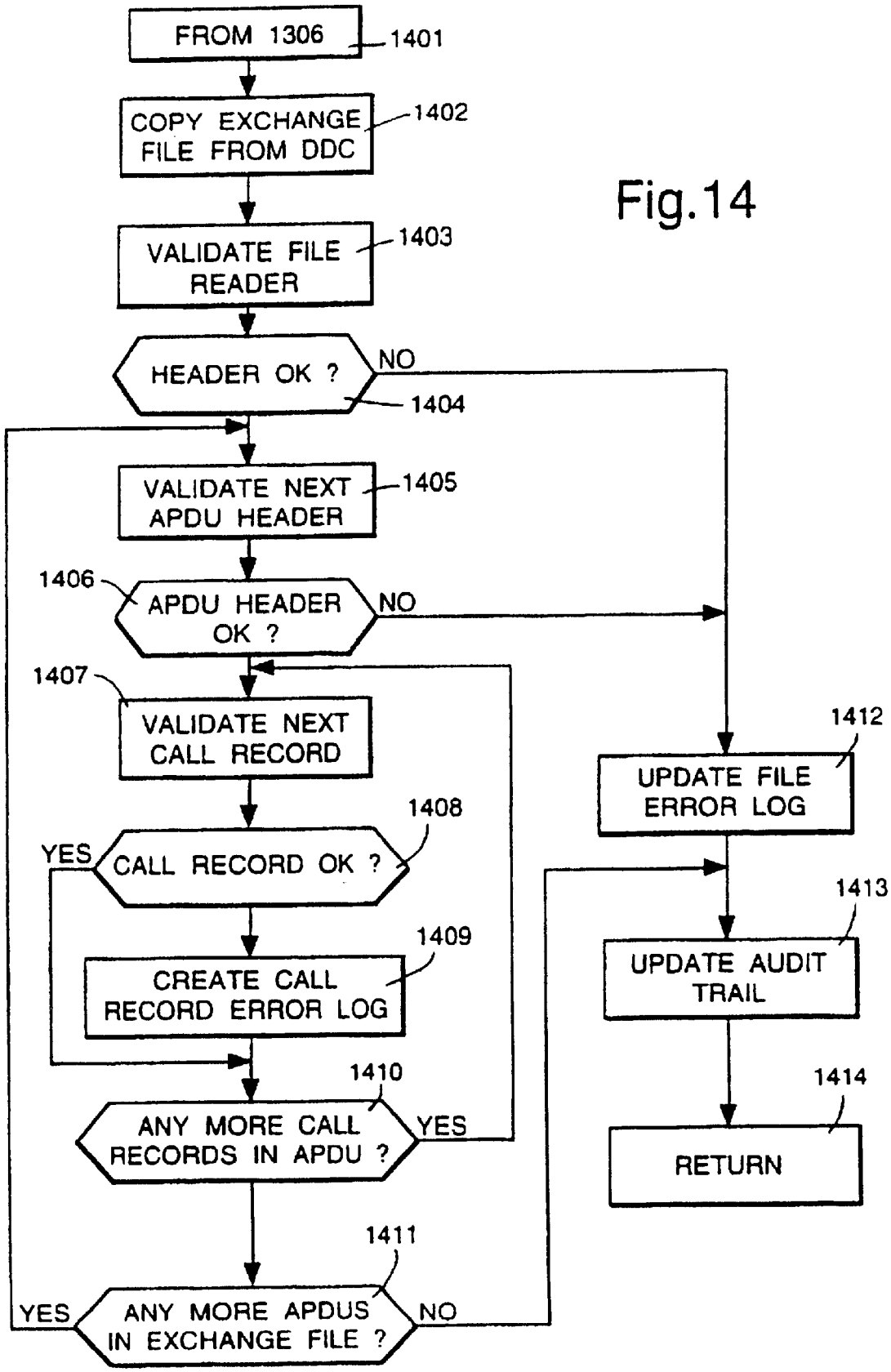

Referring to FIG. 14, the step 1306 in which call records are validated can be expanded as follows. At this point, steps 1401 and 1402, the exchange file is copied from the DDC 5 and the file header and first APDU header 52 validated, steps 1403, 1405. If either fails, a file error log is created, step 1412. If both are acceptable, the call records are each validated, steps 1407, 1408, and a call record error log created, step 1409, if one fails. Validation is repeated for each APDU 51. Whether validation has shown all is correct, or errors have been logged, the audit trail is updated 1413 and File Process moves on to step 1307 as described above.

Figure 15:
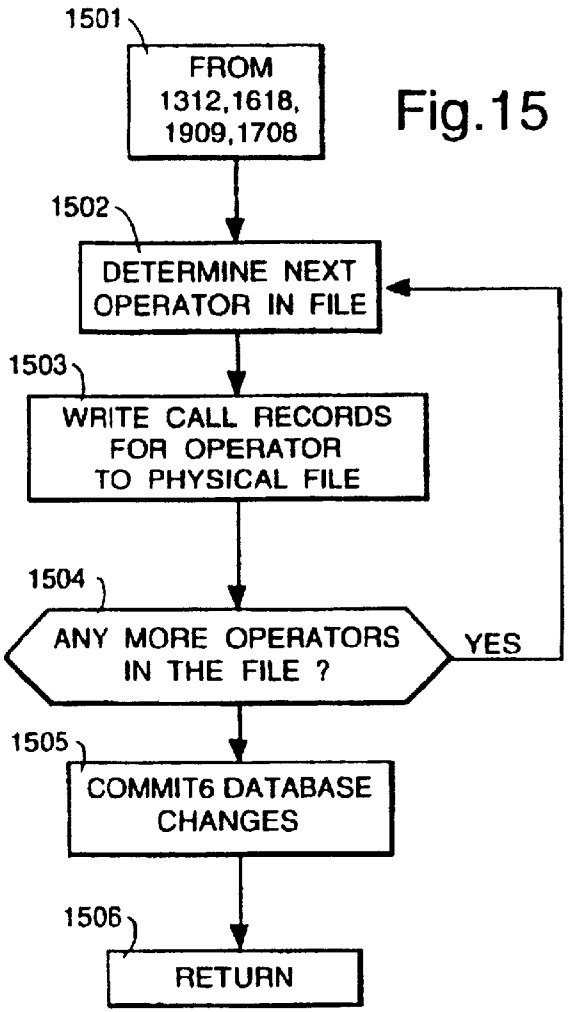

Referring to FIG. 15, files which have been validated during the File Process are now ready to go to the Company Box 8. At this stage, the file structures are broken down so that the individual call records 53 can be sorted according to the billable entity they are relevant to. The call records 53 are now written to physical files, step 1503, for the different billable entities.

5 (iii) DDC FILE DELETION PROCESS

Once a data file has been successfully downloaded from the DOC 5 to the streamer 6, and the data has been expanded and streamed to the appropriate Company Box 8, the data file must be deleted from the FTAM filestore on the DDC. The streamer 6 will delete the file using an FTAM delete request a number of hours after the file has been secured on either the company box 8 (or local storage for the company box 8 if the link to the company box 8 has gone down). The exact time between the data being secured and the files being deleted can be set on a per DDC basis.

5 (iv) DATA ANALYZER PROCESS

Figure 16:
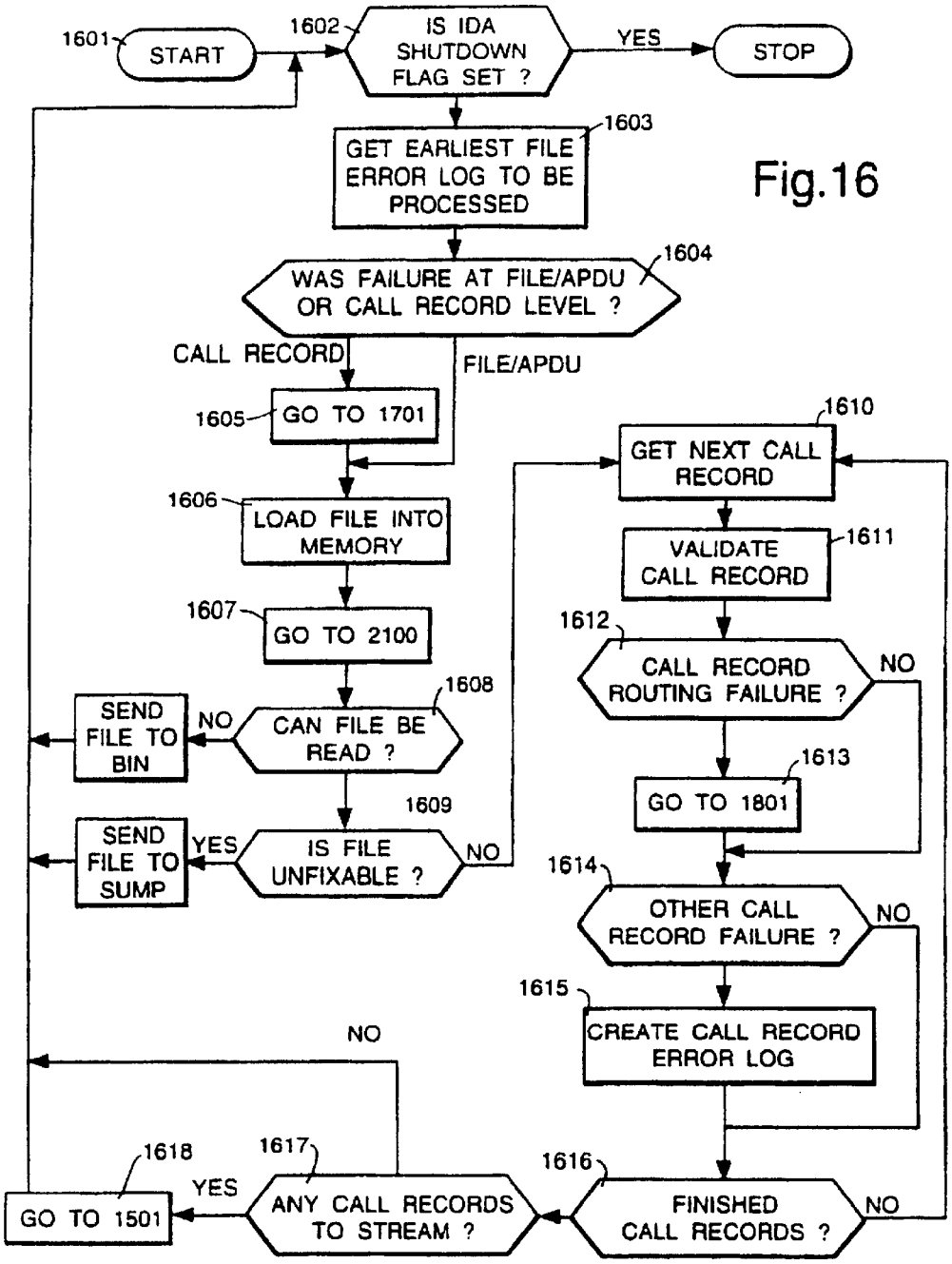

Referring to FIG. 16, the step of validating call records in FILE PROCESS, step 1306 in FIG. 13, generates a file error log, step 1412, and a call record error log, step 1409. The data analyser 7 runs two processes, the "DA PROCESS" and the "SUSPENSE FILE PROCESS", which are initiated during the boot-up sequence of the HP9000.

DA PROCESS monitors continuously whether data which has been sent by the Streamer 6 is available to be processed by the Data Analyzer 7. This data will always exist initially as the original exchange file, irrespective of whether the data contained individual call records which could not be streamed, or the failure was at file level.

As long as the Data Analyzer 7 is not flagged as shut down, step 1602, DA PROCESS will first pick up the earliest file error log to be processed, step 1603, and check whether it was a failure at file /APDU level or at call record level, step 1604.

Figure 17:
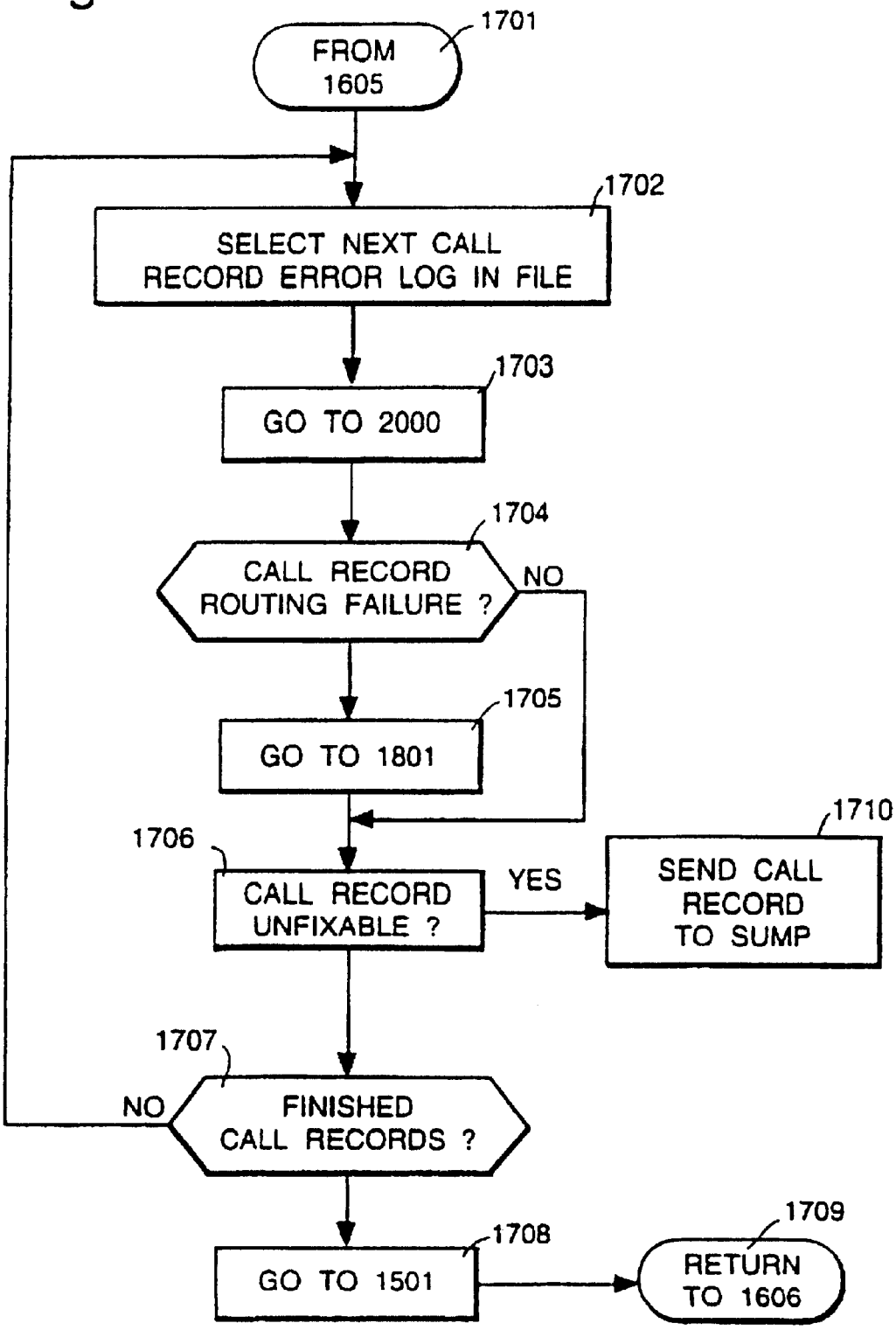
Figure 20:
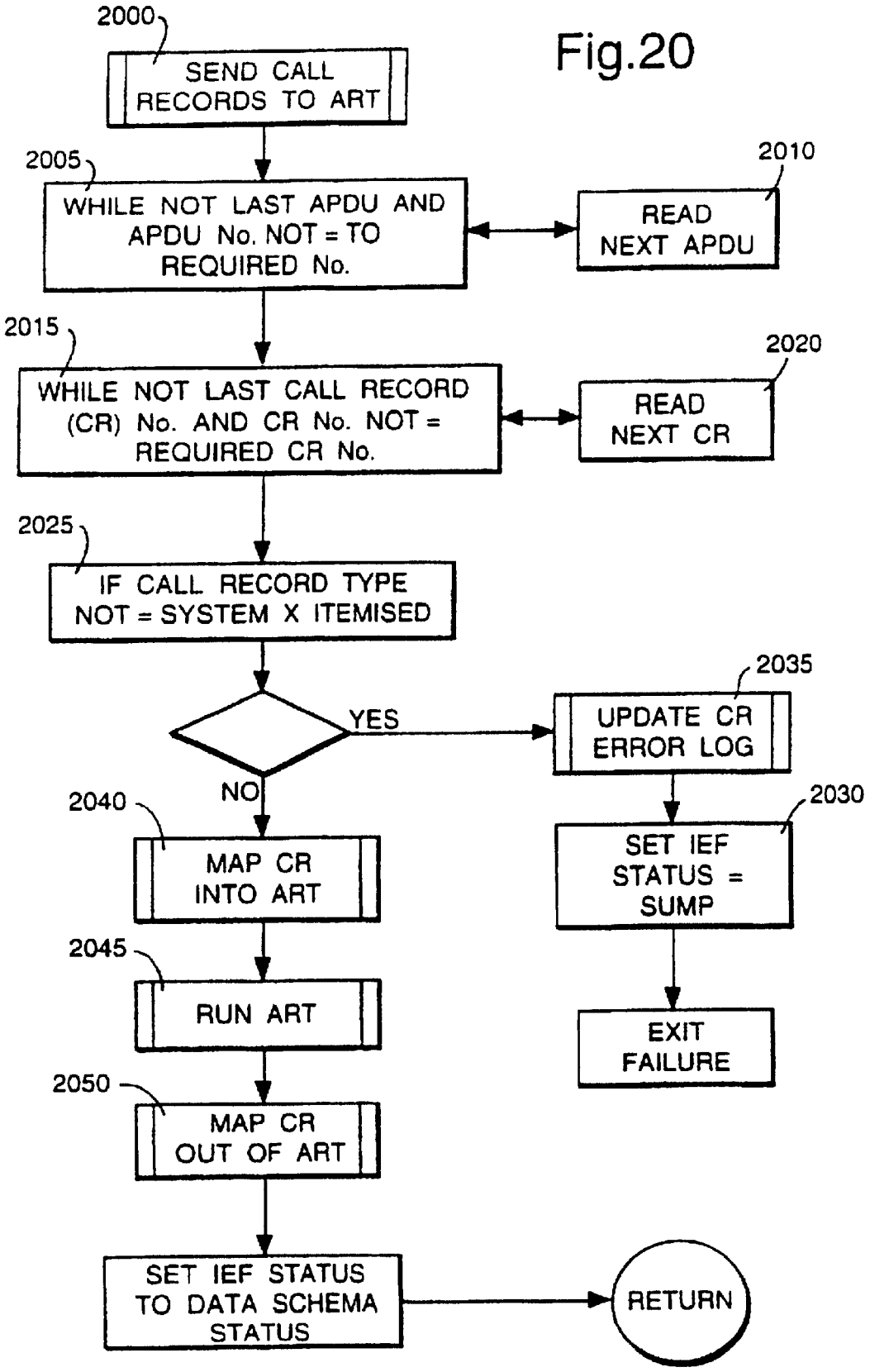

Referring to FIGS. 16, 17 and 20, if the failure was at call record level, DA PROCESS will pick up the next call record error log with regard to the file, step 1702, and send the relevant call record to the ART IM rule base for correction, step 2000. If the failure was at file level, the whole exchange file has been rejected by the Streamer 6. In this case, the complete file is loaded to memory, step 1606, and the file header and APDUs 51 sent to the ART IM, step 1607, for correction.

There are several outcomes to analysis done by the Data Analyzer 7. Fixable data will be sent to the ART IM to be corrected, and subsequently can be validated and streamed to the Company Box 8. If a routing error is involved, the data may be put into suspense in case there is a problem with a record of routing information somewhere in the system, for instance because it needs updating. It may be possible to validate call data after all, once the routing information has been corrected. If a whole file is unreadable, it might have to be sent, still in binary format, to a Binary File Dump. If data, for instance a file, is determined by the ART IM to be unfixable, and the error is not concerned with routing so as to justify suspension, it may be archived. The data will never be billed but may be used in analysis to identify long term or significant problems which themselves can be put right and so avoid losing billable items in the future.

Returning to FIG. 16, the main DA PROCESS, having used the ART IM to run checks at step 1605 and 1607, will next sort out files which have been returned from the ART IM as unfixable. If they cannot even be read, step 1608, they are forwarded to the binary is dump. These files can potentially be read, since they may be in hexadecimal, octal or ASCII format, and might be used at a later time for analysis. Alternatively, files might be readable by the Data Analyzer, but are still razed "unfixable" by the ART IM. These are, at step 1609, loaded to a "SUMP" database where, again, they will never provide billable data but can be queried and analysed.

If a file has been sent to the ART IM and was fixable, the ART IM will return each call record sequentially for validation, steps 1610 and 1611. DA PROCESS will then validate these call records first by checking for a routing failure, step 1612, and creating a call record error log, step 1615, in the event that there is call record failure. These will get picked up and rerun through the ART IM, steps 1603 to 1605 and 1701 to 1703. If the call record is acceptable, it will be streamed to the Company Box 8, via steps 1616 to 1618.

Figure 18:
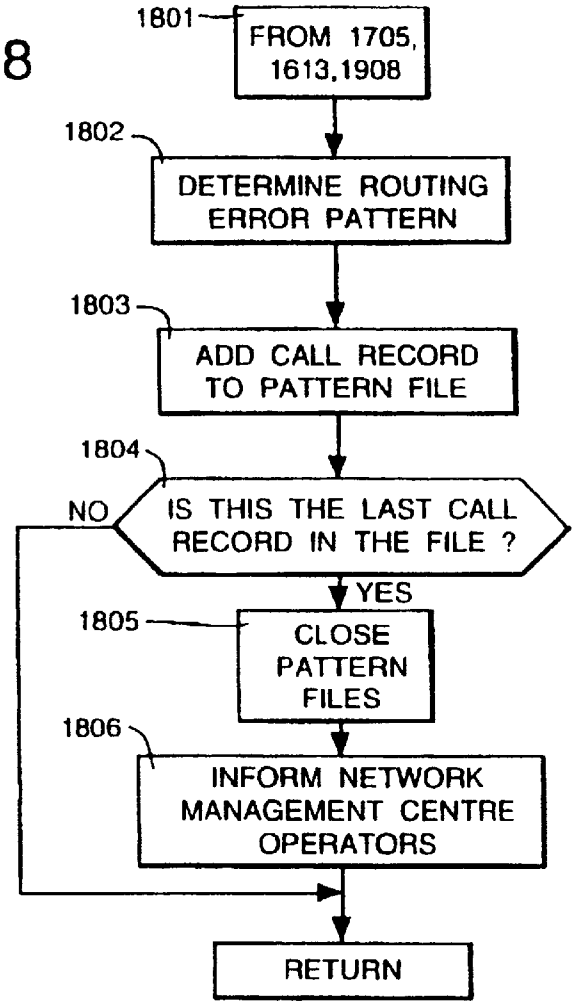

Referring to FIG. 18, where there has been a call record routing failure, detected at steps 1612, 1704 or 1907 (see below), the call records are categorised and suspended. That is, the failure is analysed to the extent that it can be matched to an existing routing error pattern, step 1802, and then the call record is added to an existing pattern file which contains all call records showing the same routing error pattern, step 1803. These pattern files are held in suspension, the primary BT PSTN network management and data centre being notified. A separate process, SUSPENSE FILE PROCESS, then deals with these files.

SUSPENSE FILE PROCESS is an important aspect of the data analyser 7 because it takes a category of errored files, which can potentially be corrected, out of the "mainstream" of data processing. These files may only have been picked up as errored because routing data somewhere in the system has not been updated. They are potentially billable. By means of SUSPENSE FILE PROCESS, the primary network management and data center has the opportunity to update routing data in the system and still catch files found errored previously. Further, by appending call records to an existing pattern file, a "Route Pattern Suspend File", for a particular route pattern, files can be selected for reattempting validation by simply running a selected Route Pattern Suspend File.

Referring to FIG. 19, as long as the process is not shut down, step 1902, SUSPENSE FILE PROCESS starts by locating the earliest routing pattern which has been amended, for instance, by the network management and data centre, step 1903. It will then pick up the next suspended file containing that routing pattern, step 1904, and attempt to validate the call records, steps 1905 and 1906. There may of course be more than one routing error in the call record. If that is the case, SUSPENSE FILE PROCESS will revert to step 1801, on FIG. 18, and create a routing error entry in a routing error pattern file, thus re-suspending the call record. However, if there is no other routing failure, SUSPENSE FILE PROCESS will attempt to stream the call record to the Company Box 8, by reverting to step 1501 on FIG. 15. The PROCESS runs through all of the call records in the suspended file in this way, step 1910, and all the files which have been suspended with respect to that particular route pattern, step 1911.

Referring to FIG. 22, this shows the process interactions between the streamer system 6, the company box 8 and the data analyzer 7. The main process area of the streamer 6 is the one called "FILEPROCESS". This does all the validation and intrinsic operations on a file. In the data analyzer area there is the "IDA FILEPROCESS" which enters data to the expert system. Importantly, this process triggers the Route Pattern Suspend File and "SUSPENSE FILEPROCESS" by appending data to a Route Pattern Suspend File. It is this which avoids a large backlog of data building up because SUSPENSE FILEPROCESS operates outside the main IDA FILEPROCESS. Another area of interest is the "SUMPDATABASE" receiving output from the "SUMPLOADER". Although data in the SUMPDATABASE cannot be put right, it can be queried and analysed so that, potentially, rules at the IDA FILEPROCESS can be changed so that subsequent data can be re-streamed.

In FIG. 22, processes are shown in circles, the Company Box 8 as a block, data files, logs and the like are shown between open-ended parallel lines and archived data is represented by the conventional symbols for databases.

The process, and stored data, interactions referenced (a) to (y) on FIG. 22 can be listed as follows, the arrow heads denoting relevant transfer directions:

a) NNI and list o file names to be processed, transferred
b) Exchange file log, STATUS=A, created
c) DIRINDEX file accessed
d) FTAM exchange file copied
e) FTAM exchange file deleted
f) Exchange files, where STATUS=P, read
g) STATUS set to D if exchange files deleted successfully (at (e) above)
h) Exchange file log read where STATUS=A
i) Exchange file log data updated. STATUS set to P
j) File is in error so file error log created
k) Call record is in error so call record error log created
l) File copied to Data Analyser directory if file is in error
m) File error log read
n) Call record error log read
o) Raw (binary) data file looked up
p) Data appended to route pattern suspend file for this route pattern
q) Entry made in route error pattern
r) ART/IM created closest matches
s) ART/IM has identified that this data cannot be fixed. Data is placed in the SUMP for further analysis or deletion
t) User has identified the problem cannot be fixed. File is placed into the sump for further analysis or deletion
u) When file structure unintelligible, file thrown into binary file dumps
v) Streamed file created.
w) SUSPEND FILE PROCESS is initiated by status on route error pattern being set to ready. If problems persist then Count field updated and status set to SUSPENDED
x) Closest matches are updated if the chosen solution fails to fix the problem
y) Streamed file created (v) ENTITY LIFE HISTORIES Referring to FIGS. 23 to 30, entity life history diagrams can show the statuses that a record within that entity can be in and, from that state, which other states can be reached by which actions. In each of these Figures, the statuses are simply identified by the reference numeral 2300 and the definitions of the statuses are given below.

Figure 23:
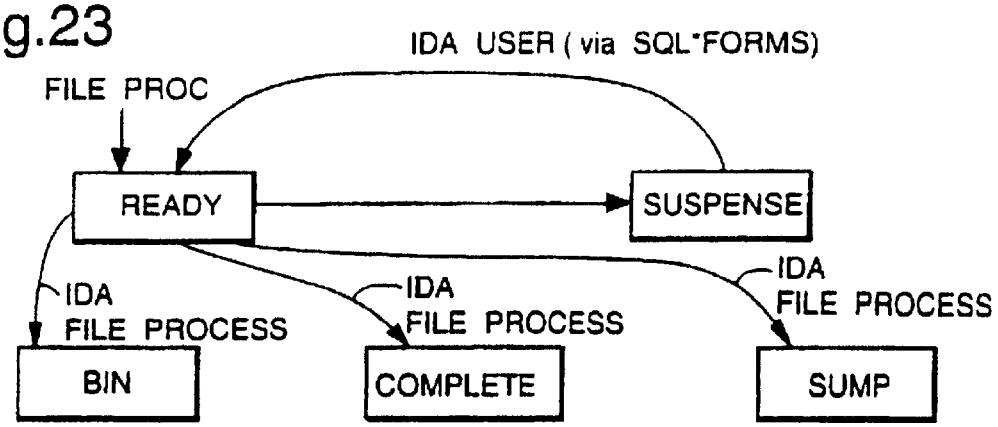

FIG. 23: File Error Log;

READY—the file is ready to be streamed by the data analyser 7.

SUSPENSE—either the whole file or a least one call record within the file has been sent to the suspense area.

BIN—the file could not be read by the data analyser 7 and has been sent to the bin area.

SUMP—the whole file has been sent to the sump area.

COMPLETE—the data analyzer 7 has streamed the file and any of the files call records in the suspense area have been successfully re-streamed or archived.

Figure 24:
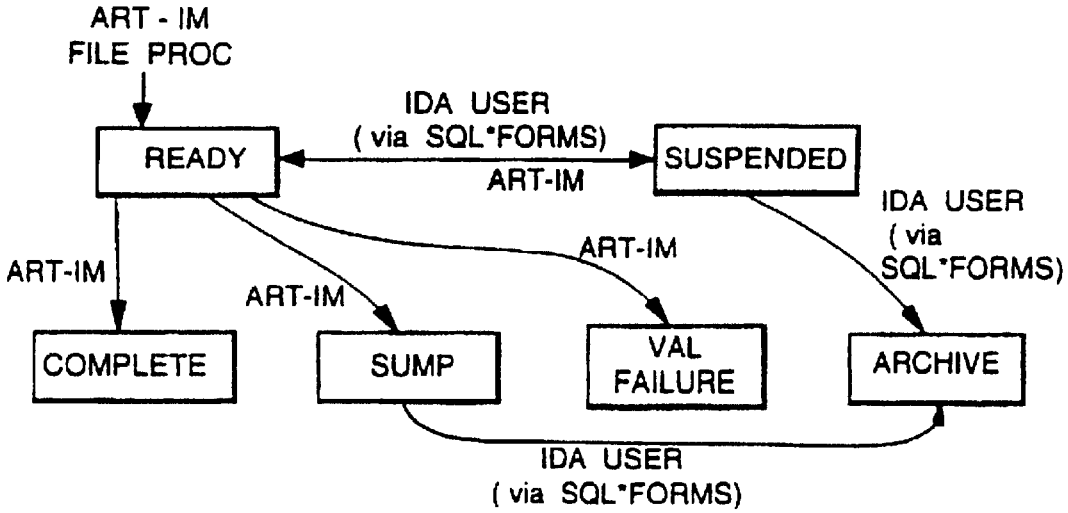

FIG. 24: Call record error log;

READY—call record is ready to be streamed by the data analyzer 7.

SUSPENSE—call record has been sent to the suspense area.

SUMP—call record has been sent to the sump area.

ARCHIVED—call record has been sent to the trash area (ie ARCHIVED).

COMPLETE—the data analyzer 7 has streamed the call record successfully.

VAL_FAILURE—there are differences in the ART-IM and IEF validation procedures.

Figure 25:
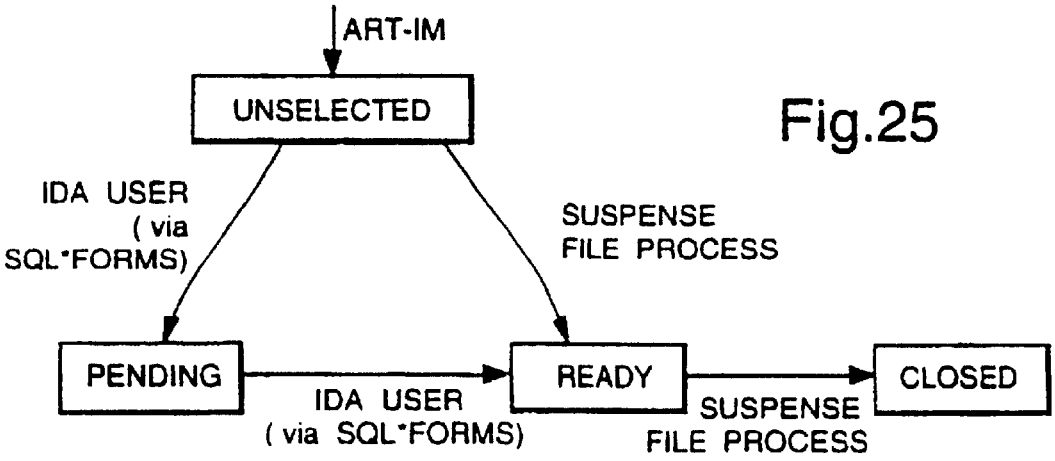

FIG. 25: Route error pattern;

UNSELECTED—created by ART-IM and waiting analysis by data analyser user, or re-streamed after analysis but failed.

PENDING—selected by data analyzer user for analysis.

READY—data analyser user completed analysis and is ready to be re-streamed.

CLOSED—successfully re-streamed or ARCHIVED.

Figure 26:
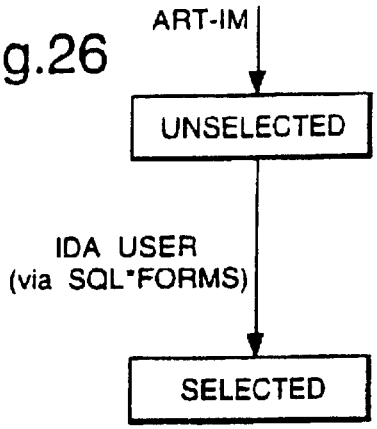

FIG. 26: Closest matches;

UNSELECTED (OR NULL)—generated by ART-IM.

SELECTED—selected by data analyser user for analysis.

Figure 27:
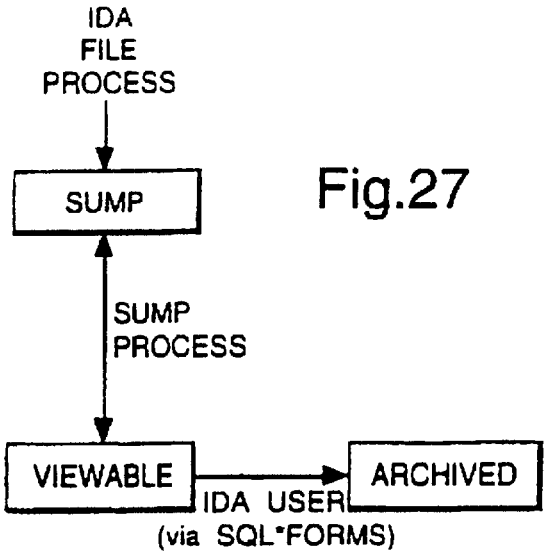

FIG. 27: Sump file log;

SUMP—a file is ready for the SUMP_PROCESS.

PROCESSING—the file is ready to be viewed by the data analyzer user.

ARCHIVED—the file has been archived.

Figure 28:
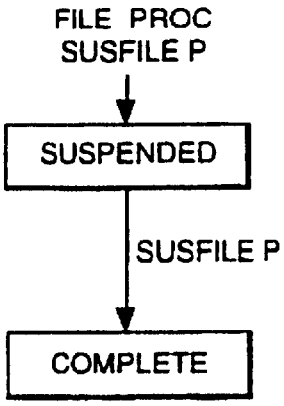

FIG. 28: File route error link;

SUSPENDED—the file is in the suspense area.

COMPLETE—the file has been successfully re-streamed from the suspense area.

Figure 29:
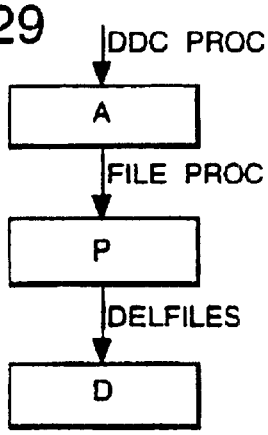

FIG. 29: Exchange File log;

A(CTIVE)—exchange file is being processed by the streamer.

P(ROCESSED)—exchange file has been processed by the Streamer.

D(ELETED)—exchange file has been deleted by the Streamer

Figure 30:
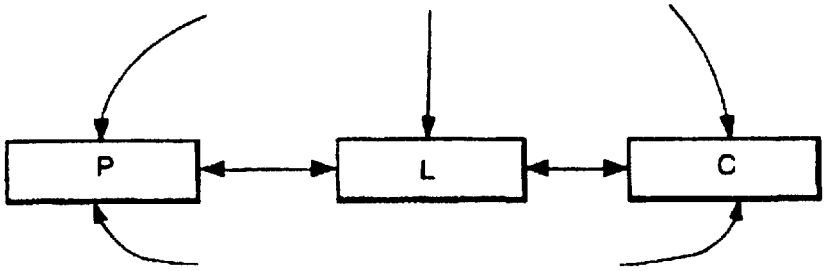

FIG. 30: District data collector;

(All statuses are changed by Streamer 6 users via SQL*Forms.)

P(REBIS)—DDC is prebis.

L(IVE)—DDC is live.

C(EASED)—DDC has been ceased.

Referring to FIG. 6, it will be seen that the Streamer 6/Data Analyzer 7 software architecture includes IEF external action blocks (EABs) 62. The EABs 62 are used where it is inappropriate or not possible to implement within the IEF. For instance, the following functions might be carried out by means of the EABs 62:

"Add call record to suspense"

This module will create a new entry of a call record, within a linked list containing call records for an exchange file which are to be sent to the suspense file.

"Add call record to archive"

Creates a new entry of a call record, within a linked list containing call records for an exchange file which have been fixed but cannot be re-streamed, to the archive directory.

"Add network operator record"

Checks whether this is a new Network Operator and if so will create a new entry in the linked list of "network_operator_structure". If it is an already used network operator name it will add a linked list entry into the linked list of call records for that network operator. Where a fix has been applied to a call record it will update the "call_record_error_log" with the "network operator record" identity and streamed call record sequence number.

"Call record to IDA rules"

Passes a single call record to the data analyser ART-IM rule base. The call record is identified by the APDU sequence number and call record sequence number passed in by IEF. The data structure loaded in memory is then searched for the call record and owning APDU and exchange file header data. This data is then fed into the rule base and validated. Any errors found will each generate a call record rule log row entry. The call record error log record status will also be updated by the rule base.

"Commit"

Commits all current database changes.

"Create DDC process"

Creates an occurrence of the DDC process which will be responsible for polling a particular DDC. It will create/open a fifo (file in/file out) to the child process and will write into the fifo the value of the DDC_NNI.

"Create file process"

Creates the process which will perform the task of streaming the file names passed in the array of file names.

"Delete file from DDC"

Deletes a file using the FTAM protocol from disc on the DDC.

"Delete data analyser file"

Deletes a file from the streamer/data analyser directory.

"Delete suspense file"

Deletes a file from the suspense file directory.

"File to bin"

Passes a file which cannot be read into the ART/IM rule base to the binary file dump.

"File to data analyser rules"

Passes a whole file to the data analyser ART-IM rule base and initialises the rule base. The initialisation of the rule base involves clearing old data, selecting default and routing reference data and populating the rule base with that data. The data analyser binary file is then loaded into a data structure in memory. This data is then fed into the rule base and validated. Any errors found will each generate the appropriate rule log row entry. Call record error logs will be created by the rule base where appropriate, together with route error pattern, closest matches and file route error link records. Once validated, the rule base will return a validation status to IEF and retain its internal data for later retrieval.

"File to sump"

Passes a file which cannot be fixed by the ART-IM rule base to the sump.

"FTAM HLCOPY"

Copies, using the FTAM protocol, the DDC file name from the DDC FTAM address using the DDC user name, DDC password and DDC account to the Streamer 6. The user name, password, account and FTAM address of the Streamer 6 can be defaulted to NULL if required. This routine is not called directly from the IEF and hence does not return an IEF style status.

"Get DDC process parameters"

Creates or opens a fifo in the streamer/TMP directory which will be named "DDC_process_fifo <PID>". It will read the values of the DDC NNI from the fifo, the data having been inserted into the fifo by the "create_file_process" routine.

"Get file process parameters"

Creates or opens a fifo in the streamer/TMP directory which will be named "file_process_fifo_<PID>". It will read the values of the above variables from the fifo, the data having been inserted into the fifo by the "create_file_process" routine.

"Get exchange file"

Copies a file using the FTAM protocol from disc on the DDC, straight onto disc on the Streamer 6. The file will then be read into memory on the Streamer 6 and then renamed into the raw record backup directory from where it will be archived. This module calls "map_data_structure_to_file" in order to set up the initial pointers to the first billing record, first APDU, and the header and trailer APDUs.

"Get no. invalid data analyser APDUs"

Returns a count of invalid APDUs re-processing of call records which have failed the Streamer validation process.

"Map data analyser file"

Reads a file into memory for subsequent processing.

"Process active"

Establishes whether a particular PID is active and returns a flag accordingly.

"Read exchange file header"

Uses the pointers to the header and trailer APDU to return in a structure all of the fields from the header and the APDU type from the trailer.

"Read data analyser exchange file header"

Uses the Pointers to the header and trailer APDU to return in a structure all of the fields from the header and the APDU type from the trailer for a file which has been sent to the data analyser.

"Read first DIRINDEX record"

Copies, using the FTAM protocol, the DIRINDEX file from the DDC to temporary storage, and opens the file and returns the first record to the caller.

"Read next APDU"

Returns the APDU structure pointed to by the current APDU pointer and sets the current APDU pointer to the next APDU. Also sets the current billing record pointer to the first billing record within the returned APDU, and copies and byte reverses the data into the current APDU array.

"Read next DIRINDEX records"

Reads the next record from the DIRINDEX file on the DDC.

"Read next data analyser record"

Returns the next billing record output from the ART-IM rule base. Successfully processed records will appear first, followed by those which require sending to the suspense file.

"Read next suspense record"

Returns the next billing record output from the suspense file.

"Read next record"

Returns the billing record currently pointed to by the current billing record pointer, and sets the pointer to the next billing record if this record is not the last in the current APDU. (This is determined using the APDU length and the minimum length of a billing record.)

"Rename network operator files"

Renames any network operator Files that have been written to the temporary directory in the operational directory ready to be processed by the Company Box 8.

"Sleep"

Will sleep for the specified number of seconds.

"Stream file"

Dumps the file in memory to the data analyser ready for data analyser processing.

"Stream file network operator"

Uses the pointer to the first network operator to get to all of the validated, expanded records for that operator. It then attempts to write the records from the linked list into a nfs_temporary directory. If successful, the file is renamed into the nfs_directory. If the file cannot be reopened on the nfs temporary directory, the file is opened on the local temporary directory, and upon successful writing the file is renamed into the local directory.

"Stream file RRB"

Dumps the file in memory to the raw record backup directory.

"Write console"

Writes a message to a network management workstation.

"Write to suspend file"

Writes the records from the linked list of suspended call records for an exchange file into the suspend directory.

"Write to archive file"

Writes the records from the linked list of archive call records or an exchange file into the archive directory.

6. FIGURES 31 TO 35: EXPERT SYSTEM: ART-IM 6 (i) OVERVIEW

The expert system uses the facilities of the ART-IM knowledge based expert system tool kit supplied by Inference Corporation. It is a knowledge/rule base programming system which allows for a flexible model of decision making, and therefore modelling of the real world, within the knowledge hierarchy, as well as providing a more heuristic method for problem solving. The tool kit contains the ART-IM language as well as an integrated editor, an interactive development environment, tools for the development of end-user interfaces, a method of deploying run time versions of developed applications and the facility to interpret external data intelligently.

In the data analyzer 7, the expert system is split into two subsystems, the rule base and the case base. In general, the case base is used to deal with routing based errors, and the rule base is used for defaulting and calculable errors. Both make use of the ART-IM functionality.

The rule base uses the ART-IM procedural languages including rule, function and methods. Each error is defined within a schema and instances of these schemas are used on the data structures. All schemas within an in-data object hierarchy are populated via the IEF/ART-IM interface using the "DEF-EXTERNAL_FUN" facility of ART-IM.

The mechanism of programme flow control used by ART-IM is very different from sequential statement-by-statement flow, as usually found in programming languages. Referring to FIGS. 31 and 32, the expert system holds all its internal data, that is schemata and facts, in a pattern net 3100. This is represented in FIG. 31 by a plurality of patterned circles, each representing a piece of internal data (a schema or a fact). This data can be set up by

- loading an ART-IM test case file (more usually done in a development/unit testing context).
- by populating from an external source (eg Oracle or IEF; more usual in a production/system test environment).
- by generating from ART-IM rules (used as very flexible "working storage" eg generation of error schema after validation test failure).

Once set up, data is compared directly with the conditions specified within the rules. A rule resembles an "IF<conditions>THEN<action>" of a more traditional programming language. If conditions of the rule match exactly an instance of data, an activation is created within an associated agenda 3105. All instances are checked against all rules. In terms of performance, the pattern net and rule conditions are managed by an efficient pattern-matching algorithm within the ART-IM run time system.

At the end of the evaluation part of the cycle, all rule activations are placed in order on the agenda stack. The first rule activation on the stack will be fired. The order of appearance of activations defaults to random unless salience, that is priority of rules, is set by the developer.

Referring to FIG. 32, after firing of the topmost rule activation on the agenda 3105, the action of the rule has actually changed data in the pattern net which will in turn alter what appears on the agenda stack following the next evaluation cycle.

It might be noted that the data instance causing the initial firing (the circled instance 3110) will not be reevaluated, thereby avoiding continuous looping although if the data within the data instance changes and the new pattern matches a rule condition, then a rule activation will be created.

The ART-IM run will finish when:

no matching conditions and patterns found.

all matching conditions and patterns have already fired rules.

The above can be summarised as follows:

1) rule activations are generated by matching data patterns with rule conditions
2) rules can, by default, fire in any order although priorities can be set
3) all data is evaluated in parallel
4) re-evaluation occurs each time a rule has fired
5) the same rule can fire many times during a run, depending on the number of matching data instances
6) rule conditions are sensitive to changes in the pattern net
7) ART-IM stops if no matching rule conditions or pattern net data is found or all matched activations have fired already.

Referring to FIG. 33, the rule base system is based on an object hierarchy, as shown. Each of the objects 3300 is defined in ART schemas and the connecting lines between objects 3300 depict inheritance from the object above.

The exchange file, APDU and call record contain slots for each data item in their structure. Each slot has a corresponding slot in the appropriate default object to declare whether the resultant has a default value, a calculable value or is an un-modifiable field. The rule base uses the default system to check what form an error correction must be, if allowed.

The above covers the data schemas. With regard to error schemas, every possible data analyser error has its details described within an appropriate schema. Each error description and its instances contains a slot for each of the following:

The object on which the error relates, that is an exchange file.

An error description.

The affected slot.

The specific data object for an error instance.

The name of the repair value.

The source of the error.

The resultant repair value.

The rule position in fire order.

The value of the slot prior to any fix being applied.

6 (ii) RULE BASE GENERIC RULES

The rule base operational flow is controlled by a number of generic rules, these performing the following functions:

for each occurrence of an error trigger, that error's repair method is fired to generate a repair value and its fire order allocated.

for a fixable error where there is only one affected slot, the affected slot is updated with the repair value generated and the time stamp of the change is stored with the instance of the error.

for each instance of an error where the repair description declares the error type as suspendable, the data item affected is moved to the suspense file and the time stamp of the move is stored with the instance of the error.

for each instance of an error where the repair description declares that the error type is sumpable, the data item affected is moved to the sump and the time stamp of the sumping of the file is stored with the instance of the error.

a record is created on the file structure rule log for each fix on an APDU or exchange file.

an Oracle record is created on the call record error log for each fix on a call record with the appropriate error information.

fixable errors

1) Default values can be allocated to the following fields

APDU type and trailer
billed call indicator
called party clear
PBX suffix
record use
record type
DDC time stamp
header APDU type
class of data transfer
format version number
node time stamp
part file indicator
table size
trailer APDU type
called party clear
application group 2) The following errors are calculable APDU length; the length of the APDU.

APDU count; the length of the APDU sequence.

End APDU sequence number; start sequence number plus the number of valid APDUs.

Start APDU sequence number; obtained from the sequence number of the first APDU in the exchange file.

Dialled digit count; the length of the dialled digit string.

There are error exceptions with regard to the above, such as where the checksumming for an APDU shows an error. Errors of this type are immediately sumped within the rule base. Some errors with regard to the APDU sequence result in the complete range of sequence numbers being re-sequenced from "1", and the related exchange files being updated. It may be that the last digit of a dialled digit string is a character between A and F. The repair value here is the dialled digit string minus the last digit.

non-fixable errors

On a non-fixable error occurrence, the data item in error, ie a call record, is passed to the sump, as described above, and the appropriate error log updated. Areas which cannot be amended, and which therefore generate non-fixable errors are as follows:

address seizure time stamp address completion time stamp either address or answer time stamp calling party clear time stamp calling line directory number seizure time stamp dialled digit string (except when the last digit is between A and F).

6 (iii) THE CASE BASE SYSTEM

The routing reference case base is a case base of routing patterns (ie TUN, route group, route number, NNI, Nodal Point Code) plus other reference data, for example the billable network operator name, and Live and Ceased Node time stamps. The case base reference data is populated from the Routing Reference schemata which in turn are populated from data contained within the Streamer Reference Data subject area 3600 of the data model (See FIG. 36).

Referring to FIG. 34, it can be seen that the object hierarchy for the case base system is similar to that for the rule base system, shown in FIG. 33, with the addition of three object classes 3400; "suggested solutions", "potential solutions" and "routing reference". It might be noted that "suggested solutions" and "potential solutions" are only created following identification of a routing reference error and contain mainly pointers to other data, that is incoming call record in error and routing reference schema that are most closely matched. The "routing reference" schemata are created from the routing reference data on the Oracle database.

With regard to the routing case base, and initialisation, the routing case base is populated at the start of a run from routing-description schemata. One case is created for every routing description schema. The routing case base will be set up with the following parameters.

Maximum of three matches

Any matches below threshold value of zero probability will be ignored so as to weed out highly unlikely matches.

Only the following slots on the case base are used in pattern matching;

TUN (ie Telephony Unit Number), route group, nodal point code, route number, NNI, and direction The following are ignored for purposes of pattern matching:

Live node time stamp

Ceased node time stamp

Telecom network operator role and name

Direction is treated as slightly different for matching purposes. It is the least significant matching slot and is given a fixed weighting ceiling of 5% of the overall weighing. The other slot weights will be split equally between the remaining 95% of the overall weighing.

Pattern matching, together with other case base functions such as setting initialisation parameters, is achieved by sending messages to the case base. The pattern matching is done in two steps, these being to send an incoming call record schema to the case base, which will return the number of matches found, and to send a retrieve-match-score message which will determine the closeness of match for each returned case together with the key of the Routing Reference schema associated with the returned case.

The case base is used for an error code validation relating to call pattern, in the cases of Nodal Point Code or Route Group Not Found, invalid Route Number, or Direction Invalid, as follows:

attempt to find an exact match between each incoming call record and a case on the Routing Reference case base. If there is an exact match the call record has a valid routing pattern and no further validation with regard to the above error will be required.

if no exact match if found, an error schema will be generated which triggers the rule base generic rules, as above, which will apply a repair method.

the specific repair method will create one suggested-solution schema which will contain (looking at FIG. 34):

i) up to three potential-solution schemata, each containing a pointer to the associated Routing Reference schema. The potential-solution schema will also contain the match position (ie closest, next closest etc) and a % measure of the closeness of the match, and ii) a pointer to the incoming call record in error.

It should be noted that the repair method will differ from the usual repair method invoked by generation of an error schema instance because it will consist of a function (routing-mismatch, which will assert the suggested-solution schema instance and facts containing keys to the Routing Reference schema) and another rule (generate-closest-matches, which will trigger on generation of the facts created by routing-mismatch and will generate one instance of a potential-solution schema for each case base match found).

Where node time stamp validation is concerned, the case base will be used as follows:

to attempt to find an exact match between each incoming call record schema and a Routing Reference schema. If there is an exact match the rule will then check for time stamp discrepancies (ie seizure time stamp should fall between node live and cease times) on the matching incoming call record schema and the Routing Reference schema. If no discrepancy exists, no further processing associated with this error will take place.

if a time stamp discrepancy is found, an error schema will be generated which triggers the rule base generic rules, as above, which will apply a repair method.

the specific repair method will create one suggested-solution schema which will contain (see FIG. 34):

one potential-solution schemata each containing a pointer to the associated Routing Reference schema. The potential-solution schema will also contain the match position (ie closest, next closest etc. ) and a % measure of the closeness of the match.

a pointer to the incoming call record schema in error.

It should be noted that the repair method will again differ from the usual repair method invoked by generation of an error schema instance, because it will consist of a function (node-timestamp-discrepancy - which will assert the suggested-solution schema instance and facts containing keys to the Routing Reference schema) and another rule (generate_node_time_discrepancies which will trigger on generation of the facts created by routing-mismatch and will generate one instance of a potential-solution schema).

6 (iv) ARM-IM AND ORACLE INTERFACE

Referring to FIG. 35, direct access to the ORACLE database from ART-IM is required to exploit fully the "parallel" validation features of the ART-IM rule base.

There are four main interfaces the population of Routing Reference data 3500 the population of default data 3505 the output of fix data to form an audit trail 3510 the output of routing error patterns as a precursor to suspense data handling 3515.

Looking at the population of Routing Reference data, this interface 3500 involves refresh of internal ART-IM schema and casebase from data in the Routing Reference Model physically held within ORACLE tables:

the refresh is triggered during the initialisation phase of an ART-IM run.

existing internal ART-IM Routing Reference schema are cleared together with their casebase entries.

data is SELECTed from ORACLE tables from a ProC program (EAB_INITIALISE_IDA_RULEBASE) which will be used as part of two External Action Blocks (file_to_ida_rules and call_record_to_ida_rules).

Internal ART-IM schema are populated by the ProC program

The Routing Reference Casebase is in turn populated from the internal Routing Reference schema by a function (inca_ida_initialize_casebase) as part of the casebase initialization process.

Looking at the population of default data:

the refresh is triggered during the initialisation phase of an ART-IM run.

existing internal ART-IM default (df-call-record, df-apdu etc) schemata are cleared together with their casebase entries.

data is SELECTed from ORACLE tables from a ProC program (EAB_INITIALIZE_IDA_RULEBASE) which will be used as part of two External Action Blocks (file_to_ida_rules and call_record_to_ida_rules).

Internal ART-IM schema are populated by the ProC program

Looking at the creation of Error and Fix data, if errors are detected during incoming data validation which are associated with data that can be fixed then an audit trail of the fixes applied by the rule base needs to be maintained:

for every file structure in error a row entry is created in the FILE_ERROR_LOG table. This is done by the streamer process.

for every call record in error a row entry is created in the CALL_RECORD_ERROR_LOG. This can be done by the streamer process or by ART-IM.

For every error detected and fix applied at the file structure level a row entry is created in the FILE_STRUCTURE_RULE_LOG on the ORACLE database. This is best done by the rule base using a generic rule which is triggered when all file level error detection and fixing has completed. The rule should fire once for each error detected/fix applied and when fired will invoke a user-defined-procedure call sql_exec_limited which does the necessary insertion.

for every error detected and fix applied at the file structure level a row entry is created in the CALL_RECORD_RULE_LOG on the ORACLE database. This is best done by the rule base using a generic rule which is triggered when all call record level error detection and fixing has completed. Again, the rule should fire once for each error detected/fix applied and when fired will invoke a user-defined-procedure call sql_exec_immed which does the necessary insertion.

the ART-IM rules will populate the inserted values from slots on internal schemas.

Looking at the creation of Rousing Error Patterns and Closest Matches data, if errors are detected during incoming data validation which are associated with data that is suspended then a record of the incoming call record error pattern (based on TUN, NNI, route group number, route group, direction) together with the three closest matches (based on the closest patterns on the routing reference model to the incoming call record in error) needs to be stored on the ORACLE database for later suspense file processing. Patterns are stored following completion of all validation/fix processing. In more detail:

for every error generated that is a suspense file error (and assuming no unfixable errors have been generated on the same call record—these unfixable call records are weeded-out using the move_to_sump generic rule), a generic rule (move_to_suspense_file_area) is fired. The rule tries to select the pattern in error from the database, and, if the pattern in error exists:

i) tests for any entry in FILE_ROUTE_ERROR_LINK with relevant pattern exchange file and foreign keys.

ii) if the entry exists no further action is required.

iii) if the entry does not exist then inserts a row entry into the FILE_ROUTE_ERROR_LINK.

If the pattern in error does not exist:

iv) inserts a row entry into a ROUTE_ERROR_PATTERN table populated by error pattern data from incoming call records.

v) inserts a row entry into FILE_ROUTE_ERROR_LINK.

vi) inserts up to 3 row entries into the CLOSEST.MATCHES table populated by routing reference patterns found from previous casebase processing to be closest to the route pattern in error.

A user defined procedure is used to pass SQL command to ORACLE.

The ART-IM rules will populate the inserted values from slots on internal schemas.

7. FIGS. 20, 21, 37 TO 43: USE OF EXPERT SYSTEM BY DATA ANALYSER 7

In the flow diagrams referenced below, it might be noted that a slightly different format has been applied from that of earlier flow diagrams in this specification. That is, function calls are denoted by boxes with double vertical lines, simple statements are denoted by boxes with single vertical lines, and yes/no decisions are denoted by a simple diamond.

The use of the ART-IM expert system by the data analyser 7 can be expressed in flow diagrams. Referring to FIGS. 16, 17 and 20, once it has been determined that there is a failure at call record level, step 1605, and the next call record error log has been selected from a file, step 1702, the relevant call records are sent to the expert system, step 2000. The expert system locates the correct APDU, steps 2005, 2010, and then the errored call record, steps 2015, 2020.

The expert system then checks whether the call record is correctly itemized (step 2025), in this example according to System X itemization, and, if it is not, directs the call record to sump by setting the IEF status to "SUMP", step 2030, while updating the call record error log, step 2035. If the call record is correctly itemized, it is "put through" the expert system, steps 2040, 2045, 2050, and the results assessed by the data analyzer 7, in step 1704 onwards.

Figure 21:
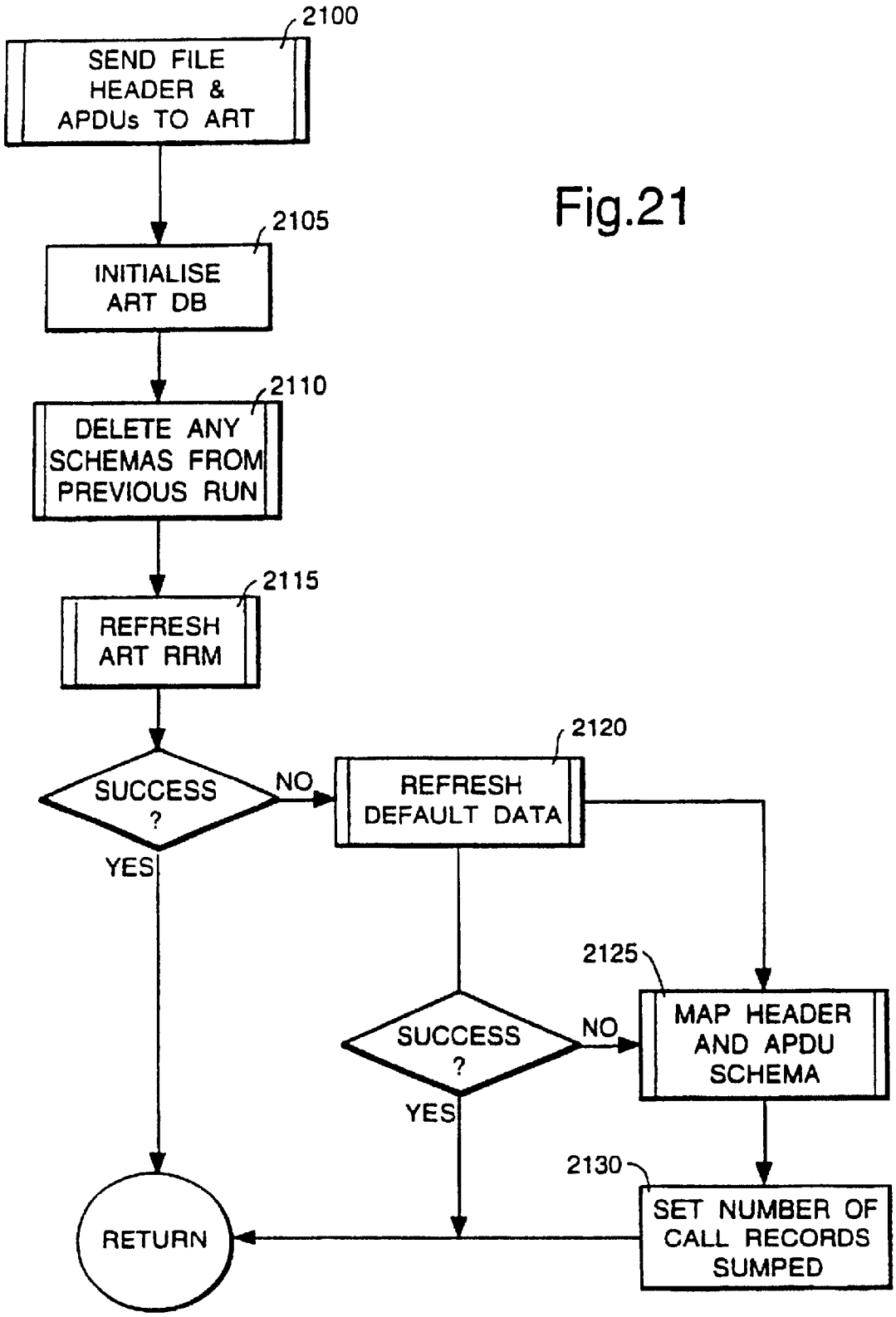

Referring to FIG. 16 and 21, it may have been decided that there is failure at file or APDU level, step 1604. In that case, the file is loaded to memory and the file header and APDUs sent to the expert system; step 2100. The expert system database is called up, step 2105, and the APDU schemas from the previous run deleted, step 2110. The first test run is to refresh the expert system version of the Routing Reference Model, step 2115, which may immediately result in correcting the apparent error. If not, the default data for the expert system is refreshed, step 2120, in case for instance default data for the error concerned has previously been missing. If either of these is successful, the data analyzer process reasserts itself, FIG. 16, and the results from the expert system refresh steps will allow the file to go to validation of its call records, step 1611. If neither is successful, the call records themselves must be individually validated. This is described below.

Referring to FIG. 37, the function box 2125 of FIG. 21, "map header and APDU schema", expands to include loading (steps 3700 to 3725, 3735) and running (steps 3730, 3740, 3745, 3750) the expert system, ART-IM, with respect to call records from the errored files which could not be processed successfully after refreshes of the Routing Reference Model and default data. This loading process includes getting data not available on the ART database ("Foreign Keys"), for instance data from the Streamer 6, in step 3715, to enable the expert system to access the files. Having analyzed each call record, the ART supplies a status (step 3755), which may indicate the call record is fixed or should be suspended or sumped. The data analyzer process (IEF) keeps a count of the call records to be sumped, step 3760, and sets a flag in the ART-IM, step 3765, which triggers clean-up by the ART-IM, step 3770, to clear out each call record and relevant schemas to avoid these simply building up.

Figure 38:
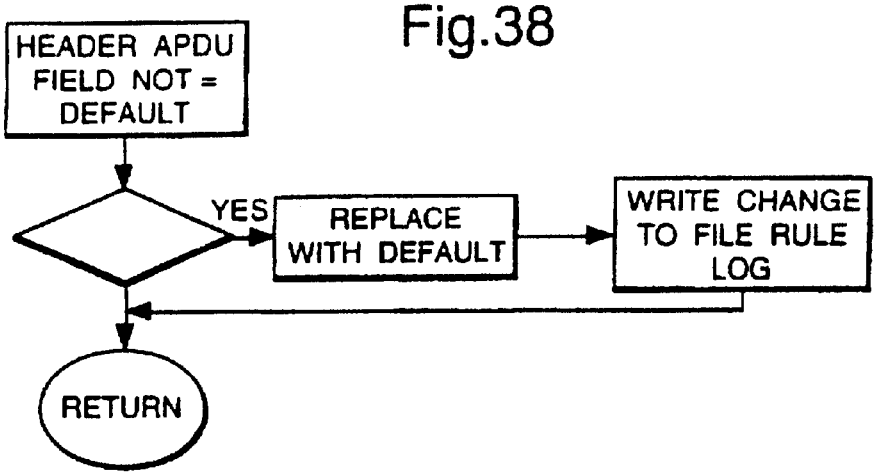
Figure 39:
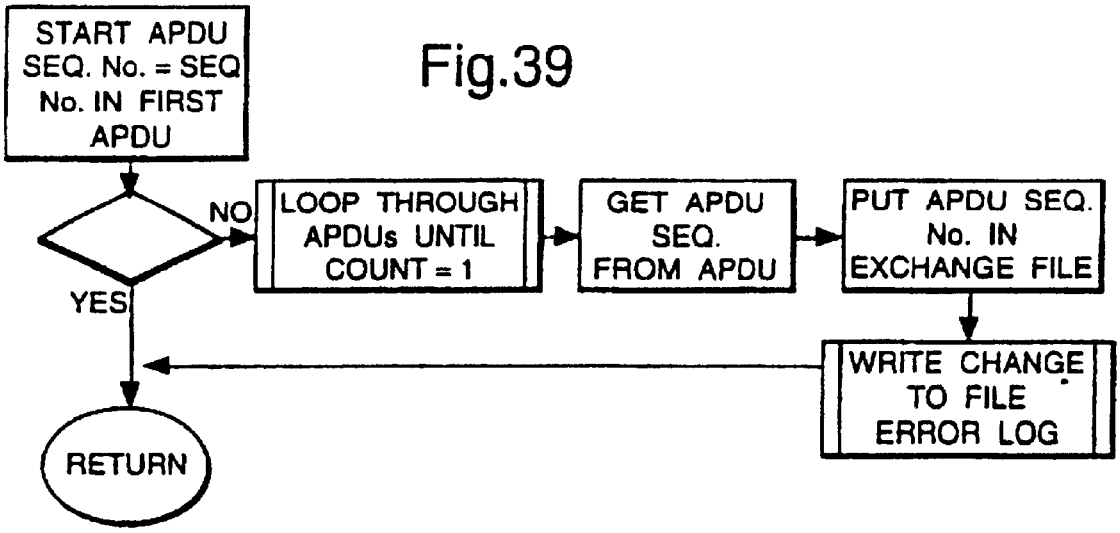
Figure 40:
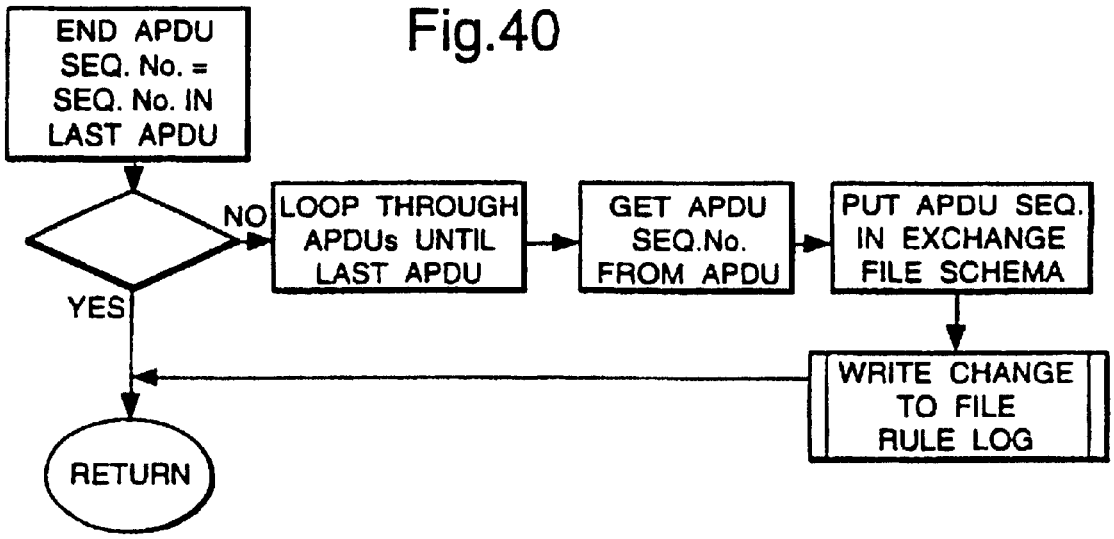
Figure 41:
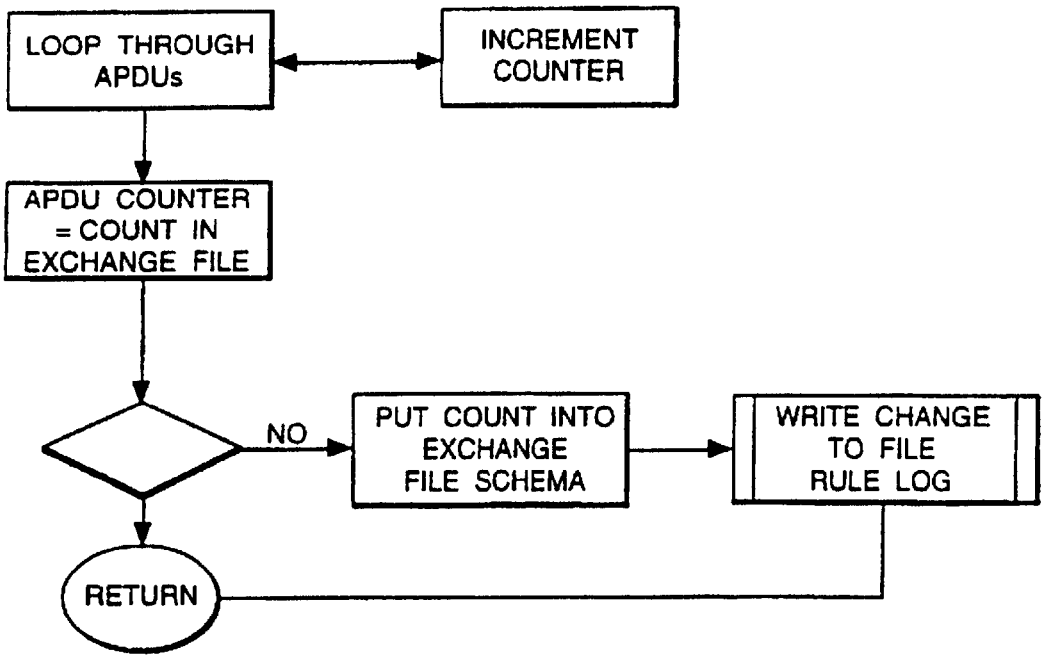
Figure 42:
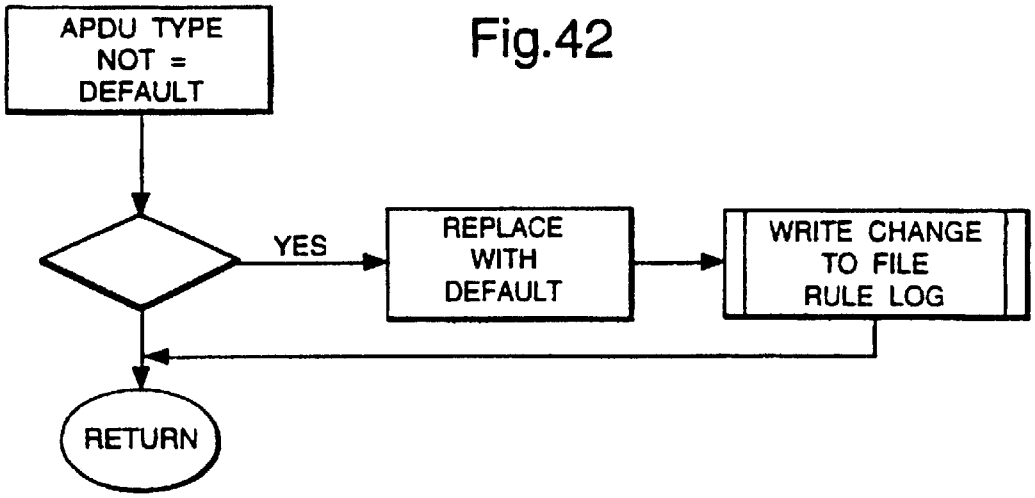
Figure 43:
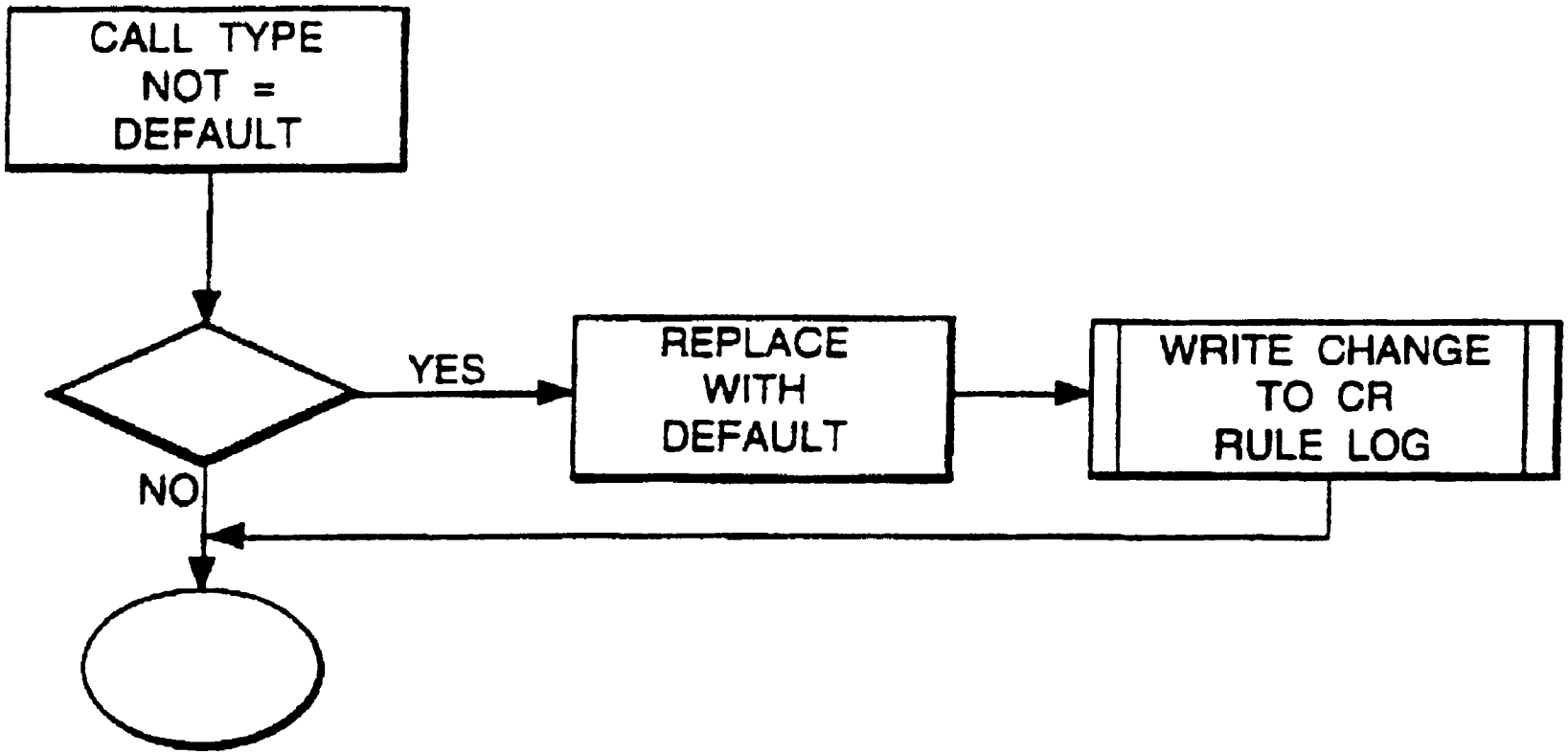

Referring to FIGS. 38 to 43, the application of the expert system file rules can also be expressed in flow diagrams, and the following examples are shown, the flow diagrams being self-explanatory:

i) FIG. 38; ART File Rules (exchange file header)
- This can be applied to trailer
- trailer APDU
- format version number
- file type
- node timestamp
- DDC/NMP timestamp (NMP stands for Network Mediation Processor)
- class of data transfer
- node cluster identity
- streamer NNI
- application group
- part file indicator
- file byte size
- table size
- selected APDU type ii) FIG. 39; APDU first sequence number rule iii) FIG. 40; APDU last sequence number rule iv) FIG. 41; APDU sequence number count rule v) FIG. 42; ART APDU rules
- This can be applied to
- retransmission indicator linking field vi) FIG. 43; ART call record rules
- This can be applied to
- record use
- billed call indicator
- clearing cause
- PBX suffix
- CLI cluster identity
- network circuit
- network band
- circuit identity
- circuit number charge band
- call sampling method
- sampling mode
- count reset indicator
- value of N (where N relates to a count made while running a test set of call records for example)
- called party clear timestamp

8. FIGS. 36 AND 44; COMPANY SYSTEM

Referring to FIG. 4, the output from the Streamer 6 to the Company System 8 comprises call records sorted according to billable entity, and validated as described above using a data analyser incorporating the ART-IM expert system.

The primary role of the Company System 8 is to price the call records and to output the priced records so that they can be billed to clients. However, it also has a validation role, as mentioned above, with emphasis on data relevant to the billable entity and the relationship between the billable entity and the operator of the first network 1. The company system 8 therefore incorporates or accesses a company system data analyser, referred to in the following as "cIDA".

The cIDA application can reside alongside the data analyser 7 which validates data from the Streamer 6, described above. In FIG. 4, the steps of fixing errored call records, 430, bulking the fixed call records, 440, and investigating unfixable call records, 450, can all be carried out by means of the cIDA application.

Interestingly, it has been noted that the majority of errors, of the order of 90% of the errors picked up by the company system 8, concern decode anomalies, mainly to do with "time lines" such as "123" and "emergency services" (999) calls. The bulk of the remainder of errors can be attributed to discrepancies in reference data. There can therefore be two primary aspects to building a data analyser for use with the company system 8, these being to tackle records providing the majority of the errors, the decode anomalies, and then to provide an infrastructure capable of representing files back to the company system 8 after correction.

Processing Overview

A suitable arrangement might be as follows. Error and warning files are sent from the company box 8 to the cIDA where they are loaded to specific directories, one per operator. A single file can hold zero or many records. Preferably, the cIDA provides a parallel processing facility for all operators running a concurrently, with the capability of manual override. A log is maintained in order to control the sequence of files into and out of the cIDA.

Once an error file has been selected for processing, the cIDA selects each record in turn, assuming the file is not empty, and evaluates the error into one of two categories: fixable and unfixable. Unfixable records are written to a table, reported on, and can later be removed from the database For archiving. Where a record has been deemed to be fixable, it might be fixed automatically by applying rules, or it might need manual intervention before it can be fixed.

Each record, irrespective of error type, is inserted into an ORACLE database table, with all details passed from the company box 8 and a flag set to indicate the "state". The state might, in accordance with the above, be selected from
- suspense
- unfixable
- rules Users, using Business Objects run at regular intervals, have the capability to view all records currently held and the state allocation they have been given. An audit log can be held for a relevant period, such as for one month for all "charging number string" corrections.

It might be noted that the use of automatic rules may well be found unnecessary. By correcting errors caused by decode anomalies, that is 90% of current errors, the error rate has been found to be reduced to 0.01%. Hence, the simplicity of errors arising means that a system employing automatic rules would be over complicated.

Referring to FIG. 44, the dataflow routes about the data collection and processing system of the present invention can be seen. In this Figure, data stores such as files and tables are represented by the horizontally extending rectangles with vertical dotted lines, and processes are represented by the bigger blocks, incorporating rectangles. Entities external to the whole system, such as the NCDB 9, are represented by the "lozenges".

As already described, raw call data is entered to the Streamer, which converts the raw call data, validates and processes the call records, involving a data analyser so far as necessary, and outputs validated, itemized call records to the company box. The company box firstly performs operator specific validation, and secondly aggregates itemized call records. At this stage, the call records are priced, using charging information for instance from the national charging database (NCDB) 9, and output in summarized form to produce a bill report for the relevant client system 10. Other outputs include the expanded call records, stored on optical disc 71, and summarized call records for a management reporting system 4400.

It can be seen in FIG. 44 that there is also an output from the data analyzer to an auditing system "CARDVU" 4405. Although embodiments of the present invention can provide extremely detailed information for audit purposes, the auditing system itself is not part of the invention and is not therefore described herein, beyond the comments below at "9, AUDIT TRAIL".

Referring to FIG. 36, a data model for the company system 8 shows clearly the data sources for use at charging and pricing by the company system 8. Much the greatest amount of data, the "C&P reference data", is derived from the NCDB 9. However, there are constraints set by the accounting agreement 4500 between the billable entity and the operator of network 1. Many issues can be dealt with from the network management center and the data model of FIG. 36 provides appropriate visibility thereto by means of the "telecoms network operator role" box 4505.

The following initials, used in FIG. 36, can be expanded as follows:

CBM Charge Band Matrix

CB Charge Band

NN Network Node

KCH Kingston Communications, Hull (an operator in the UK of a network interconnected to the BT PSTN TE Telecom Eirann (as above)

NCIP National Charging Information Package (an interface to data on the NCDB)

Pricing and charging engines, complying with the type of constraints offered by the system of the present invention, are known and specific description of the charging and pricing engine is not therefore offered here. Indeed, although the data model of FIG. 36 shows all entities involved, not all the relationships are shown as the representation would become too complicated. Overall, however, it must be borne in mind that the call records handled by the company system 8 are already sorted according to billable entity. This aspect of the data needs to be maintained, clearly, so that relevant reports can be allocated to the correct client systems 10. This can be done, as indicated above, for instance by maintaining allocated directories for the billable entities.

9. AUDIT TRAIL

An arrangement as described above can provide a sophisticated audit trail. Data from the exchange at the point of interconnect comes in a file, and is packaged into APDUs. The streamer system 6 polls data off the DDCs 5 using the FTAM protocol, the data being in binary, in call records. The streamer system 6 validates the data against the data base containing reference data, the Routing Reference Model, and assesses which other network operator should be billed. The streamer system 6 writes a full call record in ASCII with operator and exchange information added.

An audit trail arises as follows. On the exchange, call instances are numbered with a File Generation Number which cycles from 0–9999. The DDC 5 also adds a sequence number which cycles from 0–999999, at the file level. Within the file, APDUs are also sequenced with an APDU sequence number which cycles from 0–16353, being binary.

This means that there is stored a record of the number of records in a file, the APDU start and finish numbers, and the number of APDUs.

Because a sequence number is added to each number at the exchange, it can be ensured that the company box 8 receives the numbers in sequence, although they will not necessarily be processed in order. The streamer system 6 actually processes in parallel from different exchanges at the same time.

In the data analyzer, where a "pattern net" is used, by means of which data will "fire" a rule if it does not fit valid content, the analyser can patch data items only where the data item concerned would not affect price or the audit trail. Patch in this context means set to a standard value. Hence, the data analyzer cannot chance the call record sequence number because that identifies the call record. If the call record sequence number were to be changed, there would be no audit trail.

The system described above is, as stated, only one specific embodiment of the invention. It relates to a PSTN and, as described deals with call records in a voice communications system. Further, he specific form of call records involved, System X Type 6, relate to only one type of exchange which might be used at a point of interconnection (POI) between networks.

Many changes might be made, however, without departing from the spirit of the present invention. A simple extension of the application of the invention is that, as well as using call record data to generate billing information, traffic analysis information can also be picked up and processed. For instance, calls which are ineffective in reaching a destination, "ineffectives", can be counted by the exchange at the POI and the "bulked" outcome input to the data processing system.

However, more significant changes might include the use of the system with communications other than voice communications, even excluding voice communications, and, as already mentioned, it is clearly not essential that a PSTN is involved, although the benefit of embodiments of the invention is clearly significant with a PSTN in the light of the sheer volume of records and complexity of sources involved.

I claim:

1. A billing data analyzer for use in a communications network, which network is connected to one or more other networks, the billing data analyzer comprising:

an input for billing data collected with respect to billable aspects of communication instances in said communications network, said billing data having been initially rejected as unbillable by validating means associated with said network, means for assessing the type of invalidity arising in the billing data, and means for dealing with the billing data accordingly by attempting to correct it into billable data, said means for dealing with the billing data comprising means for applying default values, means for applying amended values, and means for appending data to files in a temporary data store, *and*

*an output for receiving data from said means for dealing with the billing data and outputting the received data to said validating means.*

2. A billing data analyzer according to claim 1, wherein said means for dealing with the billing data further comprises means for dispatching unbillable data to a sump, for subsequent management analysis.

3. A billing data analyzer according to claim 1, wherein the means for dealing with the billing data selects how to deal with data on the basis of the reason for its having been invalidated.

4. A billing data analyzer according to claim 1, wherein each of the files to which billing data can be appended is associated with a respective error pattern, and all billing data appended to a file can be corrected in a similar manner, for instance by updating specified reference data associated with the invalidity.

5. A billing data analyzer according to claim 1, which is provided with a second input, for receiving billing data which has been rejected as unbillable by validating means associated with pricing and charging means on the basis of incorrect data associated with pricing and charging.

6. A billing data analyzer according to claim 1, wherein the analyzer includes a second input for billing data rejected as unbillable by validating means on the basis of decode anomalies.

7. A billing data analyzer according to claim 1, comprising an expert system, including a rulebase and a casebase.

8. A data analyzer, for use in a communications network, which network is connected to one or more other networks, the data analyzer comprising:

an input for data collected with respect to said communications network, said data having been rejected by validating means associated with said network, means for assessing the type of invalidity arising in the data, [and]

means for dealing with the data accordingly, *and*

*an output for receiving data from said means for dealing with the data and outputting the received data to said validating means,* said means for dealing with the data comprising means for applying default values, means for applying amended values, and means for appending data to files in a temporary data store, said analyzer being in two parts, there being provided a part incorporating an expert system, for analyzing data which might have been invalidated for any of a variety of reasons, including incorrect routing data, and there being provided a part for analyzing data which might have been invalidated for at least one reason not included in the variety of reasons, wherein the second of the two parts receives data which has been sorted according to associated billable entity, while the first part receives data which has not been so sorted.

9. A billing data analyzing method for use in a communications network, which network is connected to one or more other networks, the billing data analyzing method comprising:

collecting billing data with respect to billable aspects of communications instances in said communications network, said billing data having been initially rejected as unbillable by validating means associated with said network, assessing the type of invalidity arising in the billing data, [and]

dealing with the billing data accordingly by attempting to correct it into billable data by applying default values, amended values, and appending data to files in a temporary data store, *and*

*outputting billing data that has been corrected to said validating means.*

10. A billing data analyzing method as in claim 9 wherein said dealing-with-the-data step further comprises dispatching unbillable data to a sump, for subsequent management analysis.

11. A billing data analyzing method as in claim 9 wherein the dealing-with-the-data step includes selecting how to deal with unbillable data on the basis of the reason for its having been invalidated.

12. A billing data analyzing method as in claim 9 wherein each of the files to which billing data can be appended is associated with a respective error pattern, and all billing data appended to a file can be corrected in a similar manner, for instance by updating specified reference data associated with the invalidity.

13. A billing data analyzing method as in claim 9 which also receives unbillable billing data which has been rejected by validating means associated with pricing and charging on the basis of incorrect data associated with pricing and charging.

14. A billing data analyzing method as in claim 9 further comprising accepting billing data rejected by validating means on the basis of decode anomalies and using such further data to assist in attempted billing data correction.

15. A billing data analyzing method as in claim 9 using an expert system, including a rule base and a casebase.

16. A data analyzing method for use in a communications network, which network is connected to one or more other networks, the data analyzing method comprising:

collecting data with respect to said communications network, said data having been rejected by validating means associated with said network, assessing the type of invalidity arising in the data, [and]

dealing with the data accordingly by attempting to correct it by applying default values, amended values, and appending data to files in a temporary data store; and

*outputting data that has been corrected to said validating means,* wherein the invalidated data is analyzed in two ways, there being provided:

a first way using an expert system, for analyzing data which might have been invalidated for any of a variety of reasons, including incorrect routing data, and there being a second way for analyzing data which might have been invalidated for at least one reason not included in the variety of reasons, wherein the second of the two ways uses data which has been sorted according to associated billable entity, while the first way uses data which has not been so sorted.

17. A billing data analyzer, for use in a communications network, which network is connected to one or more other networks, the billing data analyzer comprising:

an input for billing data collected with respect to billable aspects of communication instances in said communications network, said billing data having been rejected by validating means associated with said network, means for accessing the type of invalidity arising in the billing data, [and]

means for dealing with the billing data accordingly, said means for dealing with the billing data comprising any one or more of the following:

means for applying default values;

means for applying amended values; and means for appending data to files in a temporary data store, *and*

*an output for receiving data from said means for dealing with the billing data and outputting the received data to said validating means.*

18. A billing data analyzer as in claim 17 wherein said means for dealing with the billing data further comprises means for dispatching unbillable data to a sump, for subsequent management analysis.

19. A billing data analyzer as in claim 17 wherein the means for dealing with the billing data selects how to deal with unbillable data on the basis of the reason for its having been invalidated.

20. A billing data analyzer as in claim 17 wherein each of the files to which billing data can be appended is associated with a respective error pattern, and all billing data appended to a file can be corrected in a similar manner, for instance by updating specified reference data associated with the invalidity.

21. A billing data analyzer as in claim 17 which is provided with a second input, for receiving unbillable billing data which has been rejected by validating means associated with pricing and charging means on the basis of incorrect data associated with pricing and charging.

22. A billing data analyzer as in claim 17 wherein the analyzer includes a second input for unbillable billing data rejected by validating means on the basis of decode anomalies.

23. A billing data analyzer as in claim 17 comprising an expert system, including a rulebase and a casebase.

24. A data analyzer, for use in a communications network, which network is connected to one or more other networks, the data analyzer comprising:

an input for data collected with respect to said communications network, said data having been rejected by validating means associated with said network, means for accessing the type of invalidity arising in the data, [and]

means for dealing with the data accordingly, said means for dealing with the data comprising any one or more of the following:

means for applying default values;

means for applying amended values; and means for appending data to files in a temporary data store; and

*an output for receiving data from said means for dealing with the data and outputting the received data to said validating means; and* wherein said analyzer is in two parts, there being provided:

a first part incorporating an expert system, for analyzing data which might have been invalidated for any of a variety of reasons, including incorrect routing data, and a second part for analyzing data which might have been invalidated for at least one reason not included in the variety of reasons, wherein the second of the two parts receives data which has been sorted according to associated billable entity, while the first part receives data which has not been so sorted.

25. A billing data analyzing method for use in a communications network, which network is connected to one or more other networks, the billing data analyzing method comprising:

collecting billing data with respect to billable aspects of communication instances in said communications network, said billing data having been initially rejected as unbillable by validating means associated with said network, assessing the type of invalidity arising in the billing data, [and]

dealing with the billing data accordingly by attempting to correct it by applying any one or more of the following:

default values, amended values; and appended data to files in a temporary data store, *and*

*outputting billing data that has been corrected to said validating means.*

26. A billing data analyzing method as in claim 25 wherein said dealing-with-the-data step further comprises dispatching unbillable data to a sump, for subsequent management analysis.

27. A billing data analyzing method as in claim 25 wherein the dealing-with-the-data step includes selecting how to deal with billing data on the basis of the reason for its having been invalidated.

28. A billing data analyzing method as in claim 25 wherein each of the files to which billing data can be appended is associated with a respective error pattern, and all billing data appended to a file can be corrected in a similar manner, for instance by updating specified reference data associated with the invalidity.

29. A billing data analyzing method as in claim 25 which also receives billing data which has been initially rejected as unbillable by validating means associated with pricing and charging on the basis of incorrect data associated with pricing and charging.

30. A billing data analyzing method as in claim 25 further comprising accepting billing data rejected by validating means on the basis of decode anomalies and using such further data to assist in attempted data correction.

31. A billing data analyzing method as in claim 25 using an expert system, including a rulebase and a casebase.

32. A data analyzing method for use in a a communications network, which network is connected to one or more other networks, the data analyzing method comprising:

collecting data with respect to said communications network, said data having been rejected by validating means associated with said network, assessing the type of invalidity arising in the data, [and]

dealing with the data accordingly by attempting to correct it by applying any one or more of the following:

default values, amended values; and appended data to files in a temporary data store; and

*outputting data that has been corrected to said validating means; and* wherein the invalidated data is analyzed in two ways, there being provided a first way using an expert system, for analyzing data which might have been invalidated for any of a variety of reasons, including incorrect routing data, and a second way for analyzing data which might have been invalidated for at least one reason not included in the variety of reasons, wherein the second of the two ways uses data which has been stored according to associated billable entity, while the first way uses data which has not been so sorted.

* * * * *